(12) United States Patent
Cobb et al.

(10) Patent No.: US 8,005,563 B2
(45) Date of Patent: *Aug. 23, 2011

(54) SYSTEM FOR ASSEMBLING AIRCRAFT

(75) Inventors: James M. Cobb, Burien, WA (US);
John G. Barnes, Mukilteo, WA (US);
Alan K. Jones, Seattle, WA (US); Brian K. Sollenberger, Mukilteo, WA (US);
Patrick B. Stone, Monroe, WA (US)

(73) Assignee: The Boeing Company, Chicago, IL (US)

( * ) Notice: Subject to any disclaimer, the term of this patent is extended or adjusted under 35 U.S.C. 154(b) by 605 days.

This patent is subject to a terminal disclaimer.

(21) Appl. No.: 12/117,093

(22) Filed: May 8, 2008

(65) Prior Publication Data
US 2009/0112349 A1 Apr. 30, 2009

Related U.S. Application Data

(63) Continuation-in-part of application No. 11/977,987, filed on Oct. 26, 2007, now Pat. No. 7,917,242, and a continuation-in-part of application No. 11/977,986, filed on Oct. 26, 2007, now Pat. No. 7,614,154, and a continuation-in-part of application No. 12/002,147, filed on Dec. 13, 2007, and a continuation-in-part of application No. 12/104,558, filed on Apr. 17, 2008.

(51) Int. Cl.
*G06F 19/00* (2011.01)
*G05B 19/18* (2006.01)

(52) U.S. Cl. .............. 700/114; 700/60; 29/407.1; 703/8
(58) Field of Classification Search .................... 700/60, 700/62, 114, 117; 703/8; 29/407.09, 407.1, 29/714, 281.4, 281.5
See application file for complete search history.

(56) References Cited

U.S. PATENT DOCUMENTS

| 5,659,939 | A | * | 8/1997 | Whitehouse | 29/281.4 |
| 6,230,382 | B1 | * | 5/2001 | Cunningham et al. | 29/407.1 |
| 7,194,326 | B2 | | 3/2007 | Cobb | |
| 7,869,895 | B2 | * | 1/2011 | Jones | 700/114 |
| 2003/0090682 | A1 | * | 5/2003 | Gooch et al. | 356/620 |

* cited by examiner

*Primary Examiner* — Albert Decady
*Assistant Examiner* — Steven R Garland
(74) *Attorney, Agent, or Firm* — Tung & Associates

(57) ABSTRACT

A system automatically moves large scale components of a vehicle such as an airplane, into final assembly alignment. A noncontact measurement system determines the locations of aerodynamically significant features on each of the components. The measured locations of the components are used to control an automated jacking system that includes assembly jacks for individually moving the components into assembly alignment. A system is provided for calculating the cruise configuration of the vehicle "as-built" and for transferring the cruise configuration into the vehicle where it is recorded in the form of a physical monument.

19 Claims, 38 Drawing Sheets

| | AC | AD | AE | AF | AG | AH | | AK | AL |
|---|---|---|---|---|---|---|---|---|---|
| Jack Name | | X Axis Delta Nom | Y Axis Delta Nom | Z Axis Delta Nom | Dynamic Section-Wing Angles | | | | |
| Section 41 Axis Positions | FLF | 0.0000 | 0.0000 | 0.0000 | | | | | |
| | FRF | 0.0000 | 0.0000 | 0.0000 | Roll | 0.000 | | Roll | 0.000 |
| | FLR | 0.0000 | 0.0000 | 0.0000 | Pitch | 0.000 | | Pitch | 0.000 |
| | FRR | 0.0000 | 0.0000 | 0.0000 | Yaw | 0.000 | | Yaw | 0.000 |
| Section 47 Axis Positions | ALF | 0.0000 | 0.0000 | 0.0000 | | | | | |
| | ARF | 0.0000 | 0.0000 | 0.0000 | Roll | 0.000 | | Roll | 0.000 |
| | ALR | 0.0000 | 0.0000 | 0.0000 | Pitch | 0.000 | | Pitch | 0.000 |
| | ARR | 0.0000 | 0.0000 | 0.0000 | Yaw | -0.115 | | Yaw | -0.115 |
| LW Axis Positions | LWI | 0.0000 | 0.0000 | 0.0000 | Roll | 0.000 | | Roll | 0.000 |
| | LWA | 0.0000 | 0.0000 | 0.0000 | Pitch | 0.000 | | Pitch | 0.000 |
| | LWO | 0.0000 | 0.0000 | 0.0000 | Yaw | 0.000 | | Yaw | 0.000 |
| RW Axis Positions | RWI | 0.0000 | 0.0000 | 0.0000 | Roll | 0.000 | | Roll | 0.000 |
| | RWA | 0.0000 | 0.0000 | 0.0000 | Pitch | 0.000 | | Pitch | 0.000 |
| | RWO | 0.0000 | 0.0000 | 0.0000 | Yaw | 0.000 | | Yaw | 0.000 |

ACTUAL JACK DELTAS FROM LSMA SET POSITIONS AT FINAL SET

Orientation wrt ERS at final set

Outputs to Angles_at_final_set worksheet

```
                            400
   ┌─────────────────────────────────────────────┐
   │ FORMAT ANGULAR VARIATION OF THE AT LEAST ONE│
   │ AERODYNAMICALLY SIGNIFICANT FEATURE OF THE  │──402
   │    AS-BUILT AIRPLANE INTO AN INPUT VECTOR   │
   └─────────────────────────────────────────────┘
                         │
                         ▼
   ┌─────────────────────────────────────────────┐
   │ FORMAT TRANSFORMATION FACTORS THAT CORRELATE│
   │  ANGULAR VARIATIONS OF AERODYNAMICALLY      │
   │ SIGNIFICANT FEATURES WITH ANGULAR OFFSETS OF│──404
   │    COMPONENTS OF CRUISE ORIENTATION INTO A  │
   │            TRANSFORMATION MATRIX            │
   └─────────────────────────────────────────────┘
                         │
                         ▼
   ┌─────────────────────────────────────────────┐
   │ MULTIPLY THE TRANSFORMATION MATRIX BY THE INPUT│
   │ VECTOR TO OBTAIN AN OUTPUT VECTOR WITH ANGULAR│──406
   │  OFFSETS OF COMPONENTS OF THE PREDICTED CRUISE│
   │    ORIENTATION OF THE AS-BUILT AIRPLANE     │
   └─────────────────────────────────────────────┘
```

FIG. 43

$$d = \begin{Bmatrix} \Theta_{RwingIncid} \\ \Theta_{LwingIncid} \\ ABS(\Theta_{RwingIncid} - \Theta_{LwingIncid}) \\ \Theta_{RwingSweep} \\ \Theta_{LwingSweep} \\ \Theta_{RstabIncid} \\ \Theta_{LstabIncid} \\ \Theta_{RstabSweep} \\ \Theta_{LstabSweep} \\ \Theta_{VertStabIncid} \\ \Theta_{RengineIncid} \\ \Theta_{LengineIncid} \\ \Theta_{RengineToe} \\ \Theta_{LengineToe} \end{Bmatrix}$$

FIG. 44

$$T = \begin{pmatrix} \begin{array}{c} \text{AoA }(\alpha) \\ \text{Bank }(\Phi) \\ \text{Sideslip }(\beta) \end{array} \begin{array}{ccccc} \text{RwingIncid} & \text{LwingIncid} & \text{ABS(RwingIncid - LwingIncid)} & \text{RwingSweep} \\ -0.5 & -0.5 & 0.073 & 0.123 \\ -4.908108327 & -4.908108327 & 0 & 1.504823667 \\ -2.485268762 & -2.485268762 & 0 & 0.973389333 \end{array} \end{pmatrix}$$

$$\begin{bmatrix} \text{LwingSweep} & \text{RstabIncid} & \text{LstabIncid} & \text{RstabSweep} & \text{RstabSweep} \\ 0.123 & 0 & 0 & 0 & 0 \\ -1.504823667 & -0.283979617 & 0.283979617 & 0.002082341 & -0.002082341 \\ -0.973389333 & -0.096346716 & 0.096346716 & 0.004206274 & -0.004206274 \end{bmatrix}$$

$$\begin{bmatrix} \text{VertStabIncid} & \text{RengineIncid} & \text{LengineIncid} & \text{RengineToe} & \text{LengineToe} \\ 0 & 0 & 0 & 0 & 0 \\ 0.123631911 & -0.049627079 & 0.049627079 & -0.09203355 & -0.09203355 \\ 0.093153893 & -0.028748346 & 0.028748346 & 0.00117209 & 0.00117209 \end{bmatrix}$$

FIG. 45

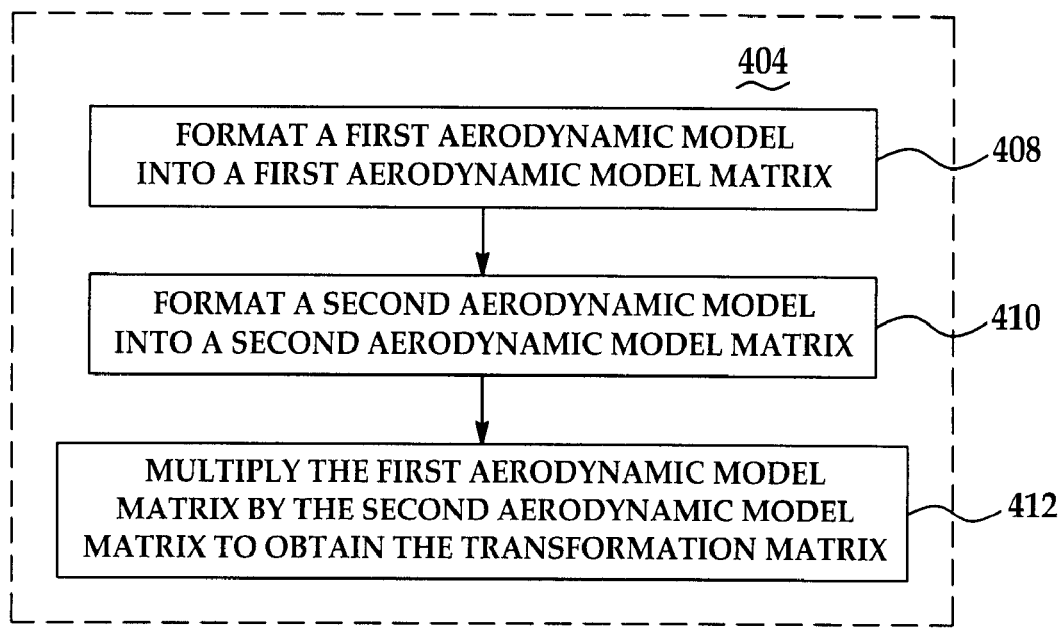

FIG. 46

$$F = \begin{bmatrix} -0.5 & -0.5 & 0.073 & 0.123 & 0.123 & 0 & 0 \\ 712.7 & -712.7 & 0 & 2570 & -2570 & 437.8 & -437.8 \\ -1785700 & 1785700 & 0 & 696540 & -696540 & -72250 & 72250 \\ 274300 & -274300 & 0 & -111230 & 111230 & 28100 & -28100 \end{bmatrix}$$

$$\begin{bmatrix} 0 & 0 & 0 & 0 & 0 & 0 & 0 \\ 0 & 0 & 6830 & 0 & 0 & 0 & 0 \\ 847 & -847 & 133500 & -20186 & 20186 & 630 & 630 \\ 0 & 0 & -525700 & 0 & 0 & 0 & 0 \end{bmatrix}$$

$$A = \begin{bmatrix} 1 & 0 & 0 & 0 \\ 0 & -0.000146085 & 0.00000245849 & -0.000001508815 \\ 0 & 0.00000170173 & 0.000014241725 & 0.000000206574 \end{bmatrix}$$

FIG. 47

$$F = \begin{bmatrix} -0.5 & -0.5 & 0.073 & 0.123 & 0.123 & 0 & 0 \\ 712.7 & -712.7 & 0 & 2570 & -2570 & 437.8 & -437.8 \\ -1785700 & 1785700 & 0 & 696540 & -696540 & -72250 & 72250 \\ 274300 & -274300 & 0 & -111230 & 111230 & 28100 & -28100 \end{bmatrix}$$

$$\begin{bmatrix} 0 & 0 & 0 & 0 & 0 & 0 & 0 \\ 0 & 0 & 6830 & 0 & 0 & 0 & 0 \\ 847 & -847 & 133500 & -20186 & 20186 & 630 & 630 \\ 0 & 0 & -525700 & 0 & 0 & 0 & 0 \end{bmatrix}$$

$$A = \begin{bmatrix} 1 & 0 & 0 & 0 \\ 0 & -0.000146085 & 0.00000245849 & -0.000001508815 \\ 0 & 0.00000170173 & 0.000014241725 & 0.000000206574 \\ 0 & 0.00000218037 & 0.0000017586875 & 0.000004611405 \end{bmatrix}$$

FIG. 48

$$\begin{array}{c}\text{AoA }(\alpha)\\ \text{Bank }(\Phi)\\ \text{Sideslip }(\beta)\\ \text{Rudder}\end{array}\ T = \left(\begin{array}{ccccc}\text{RwingIncid} & \text{LwingIncid} & \text{ABS(RwingIncid - LwingIncid)} & \text{RwingSweep}\\ -0.5 & -0.5 & 0.073 & 0.123\\ -4.908108327 & -4.908108327 & 0 & 1.504823667\\ -2.485268762 & -2.485268762 & 0 & 0.973389333\\ -1.874025928 & 1.874025928 & 0 & 0.717673164\end{array}\right.$$

$$\begin{bmatrix}\text{LwingSweep} & \text{RstabIncid} & \text{LstabIncid} & \text{RstabSweep} & \text{RstabSweep}\\ 0.123 & 0 & 0 & 0 & 0\\ -1.504823667 & -0.283979617 & 0.283979617 & 0.002082341 & -0.002082341\\ -0.973389333 & -0.096346716 & 0.096346716 & 0.004206274 & -0.004206274\\ -0.717673164 & 0.003469875 & -0.003469875 & 0.001489608 & -0.001489608\end{bmatrix}$$

$$\left.\begin{bmatrix}\text{VertStabIncid} & \text{RengineIncid} & \text{LengineIncid} & \text{RengineToe} & \text{LengineToe}\\ 0 & 0 & 0 & 0 & 0\\ 0.123631911 & -0.049627079 & 0.049627079 & -0.09203355 & -0.09203355\\ 0.093153893 & -0.028748346 & 0.028748346 & 0.00117209 & 0.00117209\\ -2.1745389 & -0.035500866 & 0.035500866 & 0.001373633 & 0.001373633\end{bmatrix}\right)$$

| | A | B | C | D | E | F | G | H | I | J | K | L | M | N | O | P | Q | R | S | T |
|---|---|---|---|---|---|---|---|---|---|---|---|---|---|---|---|---|---|---|---|---|
| 25 | | | | | | | | | | | | | | | | | | | | |
| 26 | Line Xfer Tool | | | | | | | | | | | | | | | | | | | |
| 27 | | | Line xfer LSMA target locations wrt ERS | | | | 464 | Line xfer tool target nominals wrt line xfer tool drf | | | | 466 | | Line xfer tool orientation wrt ERS at LSMA data acquisition | | | | | 468 | |
| 28 | | | Target Name | A/P X axis Value | A/P Y axis Value | A/P Z axis Value | | Target Name | A/P X axis Value | A/P Y axis Value | A/P Z axis Value | | | X | Y | Z | U | V | W | Error Code |
| 29 | | | tgt 1 | 1600.000 | 300.000 | -100.000 | | tgt 1 | 0.000 | 0.000 | 0.000 | | | 1600.000 | 300.000 | 100.000 | 0.000 | 0.000 | 5.000 | |
| 30 | | | tgt 2 | 1662.386 | 275.344 | -100.000 | | tgt 2 | 60.000 | -30.000 | 0.000 | | | | | | | | | |
| 31 | | | tgt 3 | 1657.157 | 335.115 | -100.000 | | tgt 3 | 60.000 | 30.000 | 0.000 | | | | | | | | | |
| 32 | | | tgt 4 | 1590.038 | 299.128 | -100.000 | | tgt 4 | -10.000 | 0.000 | 0.000 | | | | | | | | | |
| 33 | | | | | | | | | | | | | | | | | | | | |
| 34 | | | | | | | | | | | | | | | | | | | | |
| 35 | | | | | | | | | | | | | | | | | | | | |

FIG. 54

SYSTEM FOR ASSEMBLING AIRCRAFT

CROSS REFERENCE TO RELATED APPLICATIONS

This application is a continuation-in-part of U.S. patent application Ser. No. 11/977,987 filed Oct. 26, 2007 now U.S. Pat. No. 7,917,242, Ser. No. 11/977,986 filed Oct. 26, 2007 now U.S. Pat. No. 7,614,154, Ser. No. 12/002,147 filed Dec. 13, 2007, and 12/104,558 filed Apr. 17, 2008, the contents of which applications are incorporated by reference herein.

TECHNICAL FIELD

This disclosure generally relates to processes for assembling large scale components of structures such as aircraft, and deals more particularly with an automated system for aligning and moving components of the aircraft into final assembly positions, and for determining the cruise orientation of the as-built aircraft

BACKGROUND

The final assembly of large structures such as airplanes is typically performed on a factory floor where large scale components are moved into final assembly positions. In the case of an airplane, fuselage sections, wings and tail assemblies are placed on assembly jacks that are used to locate, align and move the components into their final assembly positions where they are permanently joined together. The processes for locating, aligning and moving the components are less than fully integrated and are performed primarily using manual operations which can introduce variations in final component alignment from airplane-to-airplane.

Slight variations of the final assembly positions of the airplane components from nominal positions may alter the relative orientation of aerodynamically significant features of the airplane such as wings and the vertical stabilizer. The orientation of these aerodynamically significantly features can affect the trimmed cruise configuration of the airplane, sometime also referred to as the "line-of-flight" of the airplane, which is used as a reference to initialize the airplane's electronic flight controls. Because of these variations, the line-of-flight must be established for each airplane, as-built. The process of establishing the line-of-flight for an as-built airplane normally involves estimations that may not completely reflect all variations in component alignment. As a result, flight controls may be required to trim rudder angle in a manner that results in less than maximum cruise efficiency, adding to fuel usage.

Accordingly, there is a need for a system for assembling large scale components of vehicles such as airplanes that is highly automated, improves assembly alignment and provides information relating to the relative orientation of aerodynamically significant feature that may affect the trimmed cruise configuration of the airplane. There is also a need for an assembly system that calculates the optimized trimmed cruise configuration of the as-built airplane, as well as a system for establishing a physical reference monument inside the airplane that represents the calculated cruise orientation.

SUMMARY

Embodiments of the disclosure provide a system for assembling large scale components of vehicles such as an airplane that is highly automated and improves alignment accuracy of the components when joined together. The system employs techniques for automatically locating the positions of aerodynamically significant features of the components which are then used in combination with reference assembly information to control an automated jacking system that moves the components into final assembly alignment. Based on the measured locations of the components, and the final positions of the assembly jacks, the relative locations of aerodynamically significant features of the components are known for the airplane, as-built. This location information may then be used to calculate the cruise configuration of the airplane which reflects "as-built" measurements, rather than estimations of component alignment. The calculated cruise configuration of the airplane may be used to orient a line transfer tool that is used to transfer the calculated cruise configuration into the interior of the airplane where it is permanently recorded in the form of a reference monument.

According to one embodiment, a system is provided for assembling components of an aerospace vehicle comprising: a system for determining the locations of each of the components; an automated jacking system including assembly jacks for moving the components into assembly alignment based on the determined location of the components; and, means for determining the cruise orientation of the aerospace vehicle. The system may further comprise means for transferring the cruise orientation of the aerospace vehicle into a physical reference located inside the aerospace vehicle.

According to a disclosed method embodiment, assembling components of an aerospace vehicle comprises: determining the locations of the components of the aerospace vehicle; moving the components of the aerospace vehicle into assembly alignment using the assembly jacks, including controlling the movements of the assembly jacks based on the determined locations of the components; and, determining the cruise orientation of the aerospace vehicle based on the final assembly locations of the components.

According to another embodiment, a system is provided for moving components of an airplane into assembly alignment, comprising: a jacking system including assembly jacks for supporting and moving components of the airplane into assembly alignment; a measurement system independent of the jacking system for determining locations of a plurality of features of the components of the airplane while the components are supported on the assembly jacks; and, a computer system for determining the relative positions of the components in a coordinate system of the airplane and for controlling the movement of the assembly jacks to bring the components into assembly alignment.

According to another method embodiment, moving components of an airplane into assembly alignment, comprises: determining the initial positions of the components; determining relative positions of the components in a coordinate system of the airplane; determining desired final locations for the components moved from the initial positions and the final locations; automatically determining motion to allow the components to be moved to the final location; automatically determining optimal displacements of assembly jacks to produce the determined motion; and, after the components have been moved, automatically determining the locations of the moved components at a final assembled position.

According to another embodiment, a system is provided for establishing a reference monument inside an aircraft "as-built" representing an optimized line-of-flight for the as-built aircraft, comprising: a system for measuring the relative locations of aerodynamically significant features of the as-built aircraft; a system for calculating the optimum cruise orientation of the as-built aircraft based on the measured locations of the features; and, means for transferring the calculated cruise orientation to the reference monument.

According to another method embodiment, establishing a reference monument inside an aircraft as-built representing an optimized line-of-flight for the as-built aircraft, comprises: measuring the relative locations of aerodynamically significant features of the as-built aircraft; calculating the optimum cruise of the as-built aircraft based on the measured locations of the features; and, transferring the optimum cruise orientation to the reference monument.

Other features, benefits and advantages of the disclosed embodiments will become apparent from the following description of embodiments, when viewed in accordance with the attached drawings and appended claims

BRIEF DESCRIPTION OF THE ILLUSTRATIONS

FIGS. 28-30 are screen shots of an illustrative implementation of computing assembly jack locations to align parts for assembly.

FIGS. 38, 41, 43, and 46 are flowcharts of an illustrative method for predicting cruise orientation.

FIGS. 39, 40, 42, 44, 45, 47, 48, and 49 illustrate aspects of predicting cruise orientation.

Figure 50:
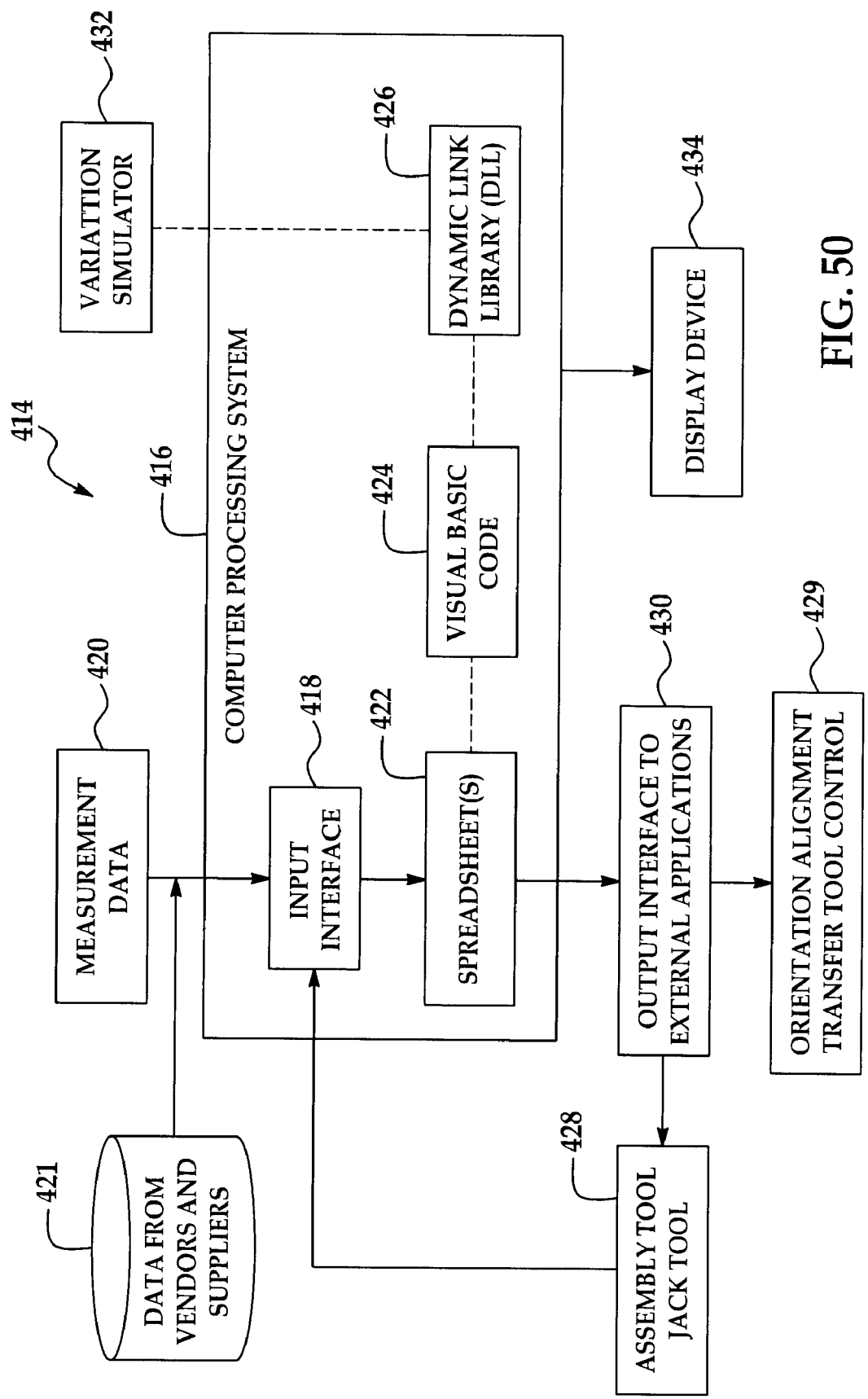

FIG. 50 is a block of an illustrative system for computing assembly jack locations to align parts for assembly, computing orientation alignment transfer tool locations, and predicting cruise orientation.

FIGS. 51-55 are screen shots of an illustrative implementation of computing orientation alignment transfer tool locations.

Figure 56:
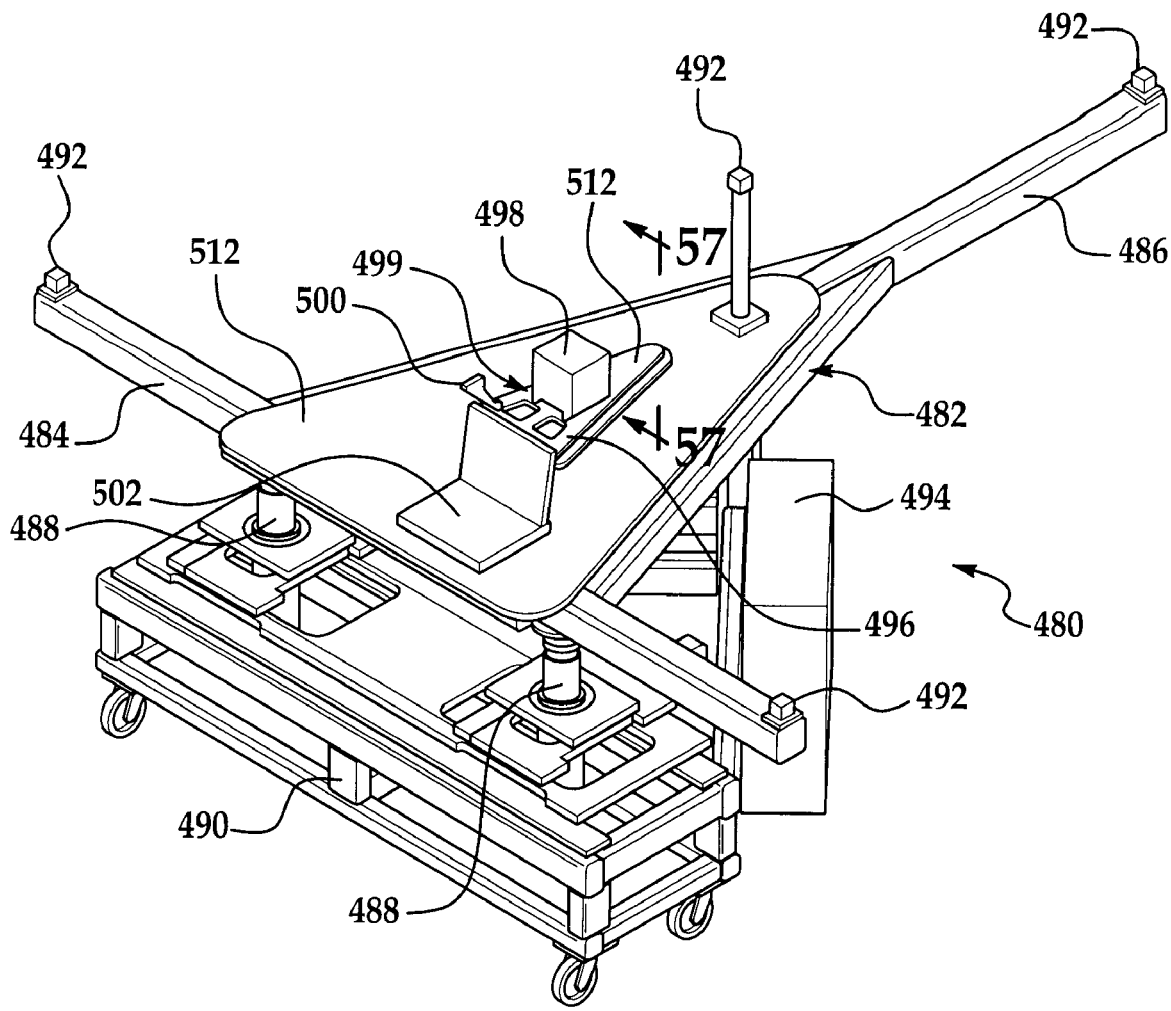

FIG. 56 is a perspective view of a tool used in calculating and transferring a line-of-flight into an airplane.

Figure 57:
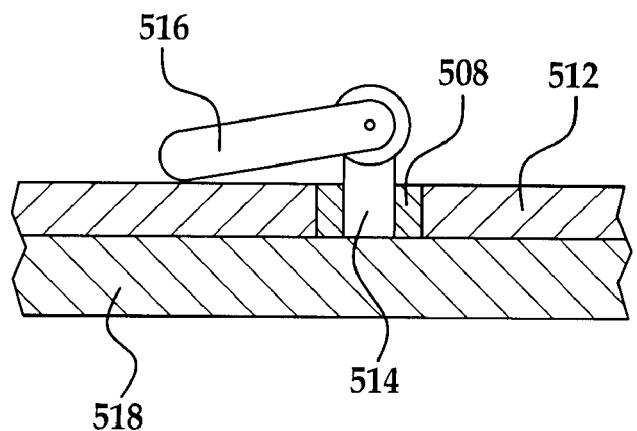

FIG. 57 is a cross sectional view taken along the line 57-57 in FIG. 56.

Figure 58:
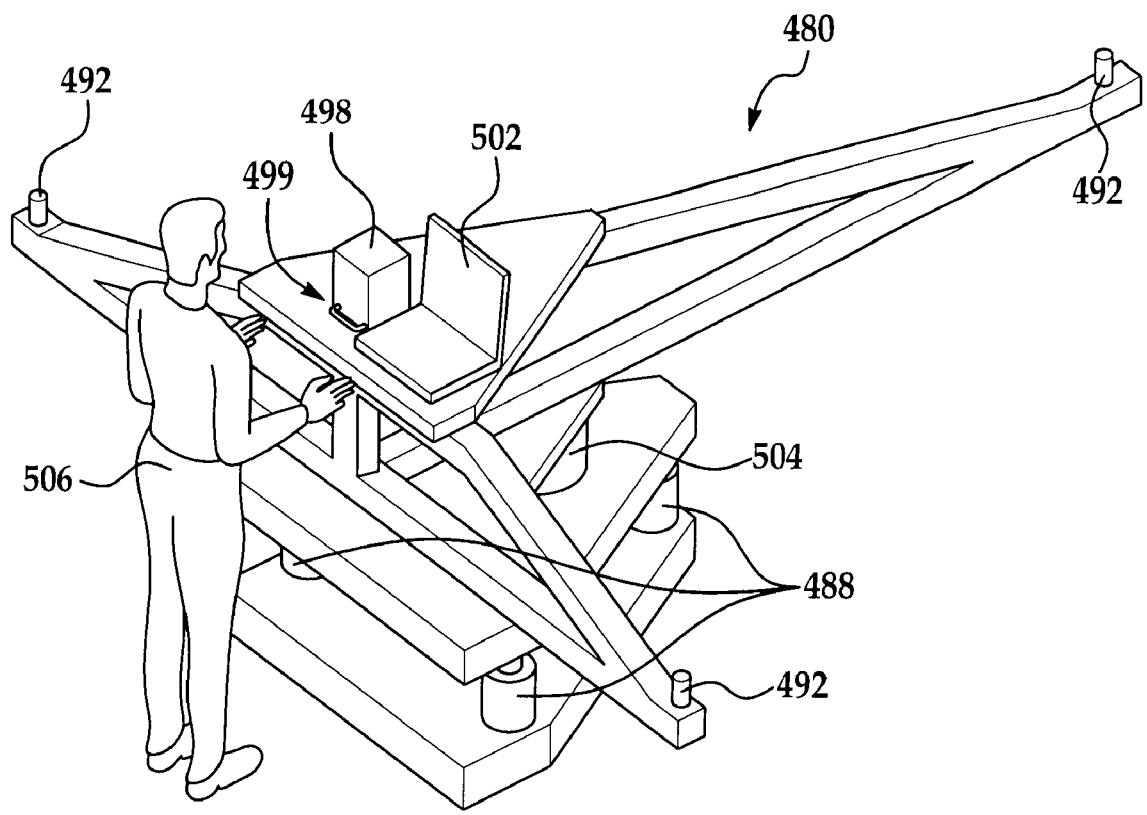

FIG. 58 is a perspective view of the tool shown in FIG. 56, better illustrating servo motors used to orient the tool reference surface.

Figure 59:
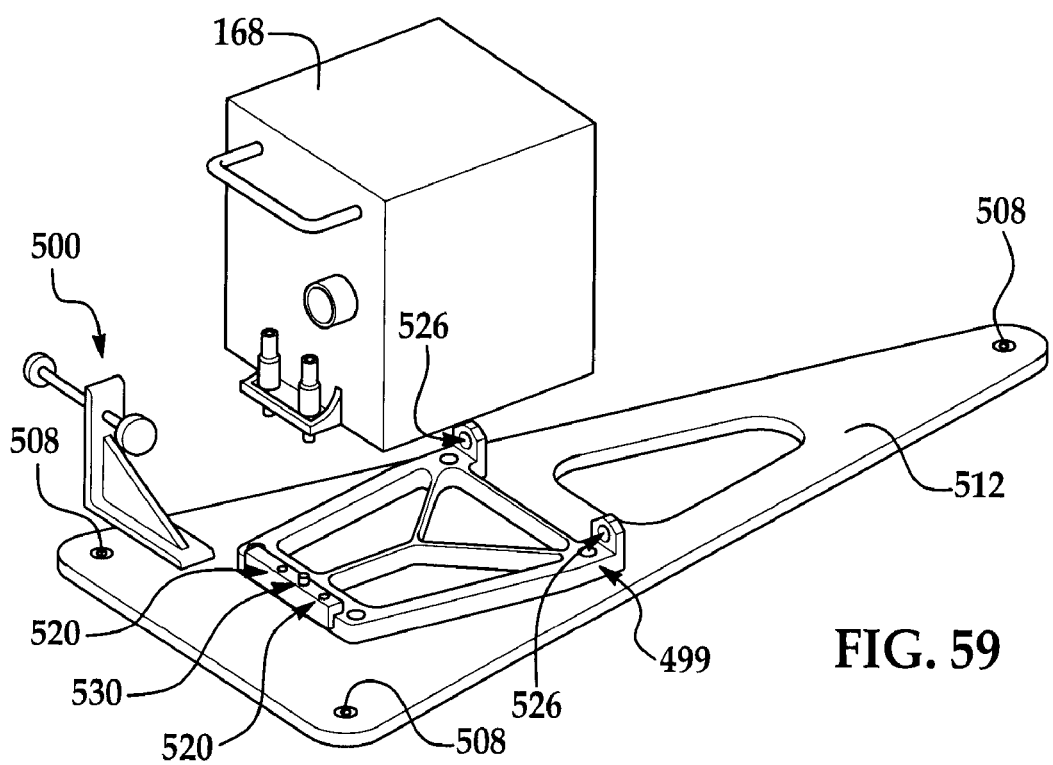

FIG. 59 is an exploded, perspective view showing details of the tool reference surface and inertial reference unit.

Figure 60:
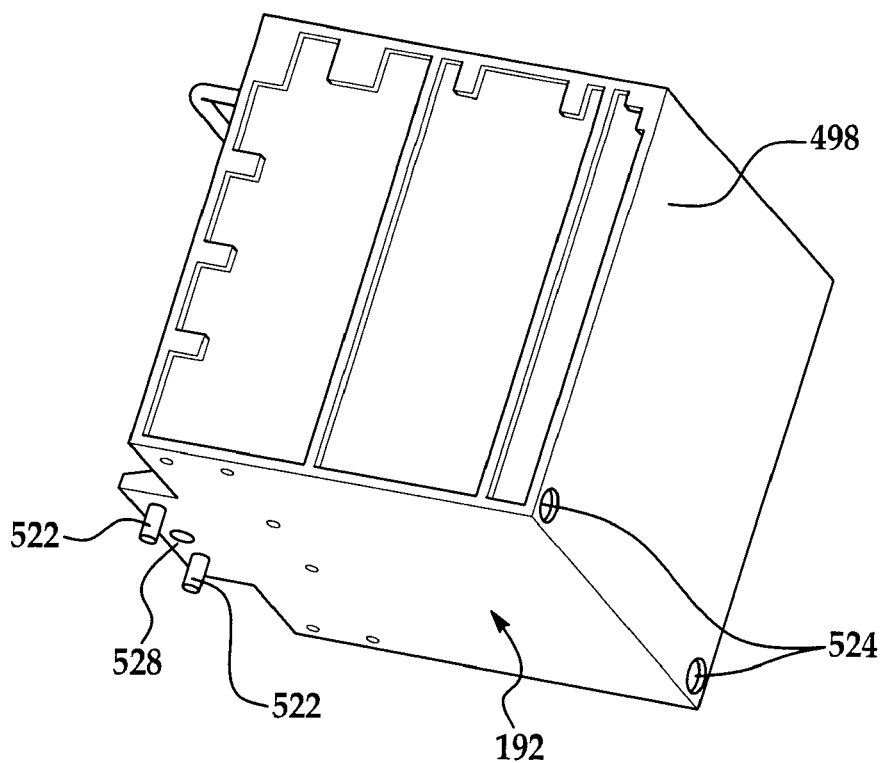

FIG. 60 is a perspective view of the inertial reference unit.

Figure 61:
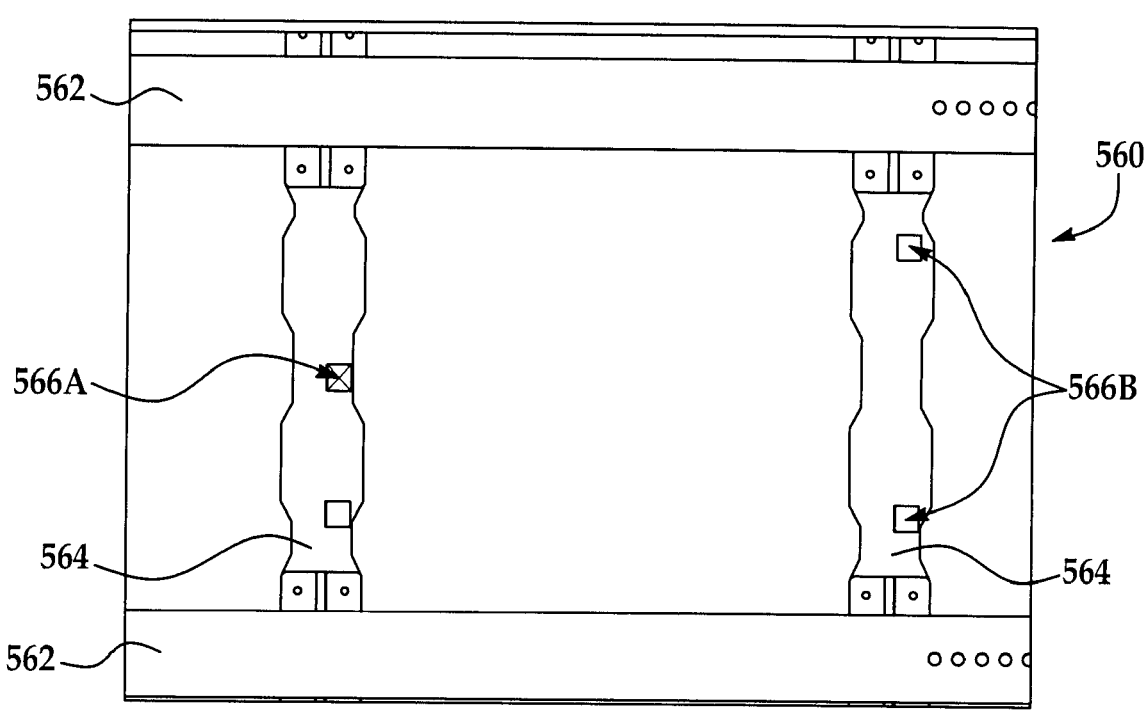

FIG. 61 is a plan view of a portion of an airframe, and illustrating mounting points for the tool reference surface.

Figure 62:
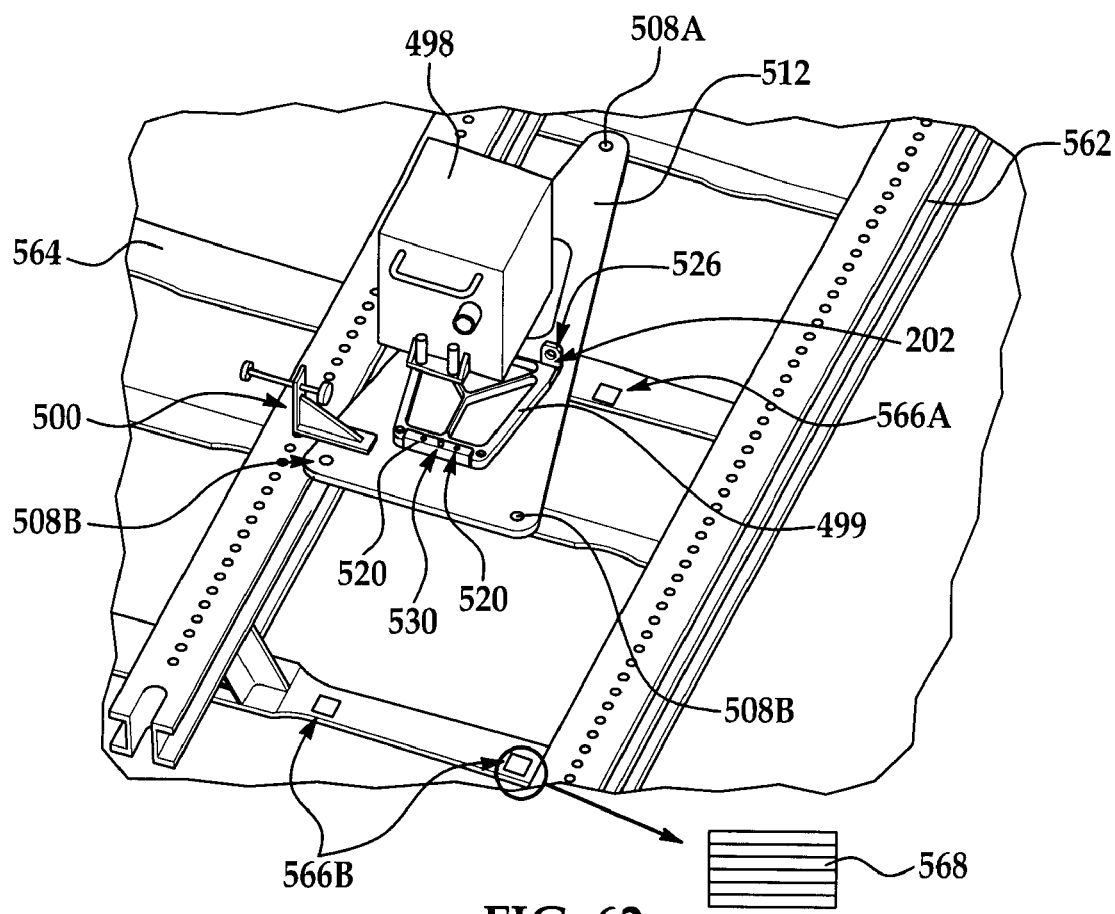

FIG. 62 is an exploded, perspective view of the tool reference surface relative to its mounted position on the airframe.

Figure 63:
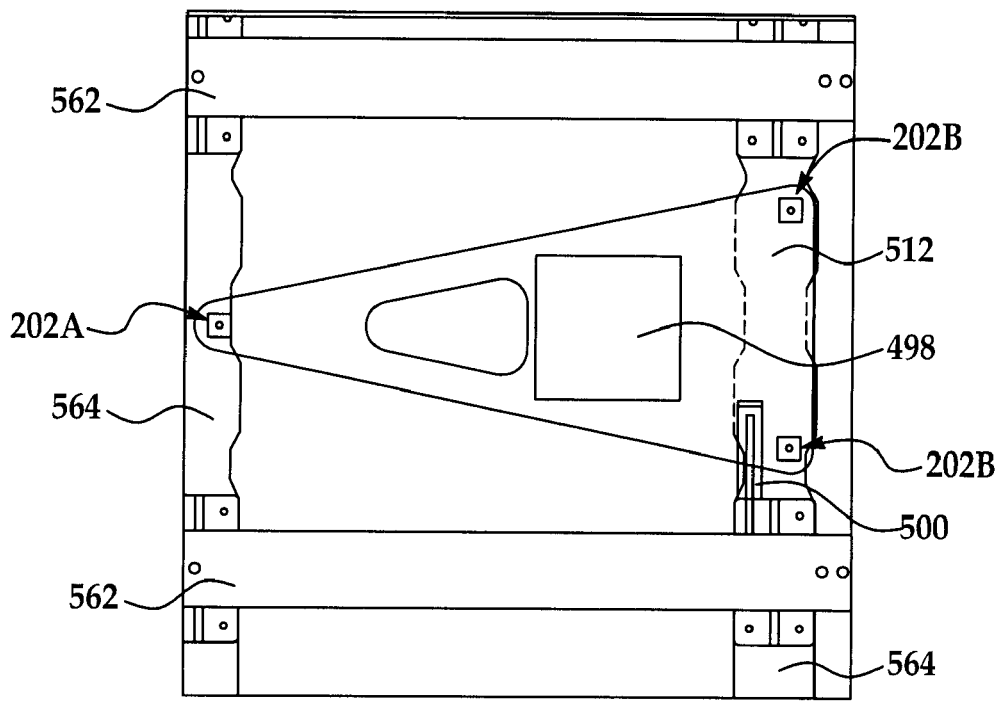

FIG. 63 is a view similar to FIG. 61, but illustrating the tool reference surface mounted on the airframe.

Figure 64:
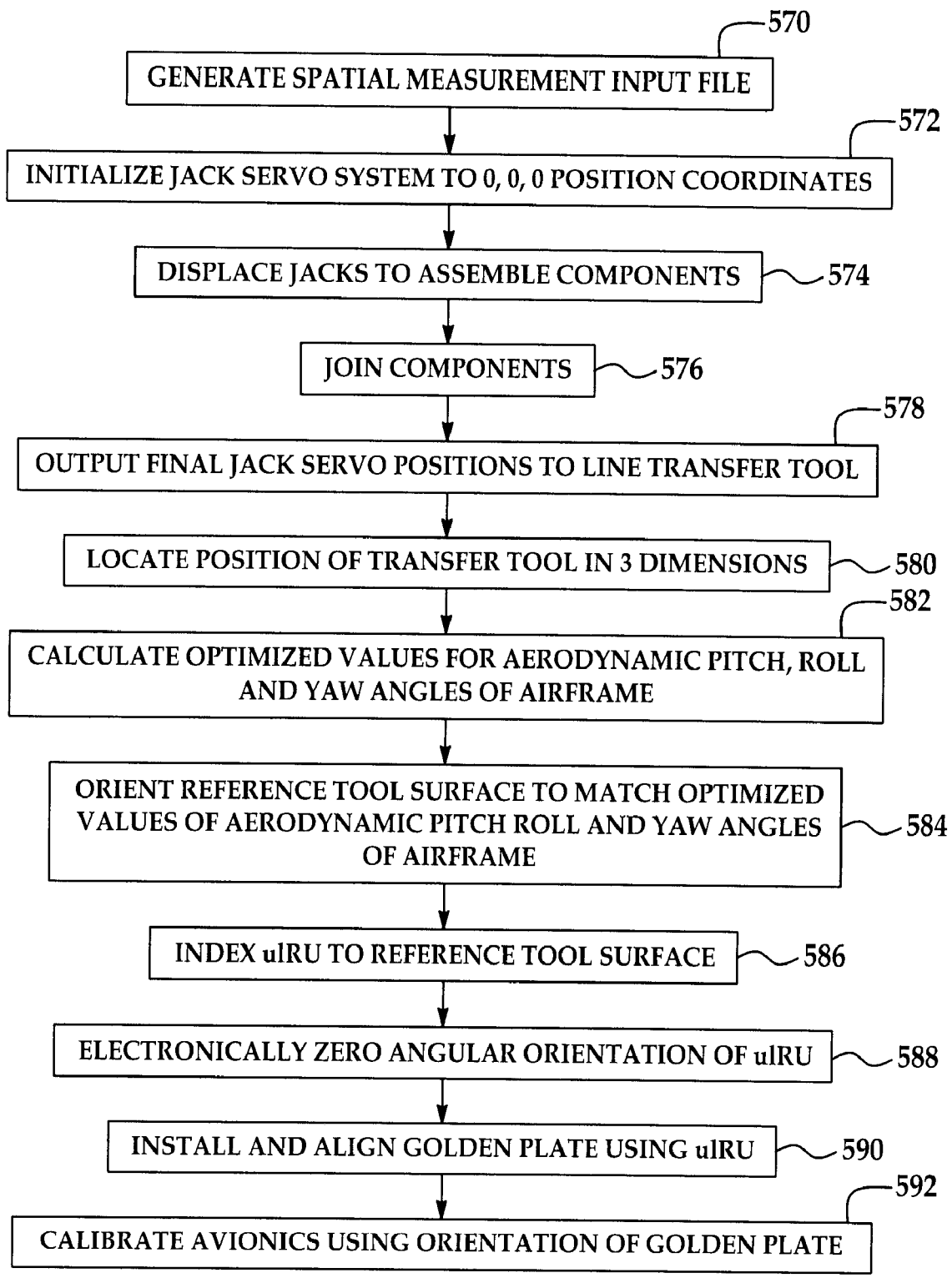

FIG. 64 is a flow diagram illustrating a method for calculating and transferring the line-of-flight into the airplane.

Figure 65:
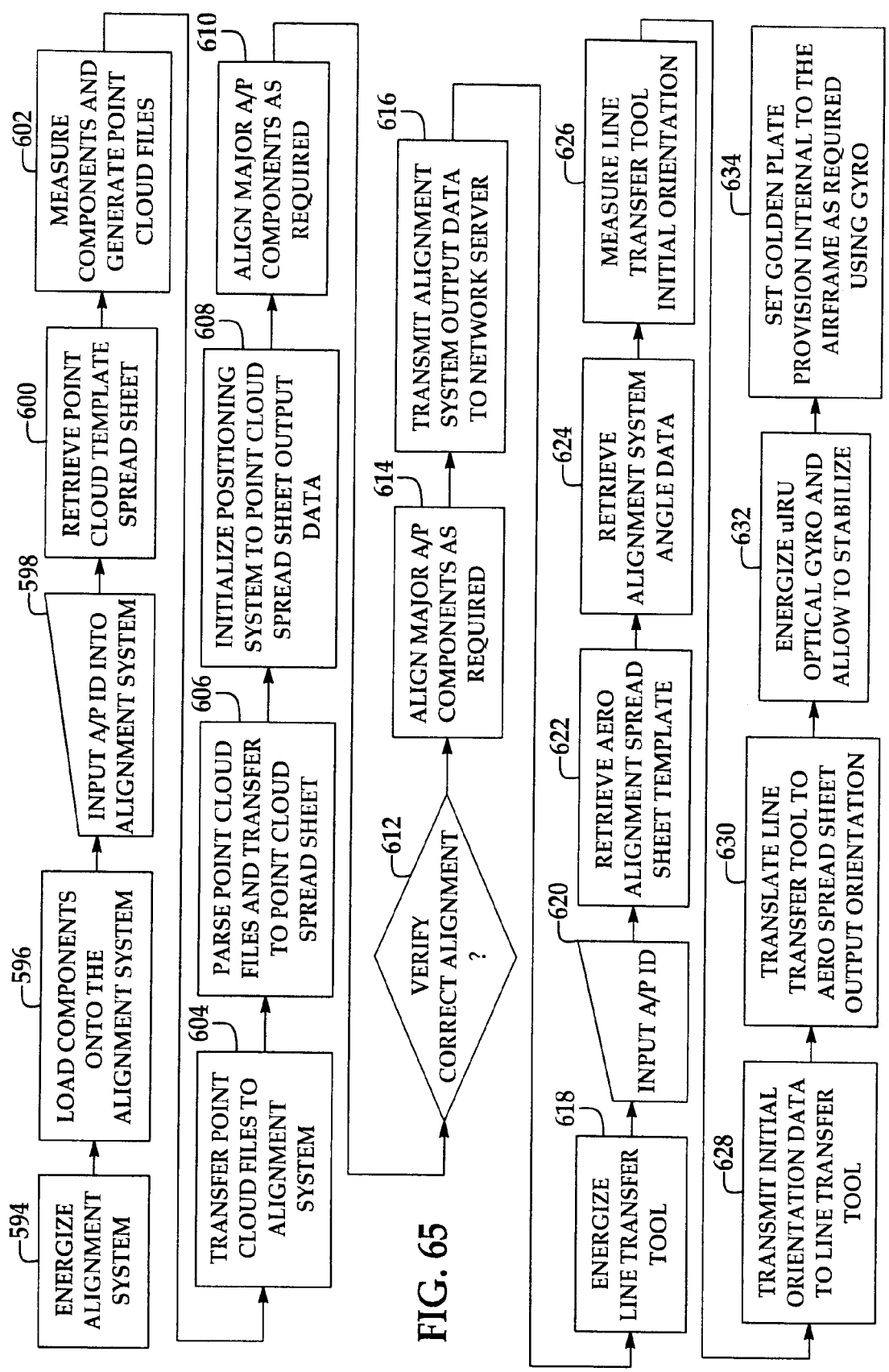

FIG. 65 is a flow diagram showing additional details of the method.

Figure 66:
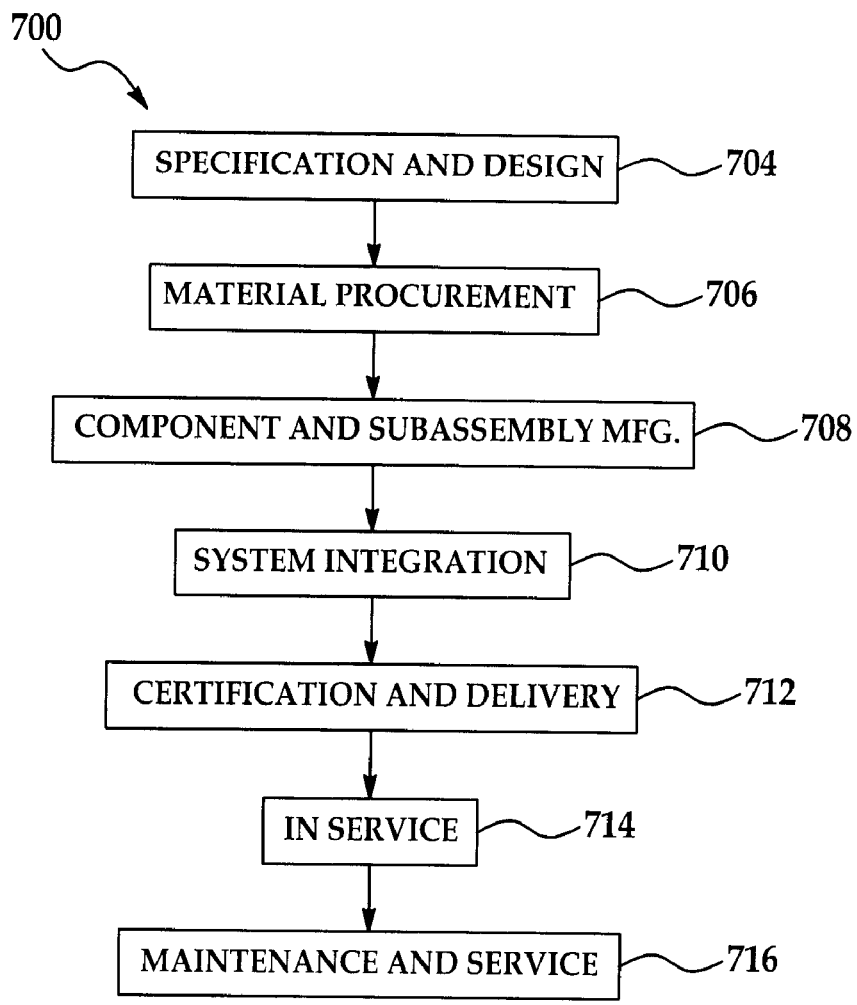

FIG. 66 is a flow diagram of aircraft production and service methodology.

Figure 67:
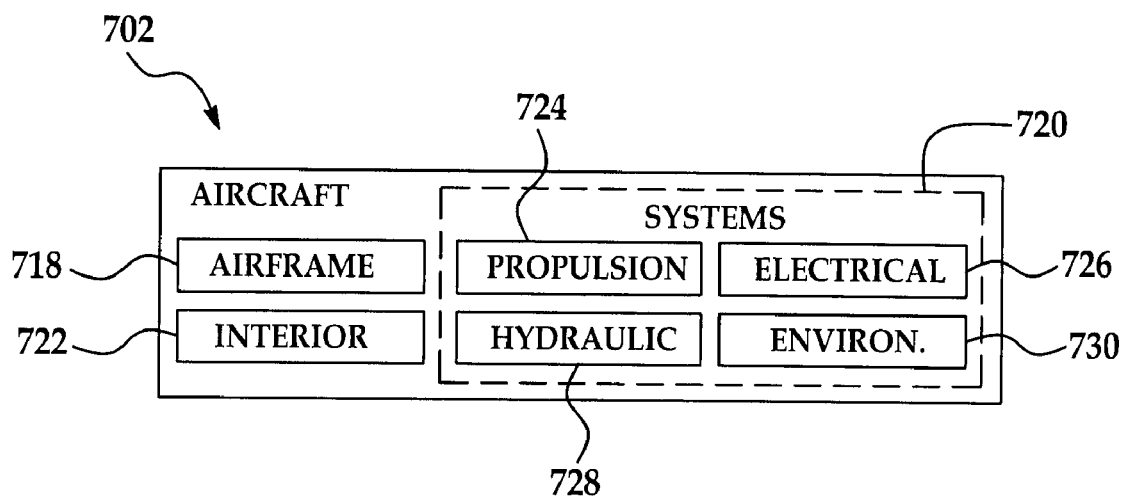

FIG. 67 is a step diagram of an aircraft.

DETAILED DESCRIPTION

Figure 1:
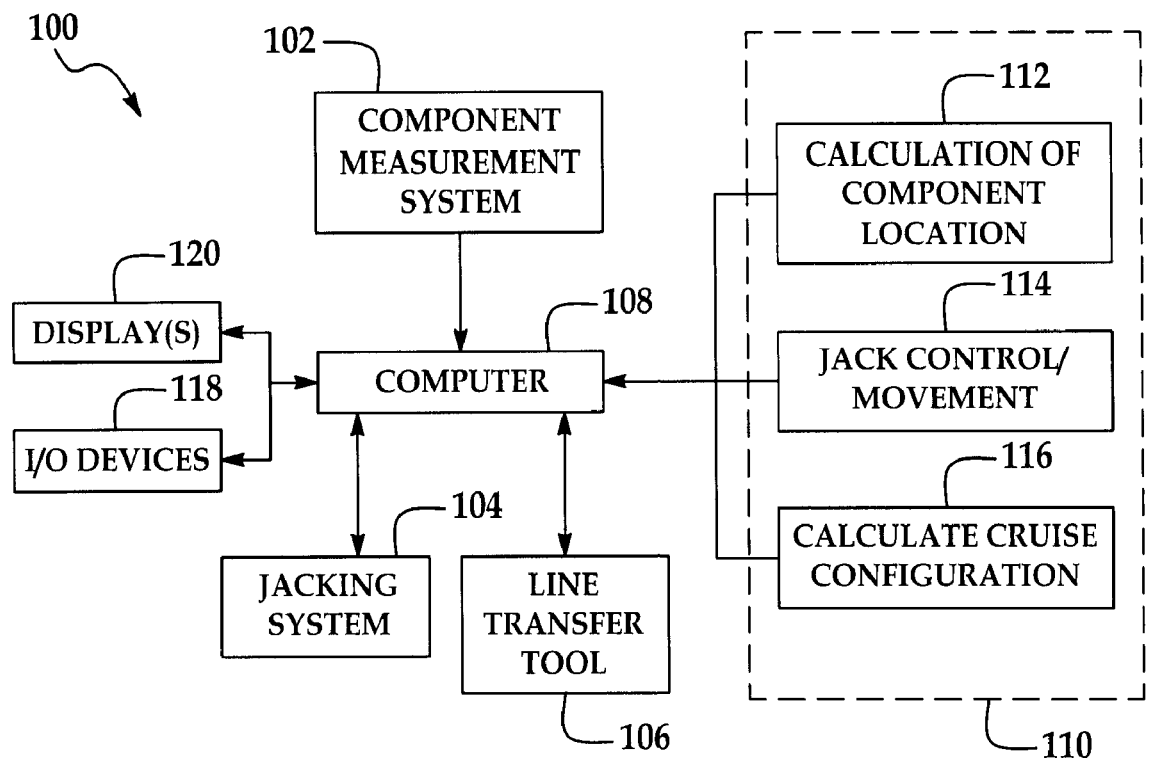
FIG. 1 is a block diagram of a system for assembling vehicles such as aircraft.

Referring first to FIG. 1, a system generally indicated by the numeral 100 may be used in connection with the assembly of large scale components for vehicles, such as the wings, tail assembly, and fuselage sections of an airplane. The system 100 broadly includes a component measurement system 102, a jacking system 104 and a line transfer tool 106, all operatively coupled with and controlled by a computer system 108 which may comprise one or more processing units. The computer system 108 may have one or more input/output devices 118 as well as one or more displays 120. The computer system 108 may employ software programs 110 that may include one or more software modules, such as a module 112 for calculating the location of the components, module 114 for calculating the position of jacks and controlling their movement, and module 116 for calculating the cruise configuration of the airplane.

As will be discussed below in more detail, the component measurement system 102 performs non-contact measurement of various features of each of the components in order to determine their location within a three dimensional coordinate system common to the jacking system 104 and the line transfer tool 106.

The jacking system 104 includes a plurality of automatically controlled, later discussed assembly jacks that support and move the components into final assembly alignment. The line transfer tool 106 functions to transfer the calculated cruise configuration of the airplane into the interior of the airplane where it is permanently recorded in a reference monument that may then be used to initialize and/or calibrate electronic flight controls on the airplane.

Figure 2:
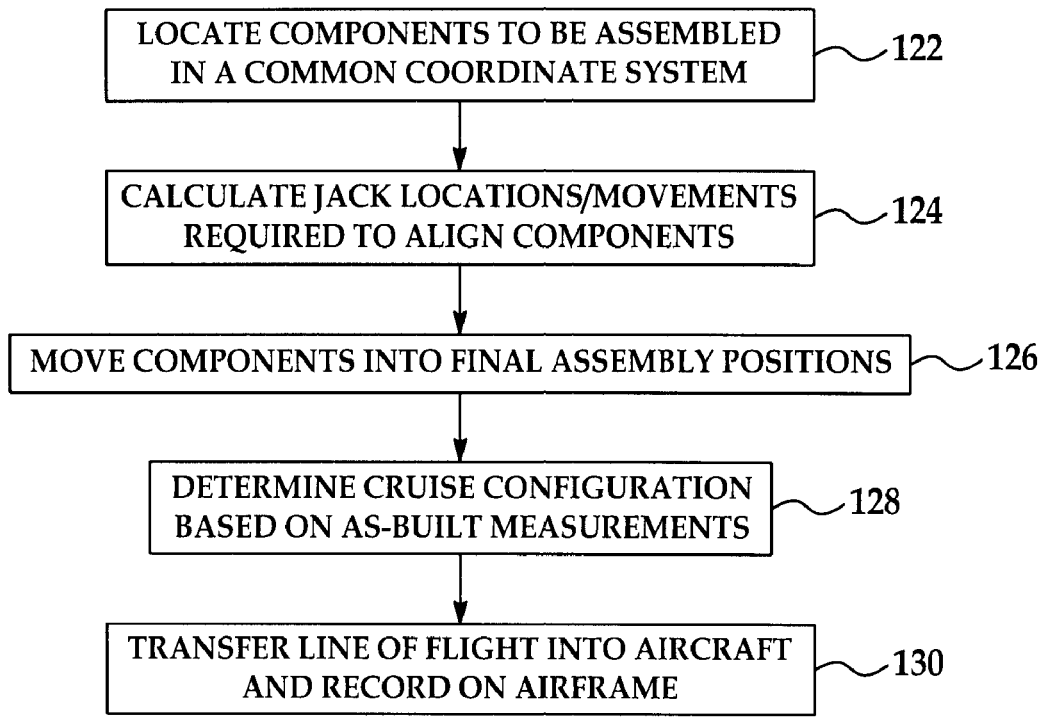
FIG. 2 is a flow diagram illustrating a method for assembling vehicles such as aircraft.

Referring now also to FIG. 2 the system 100 may be used in connection with a method for assembling flight scale components of a vehicle such as an airplane. The method begins at 122 in which components of the airplane are located in a common, three dimensional coordinate system. The components are located using feature position measurements performed by the component measurement system 102.

Next, at step 124, the positions of assembly jacks are located and the jack movements required to align the components are calculated, based on the current positions of the assembly jacks, and the locations of the components determined in step 122.

At step 126, the components are moved into their final, aligned assembly positions, based in part on the assembly jack movements calculated at 124. Once the components have been moved into their final assembly positions in the desired alignment, the components are joined together, thereby fixing the relative orientations of aerodynamically significant features of the components.

Next, at step 128, the cruise configuration of the airplane is calculated, based on the "as-built" measurements of the components, which may also include the locations of the assembly jacks.

Finally, at step 130, the line-of-flight or cruise configuration of the airplane calculated at step 128 is transferred into the interior of the airplane where it is recorded as a physical monument, using the line transfer tool 106.

Measuring Location of Components

Figure 3:
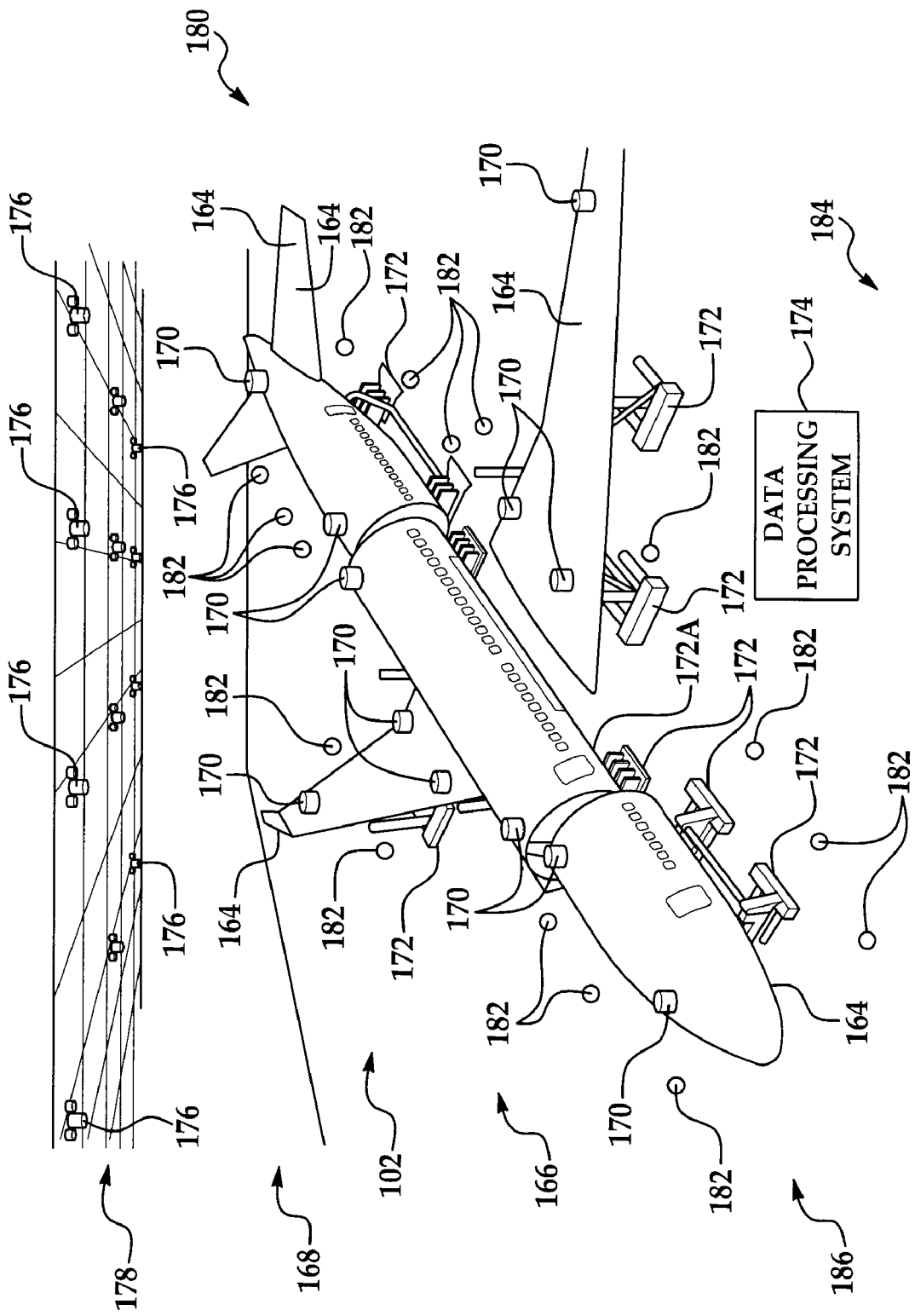
FIGS. 3 and 4 are perspective views in partial schematic form of an illustrative system for a locating components of a structure.
Figure 4:
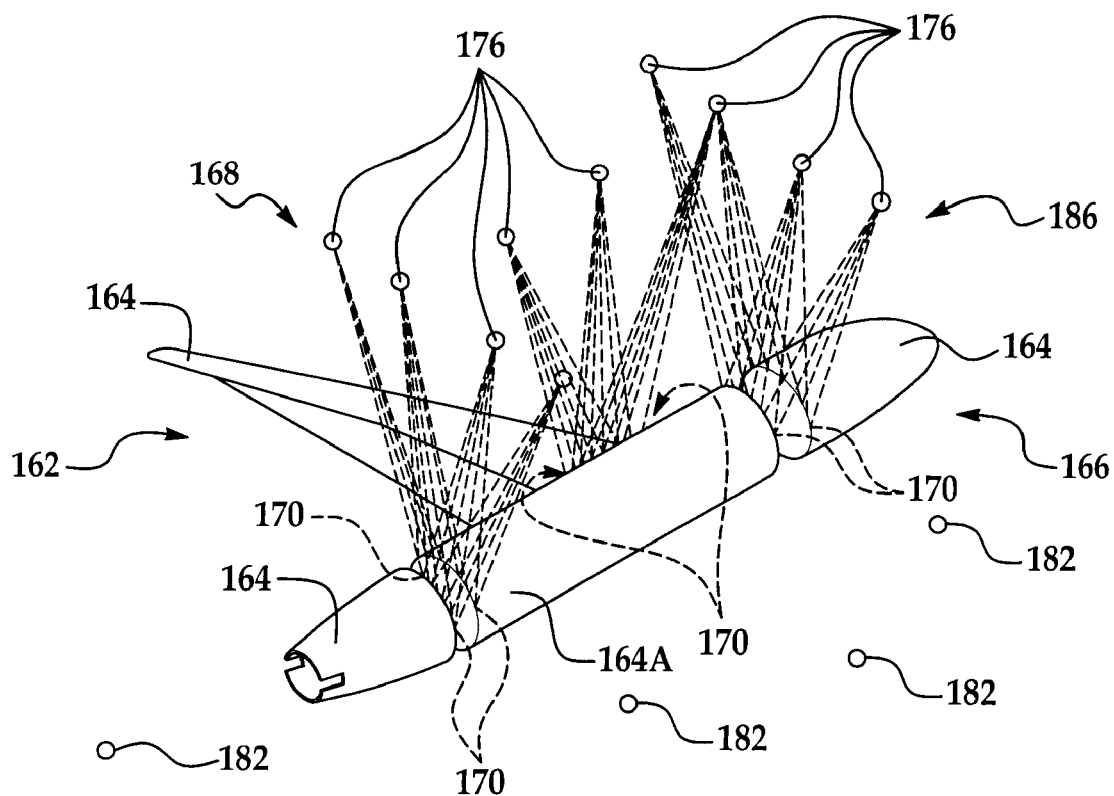
Figure 5:
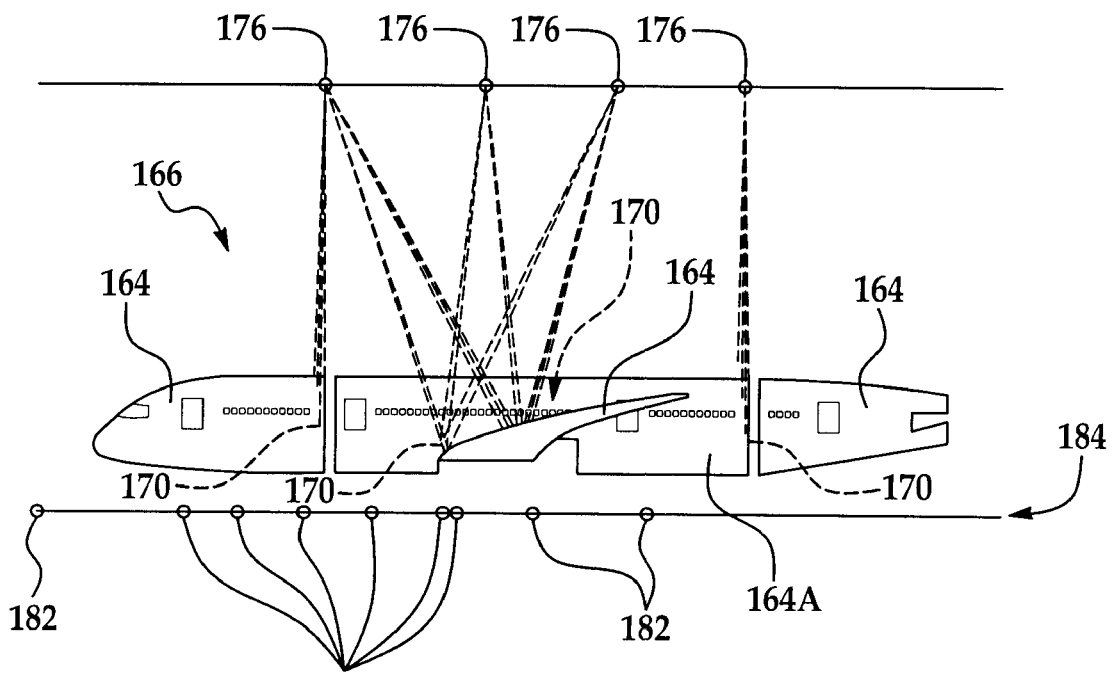
FIG. 5 is a side view in partial schematic form of the illustrative system of FIGS. 3 and 4.

By way of overview and referring to FIGS. 3, 4, and 5, an illustrative system 102 locates the position of components 164 of a structure 166, which in the illustrated example is an airplane. The measurement system 102 is configured to simultaneously determine locations of features 170 of the components 164 that are disposed in tooling 172. The measurement system 102 is located separate from the tooling 172. A data processing system 174, which may form part of the computer 108 (FIG. 1) is configured to determine relative positions of the components 164 in a coordinate system of the structure 166.

Still referring to FIGS. 3, 4, and 5, the components 164 can be fuselage sections, wings, and the like. However, it will be appreciated that the structure 166 is not intended to be limited to commercial aircraft, but may be other kinds of aircraft, such as without limitation any kind of civilian or military aircraft or spacecraft. Moreover, the structure 166 is not limited to aircraft or spacecraft. For example, the structure 166 can be other types of vehicles, such as land vehicles, including automobiles, trucks, recreational vehicles, and the like, and maritime vessels such as ships and submarines. Moreover, the structure 166 could also be stationary structures, such as buildings. Thus, the structure 14 may be any of various types of structure that may benefit from accurate assembly of components.

The structure 166 may define its own coordinate system. In one illustrative embodiment, the components 164 each define holes (not shown) in predetermined locations that have known coordinates in the coordinate system of the structure 166. Given by way of example and not of limitation, the holes (not shown) can be determinant assembly holes defined in the components 164, such as fuselage sections and wings.

The components 164 are disposed in the tooling 172. In one illustrative embodiment, one of the components 164A may be a central fuselage section of an airplane that is rigidly supported in place on tooling 172A. That is, the central fuselage section is stationary and remains fixed in place on tooling 172A that is stationary and remains fixed in place. The other tooling 172 is movable such that the components 164 can be moved to the component 164A. In this embodiment, the structure 166 is assembled by moving the components 164 to the component 164A. In some other embodiments, one of the components that can be located includes a gyroscope (that is mounted on movable tooling in the assembly area) which will be re-located inside a vehicle, such as an airplane.

Referring to FIG. 3, the measurement system 102 includes a constellation of transmitters 176 that are mounted near a roof 178 of a manufacturing facility 180. Positions of the transmitters 176 are determined by triangulation relative to reference targets 182 that are placed in a floor 184 of an assembly area 186, such as a work cell, of the manufacturing facility 180 in predetermined positions that are known in a coordinate system of the assembly area 186. Once the position of the transmitters 176 is known, positions of the features 170, such as targets, can be determined relative to the position of the transmitters 176.

In one illustrative embodiment, the measurement system 102 may comprise an indoor global positioning system or infrared global positioning system (both referred to herein as IGPS). Suitable IGPS components and systems are available from Metris USA of Dulles, Va. In such an embodiment, the transmitters 176 are infrared transmitters. Each of the transmitters 176 has a footprint (not shown) on the floor 184 that is nominally an "hourglass" shape. The transmitters 176 and the targets 170 on the components 164 are placed such that the transmitters 176 have unimpeded line-of-sight to the targets 170 on the components 164. Moreover, each target 170 should "see" at least four transmitters 176. Further, some of the transmitters 176 can serve multiple measurements zones. Thus, locations of the transmitters 176 can be selected to be optimized for certain targets 170 or groups of targets 170.

Figure 6:
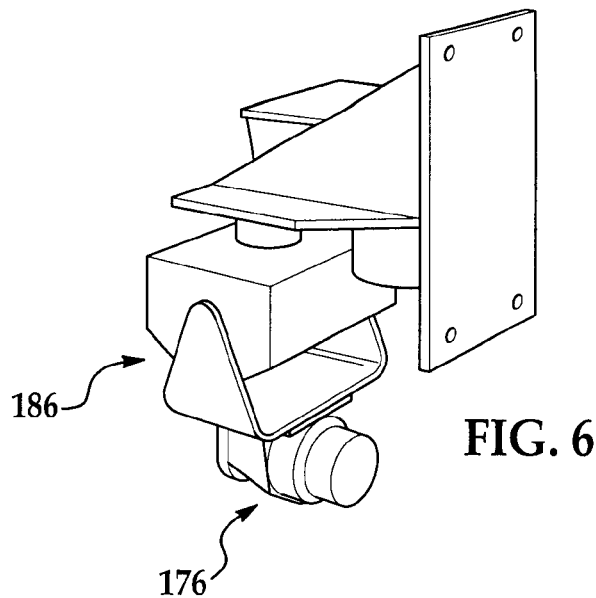
FIG. 6 is a perspective view of an illustrative transmitter of the system of FIGS. 3, 4, and 5.

As shown in FIG. 6, the transmitters 176 are held on articulating mounts 188. Each articulating mount 188 provides the capability to articulate the transmitter 176 mounted thereon in azimuth and elevation to optimize measurement geometry and to aim the transmitters 176 to areas of interest as desired.

Figure 7:
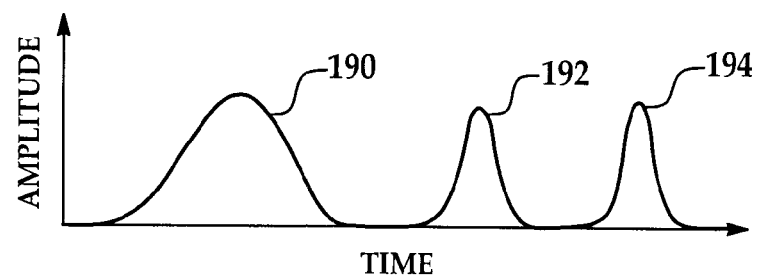
FIG. 7 illustrates signals produced by the transmitter of FIG. 6.

Referring additionally to FIG. 7, in one embodiment the transmitter 176 produces a strobe 190 followed by a pulse 192 and a pulse 194 while the transmitter 176 is operating. A time difference between detection of the pulse 192 and the pulse 194 at the targets 170 or the reference targets 182 corresponds to elevation. A time difference between detection of the strobe 190 and an average of the pulses 192 and 194 at the targets 170 and the reference targets 182 corresponds to azimuth.

Referring back to FIGS. 3, 4, and 5, the reference targets 182 provide reference locations for the measurement system 102. The reference targets 182 are used to determine locations and orientations of the transmitters 176 and to provide a distance scale for the measurement system 102. The reference targets 182 can also be used to subtract any motion of the transmitters 176, such as motion due to vibrations of the manufacturing facility 180, from the measurement environment in real time. In addition, buildings can also move from solar/thermal changes and from wind loading.

The reference targets 182 are linked to the coordinate system of the assembly area 186. That is, the reference targets 186 are placed in predetermined locations that are known in the coordinate system of the assembly area 186. The coordinate system of the assembly area 186 typically closely approximates the coordinate system of the structure 166 (although such close approximation is not required). Additionally, distances are known between all of the reference targets 182. Thus, the reference targets 182 also provide a distance scale for the measurement system 102.

The reference targets 182 are placed in or on the floor 184 of the manufacturing facility 180 about to the components 164 to enclose the assembly area 28. If desired, the reference targets 182 and the floor 184 can incorporate features, such as male and female members, to help ensure accurate and repeatable placement of the reference targets 182. Additionally, the reference targets 182 are placed such that each of the transmitters 176 "sees" at least four of the reference targets 182. Some of the reference targets 182 can serve multiple measurements zones.

Each of the reference targets 182 can be an active target, such as an infrared (IR) detector. Each of the targets 182 thus act like a photocell and generates a signal in response to detection of the strobe 190, the pulse 192, and the pulse 194. IR detectors are known in the art, and a discussion of their construction and operation is therefore not necessary here.

Figure 8:
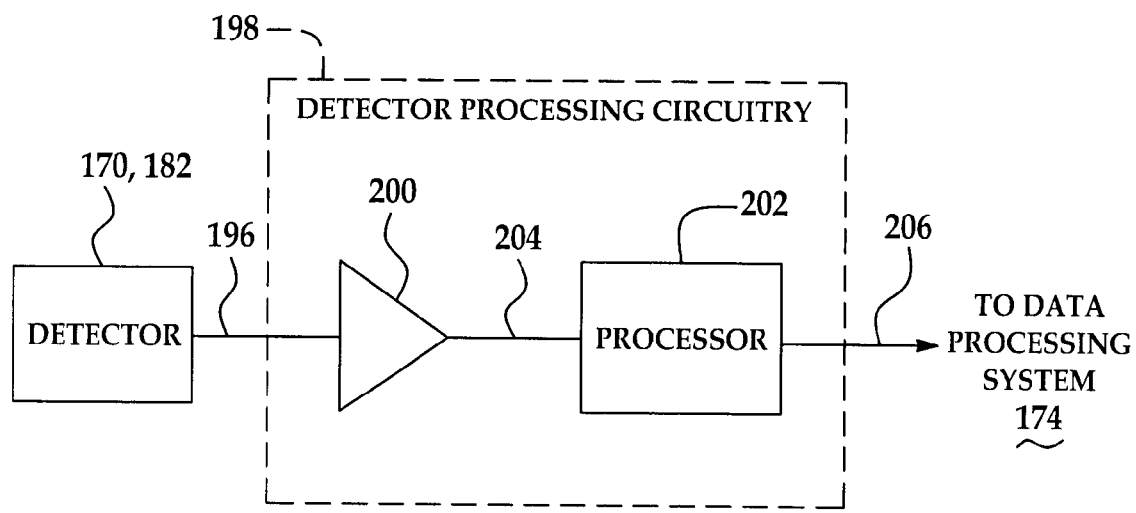
FIG. 8 is a block diagram of illustrative detector processing circuitry.
Figure 9:
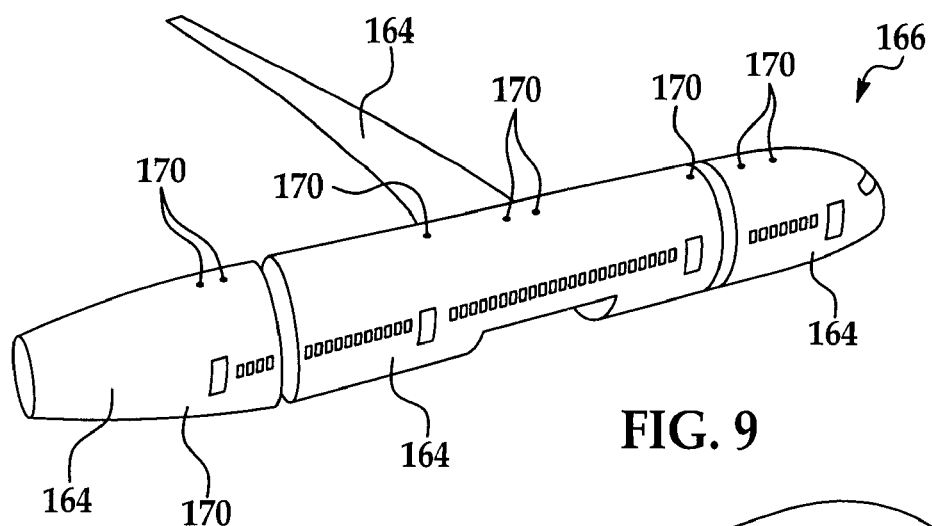
FIG. 9 is a perspective view of components of a structure and detectors disposed thereabout.
Figure 10:
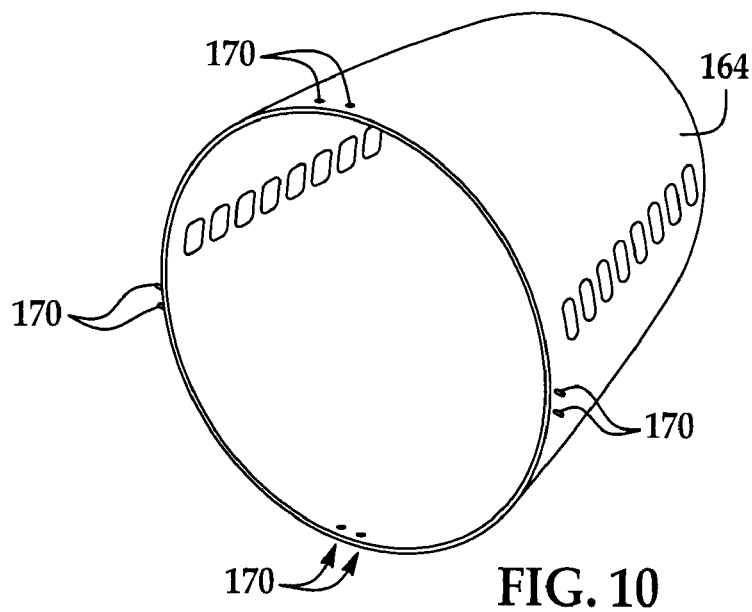
FIG. 10 is a perspective view of details of one of the components and detectors disposed thereabout of FIG. 49.

Referring now to FIG. 8, when embodied as an IR detector each of the targets 170 and the reference targets 182 generates an analog signal 196 indicative of the strobe 190, the pulse 192, and the pulse 194. Each target 170 and reference target 182 is coupled to provide its analog signal 196 to detector processing circuitry 198 associated with the target 170 or the reference target 182, as the case may be.

Each detector processing circuitry 198 includes a differential amplifier 200 and a processor 202. The differential amplifier 200 receives the analog signal 196, amplifies the analog signal 196, and outputs an amplified analog signal 204. The differential amplifier 200 may be any suitable differential amplifier known in the art.

The processor 202 receives the amplified analog signal 204 from the differential amplifier 200. The processor 202 performs an analog-to-digital (A/D) conversion of the amplified analog signal 204, processes the digitized signal to extract timing information, and converts the timing information into azimuth and elevation angles as described above. The processor 202 outputs to the data processing system 174 a digital signal 206 indicative of the azimuth and elevation information. The processor 202 may be any processor known in the art, such as without limitation a Metris indoor GPS position calculation engine part number 200831.

Referring now to FIGS. 3, 4, 5, 9, and 10, the features 170 that are located by the measurement system 102 suitably are embodied as active targets, such as IR detectors. Like the reference target 182 and referring additionally to FIG. 7, the target 170 also acts like a photocell and generates a signal in response to detection of the strobe 190, the pulse 192, and the pulse 194. IR detectors are known in the art, and a discussion of their construction and operation is not necessary for an understanding. As discussed above, each target 170 provide its analog signal 196 to detector processing circuitry 198 associated with the target 170.

The targets 170 are disposed about the components 164 in predetermined locations that are known according to the coordinate system of the structure 166. In one non-limiting embodiment, the components 164 are components of an airplane and have multiple holes, referred to as determinant assembly holes, that are defined in predetermined locations. Thus, in some embodiments, the targets 170 are placed in predetermined locations as desired by being placed in determinant assembly holes.

One or more of the targets 170 can be placed at any location on the component 164 to yield location information, such as ultimately defining a slip plane, as desired. For example, placement of one target 170 at one location on the component 164 can yield location information regarding a point in space. When three of the targets 170 are used on the component 164, six degrees of freedom can be measured. That is, the location of component 164 in space is known while the component 164 can be laterally translated three ways and can be twisted three ways. Placement of two of the targets 170 at any location on the component 164 can yield location information regarding a line (five degrees of freedom are known). The position of the component 164 can be located as it moves in space with exception of any rotation of the component 164 about the line itself.

Referring now to FIGS. 3 and 8, the detector processing circuitry 198 and the data processing system 174 are operatively coupled by wires, cables, or wireless coupling members, as desired. The data processing system 174 includes one or more computer processors, microprocessors, and the like, as desired, for determining relative positions of the components 164 in the coordinate system of the structure 166, such as by converting azimuth and elevation information in the coordinate system of the assembly area 186 received via the signals 206 into coordinates in the coordinate system of the structure 166.

In some other embodiments, the measurement system 16 can be a photogrammetry system. In such embodiments, the transmitters 176 include flash-emitting devices. The flash-emitting devices generate the strobe 190, the pulse 192, and the pulse 194. The targets 170 and the reference targets 182 are passive reflectors that reflect the strobe 190, the pulse 192, and the pulse 194 back toward the flash-emitting device. A camera, such as a digital camera employing a charge-coupled device (CCD), that is associated with the flash-emitting device is co-located with the flash-emitting device. The camera outputs the signal 196 to the processing circuitry 198. Other details remain the same and need not be repeated here.

Referring additionally now to FIGS. 11-14, a method 208 locating components of a structure begins at 210. At 212, locations of components of a structure are simultaneously determined. At 214, relative positions of the components are determined in a coordinate system of the structure. The method 208 ends at 216. Details of processing steps of the method 208 will be discussed below.

Figure 12:
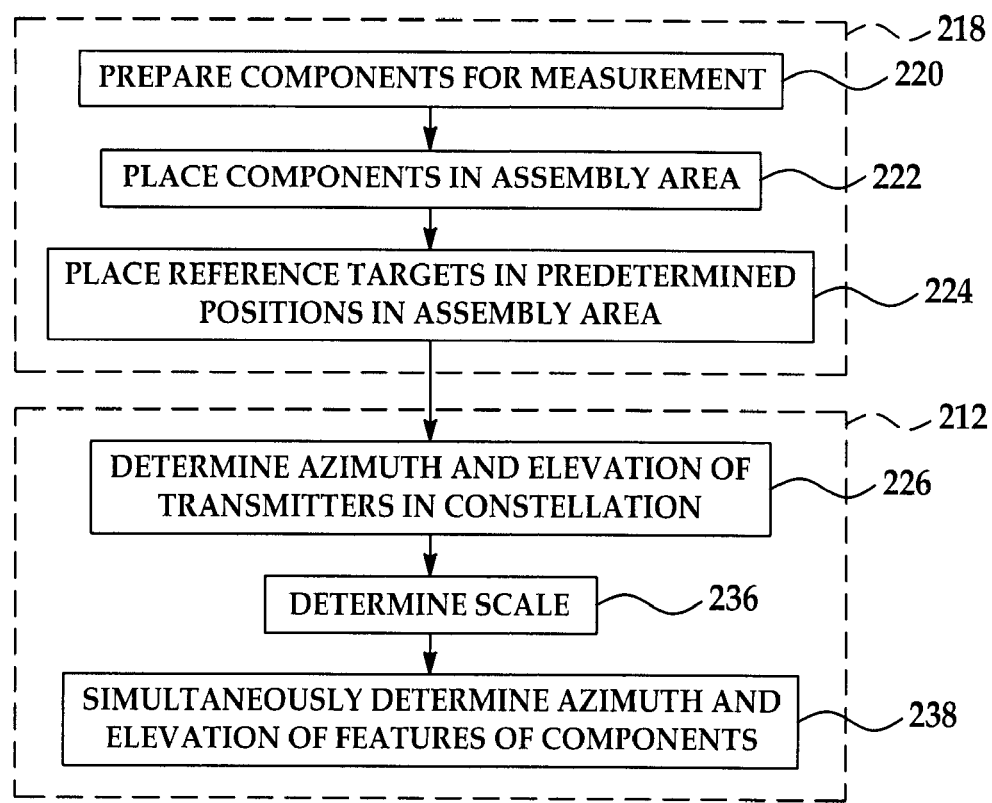
FIGS. 12-14 are flowcharts of details of processing steps of the method of FIG. 11.

As shown in FIG. 12, at 218, preparations are made for measurement. Within step 218, at 220 the components 164 are prepared for measurement. The targets 170 are placed about the components 164 in predetermined locations as described above, such as by being placed in determinant assembly holes (or at positions with locations known from the determinate assembly holes). At 222, the components 164 that have been prepared according to step 218 are placed in the assembly area 186. At 224 the reference targets 182 are placed in predetermined positions in the assembly area 186. The predetermined positions are known in the coordinate system of the assembly area 186.

Figure 13:
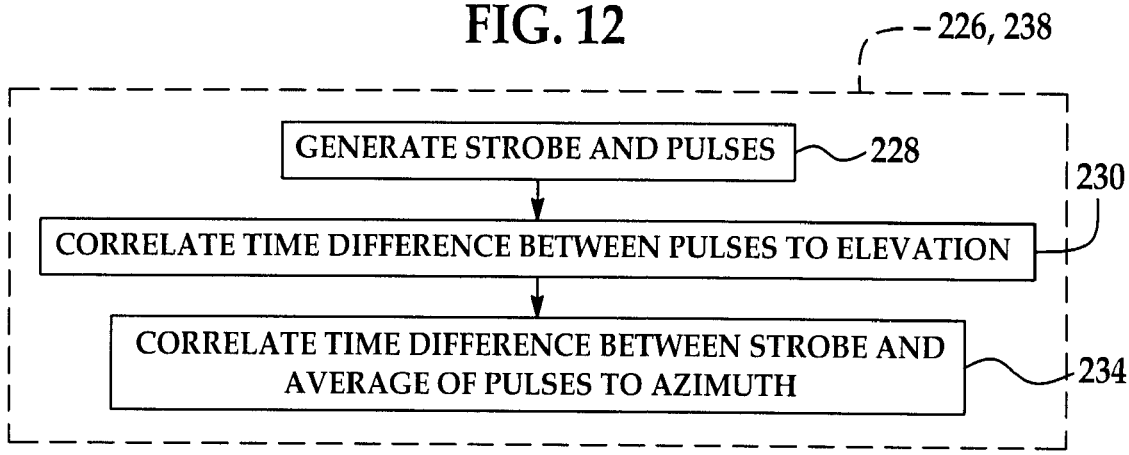

Several processes make up processing performed at step 212. At step 226, azimuth and elevation of transmitters in a constellation are determined. Referring additionally to FIG. 13, at step 228 the strobe 190, the pulse 192, and the pulse 194 are generated and the transmitters 176 transmit optical energy, in the form of the strobe 190, the pulse 192, the pulse 194, to the reference targets 182 that have been placed in predetermined positions that are known in the coordinate system of the assembly area 186. The transmitters 176 broadcast the optical infrared energy pulses. At step 230, time differences between the pulses 192 and 194 are correlated to elevation as described above. At step 234, time differences between the strobe 190 and an average of the pulses 192 and 194 are correlated to azimuth, as described above. The processors 202 convert timing of the strobe 190, the pulse 192, and the pulse 194 to azimuth and elevation of the transmitters 176.

Referring back to FIG. 12, at step 236, distance scale is determined. Because the reference targets 182 are spaced apart by known distances, a distance scale can be determined by triangulation of the reference targets 182. In other embodiments, distance scale can be determined with the transmitters 176 by triangulation of a distance standard detector assembly (not shown) that includes two detectors separated by known distance. Processing to determine the distance scale suitably is performed by the data processing system 174.

At step 238 azimuth and elevation of all of the features 170 are determined simultaneously. Referring back to FIG. 13, the same processing is performed (that is, the steps 228, 230, and 234) by the processors 202 associated with the targets 182 to determine azimuth and elevation of the features 170 that is performed by the processors 202 associated with the reference detectors 182 to determine azimuth and elevation of the transmitters 176.

Figure 11:
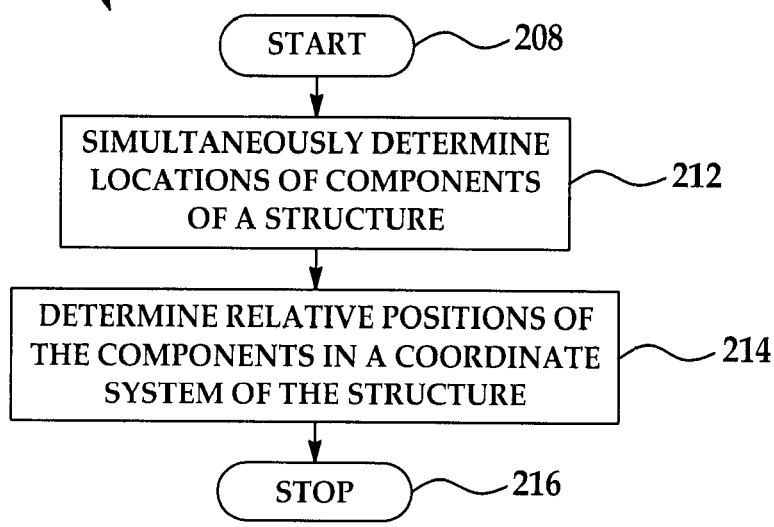
FIG. 11 is a flowchart of an illustrative method for locating components of a structure.
Figure 14:
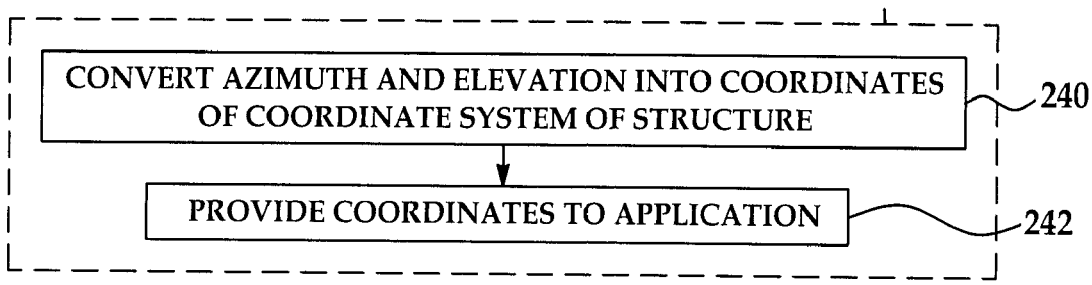

Referring now to FIGS. 11 and 14, several processes make up processing performed at step 214. At step 240, azimuth and elevation are converted into coordinates of the coordinate system of the structure 166. The data processing system 174 transforms the coordinate system of the assembly area 186 into the coordinate system of the structure 166 using any suitable transform technique that is known in the metrology art. The data processing system 174 then converts azimuth and elevation into coordinates using techniques such as triangulation and/or trilateration. Because the coordinate system of the assembly area 186 had already been transformed to the coordinate system of the structure 166, the coordinates generated at step 240 are in the coordinate system of the structure 166. At step 242, if desired the coordinates are provided to applications as desired for the further processing.

No implication of ordering for carrying out the processing steps is to be inferred from the non-limiting representations shown in FIGS. 11-14. For example, in some embodiments the targets 170 can be installed on the components 164 at step 220 and the components 164 placed in the assembly area 186 at step 222 before the reference targets 182 are placed in the assembly area 186 at step 224. However, in other embodiments the reference targets 170 can be placed in the assembly area at step 224 before the targets 170 are installed on the components 164 at step 220 and the components 164 placed in the assembly area 186 at step 222. In yet other embodiments, steps 220, 222, and 224 can be performed substantially simultaneously, if desired.

As another example, in some embodiments the same optical energy can be transmitted from the transmitters 176 to the reference targets 182 and to the targets 170. Thus, the reference detectors 182 and the targets 170 detect the same optical energy at substantially the same time. Therefore, the detector processing circuitry 198 associated with the reference targets 182 and the detector processing circuitry 198 associated with the targets 170 perform their processing at substantially the same time. That is, determination of the azimuth and elevation of the transmitters 176 at the step 226 occurs at substantially the same time, or substantially in parallel with, determination of the azimuth and elevation of the features 170 at the step 238.

However, in other embodiments separate optical energy can be transmitted from the transmitters 176 to the reference targets 182 and to the targets 170. Thus, the reference detectors 182 and the targets 170 detect different optical energy at different times. Therefore, the detector processing circuitry 198 associated with the reference targets 170 and the detector processing circuitry 198 associated with the targets 170 perform their processing at different times. That is, determination of the azimuth and elevation of the transmitters 176 at step 226 occurs at a different time, or in series with, determination of the azimuth and elevation of the features 18 at step 238. In some embodiments, step 226 may be performed before step 238, and in other embodiments, step 238 may be performed before step 226.

Automated Movement and Alignment of Components

Figure 15:
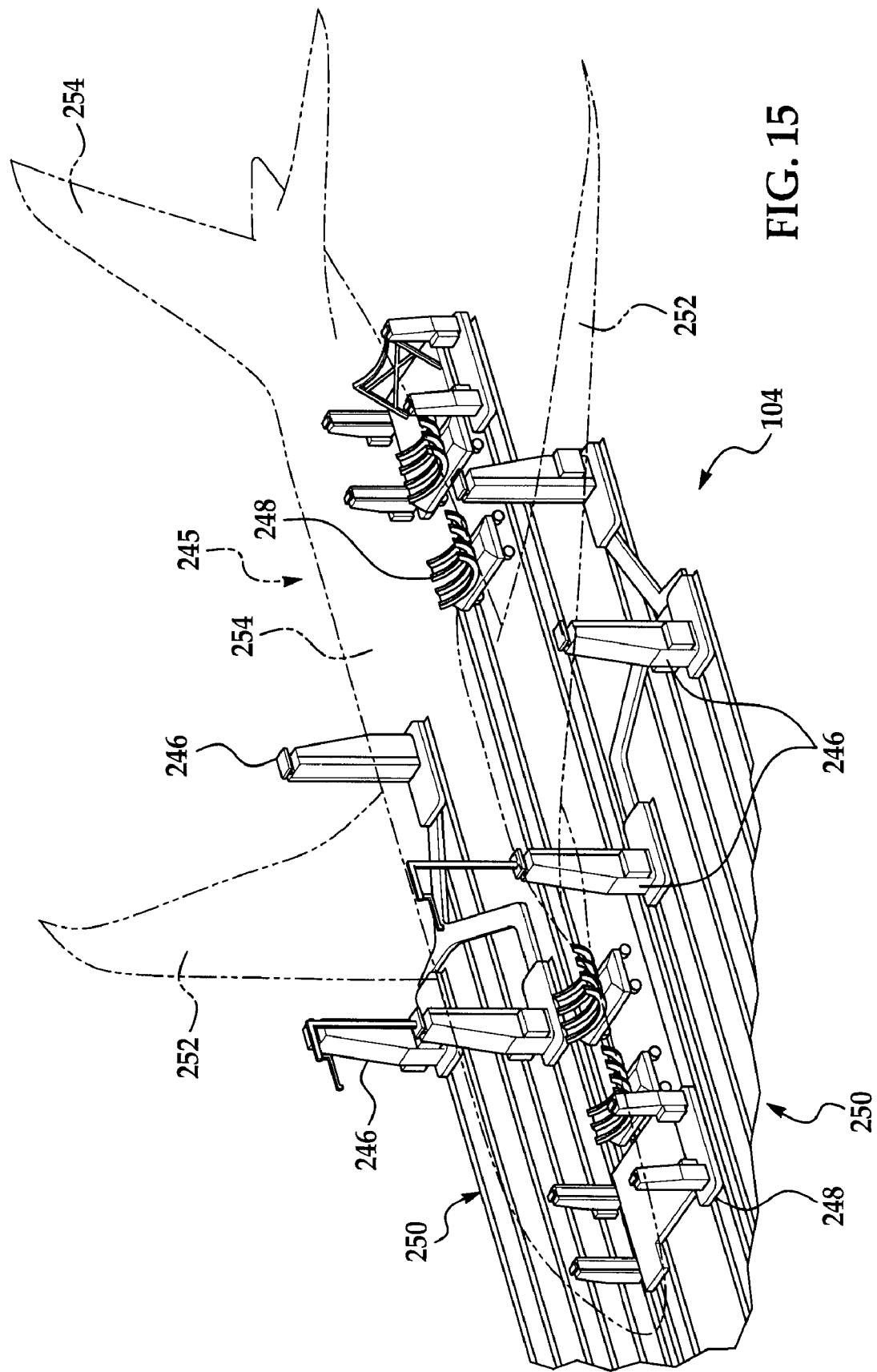
FIG. 15 is a perspective view illustrating a jacking system used to assemble components of an airplane, the outline of an airplane being indicated in the phantom.
Figure 16:
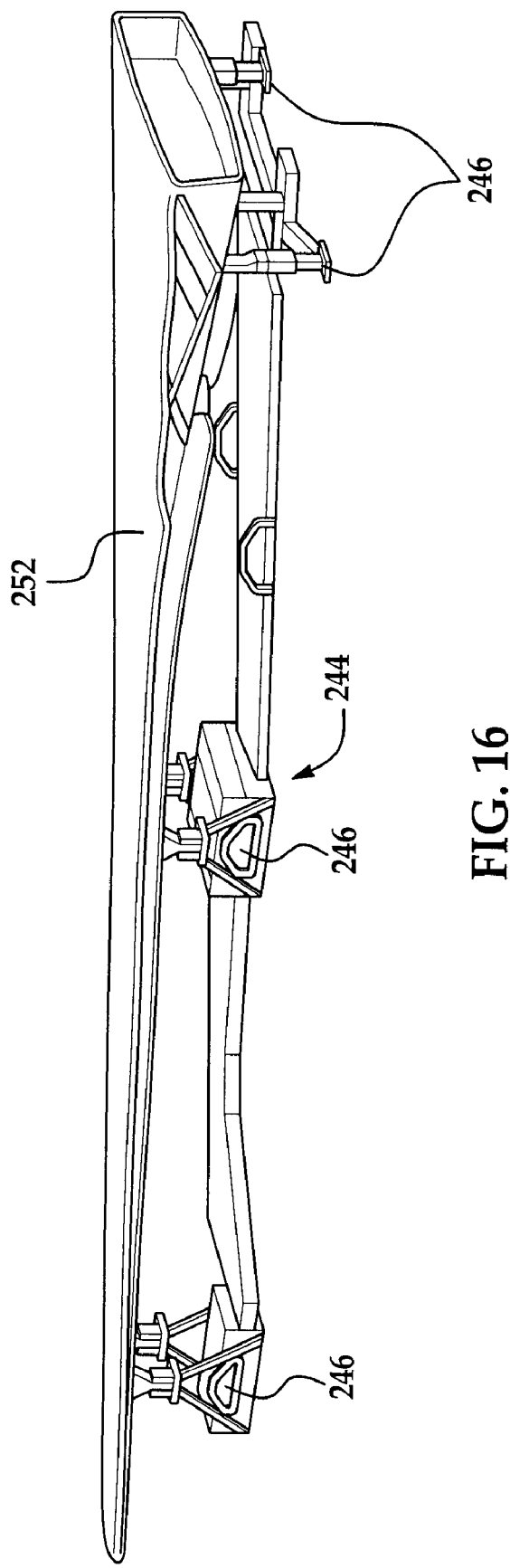
FIG. 16 is a perspective view illustrating components of the jacking system supporting an airplane wing.

Referring now to FIGS. 15 and 16, the previously mentioned tooling 172 (FIG. 3) may comprise a jacking system 104 that is used to support and move components of a structure such as the airplane 245 into final assembly positions that are calculated by the previously described measurement system 102 (FIG. 3). The jacking system 104 may include moveable support members such as jacks 246 and fuselage carriages 248 that are mounted for movement on rails 250. In the illustrated example, jacks 246 are used to support and move wing sections 252, however similar jacks (not shown) may be employed to support and move the tail assembly 254 into final assembly position. The jacks 246 may be capable of moving a wing section 252 along any of multiple axes in order to precisely align the wing sections 252 with the fuselage 254. Based on the known position of each of the components, the jacking system 104 moves the components into their final assembly positions using movements that are automatically determined. The optimal displacement of the jacks 246, as well as the final assembled position of the components are also automatically determined.

The automatic movement of the jacks 246 is controlled by a computer 108 (FIG. 1) which uses data files representing the known position of the components within a common, three dimensional coordinate system, established by the previously described measurement system 102 (FIG. 3). Using the known position of the components of the as-built airplane 245, the cruise orientation or line-of-flight of the airplane 245 may be predicted using a method that will be later described. Briefly, the method for predicting cruise orientation of the as-built airplane 245 involves inputting the nominal orientation of the as-built airplane; automatically computing deviation from the nominal orientation; and, applying the computed deviation from the nominal orientation to the nominal orientation in order to derive the cruise orientation. The deviation from the nominal orientation may be automatically computed by inputting angular variation of one or more aerodynamically significant features of the as-built airplane 245 relative to the nominal orientation, and automatically transforming the variations into angular offsets of the nominal orientation.

As will be described below, the final position of the jacks 246, and the known positions of the aerodynamically significant features of the components of the as-built airplane 245 may be used to calculate the line-of-flight for the as-built airplane 245 which is then physically transferred to a location inside the airplane 245 where a monument-like physical record of the line-of-flight is established.

The measurement system 102 may be used to compute assembly jack locations and move the jacks 246 to align the components 164 for assembly. Initial locations of at least one component 164 to be moved and a desired final location for the component 164 to be moved are determined from initial position measurement data for the component to be moved and the final location. Motion to align the component to be moved with the final location is automatically determined. Optimal displacements of the assembly jacks 246 produce the determined motion are automatically determined. After the component 164 has been moved, the location of the component 164 at a final assembled position is automatically determined.

As used herein: (i) the term "part" or "component" means "part or subassembly"; (ii) the term "location" means "position and orientation in space"; (iii) the term "motion" means "change of location" and does not intend to specify any speeds, accelerations, or other dynamic behavior, although other embodiments could compute and control such behavior; (iv) all measurements, unless otherwise stated, are made with respect to a fixed coordinate system that has been established on a factory floor; (v) an "assembly interface" of a part means one or more features that together determine how that part is to be mated to another part; (vi) an "assembly operation" means alignment of two parts (that is, a part to be moved and a stationary part) in accordance with a relevant index plan such that they may be joined together; and (vii) for each such assembly operation, it is assumed herein that the stationary part remains fixed with respect to a factory floor coordinate system and the part to be moved is moved by means of a system of powered assembly jacks into alignment with the stationary part. Moreover, the desired final location of the part to be moved is defined by a measurable position and orientation. The measurable position and orientation may include, for example and without limitation: fixed coordinates and directions in a GPS coordinate system; fixed monuments on a factory floor; or a stationary component of the desired structure to be assembled which is already located in its final position and into which the movable part is aligned and moved (and hence defines the desired final location of the part to be moved). For purposes of illustration only and without any limitation whatsoever, this desired final location will be referred to herein and shown in the drawings as a stationary component of the structure to be assembled.

Figure 17:
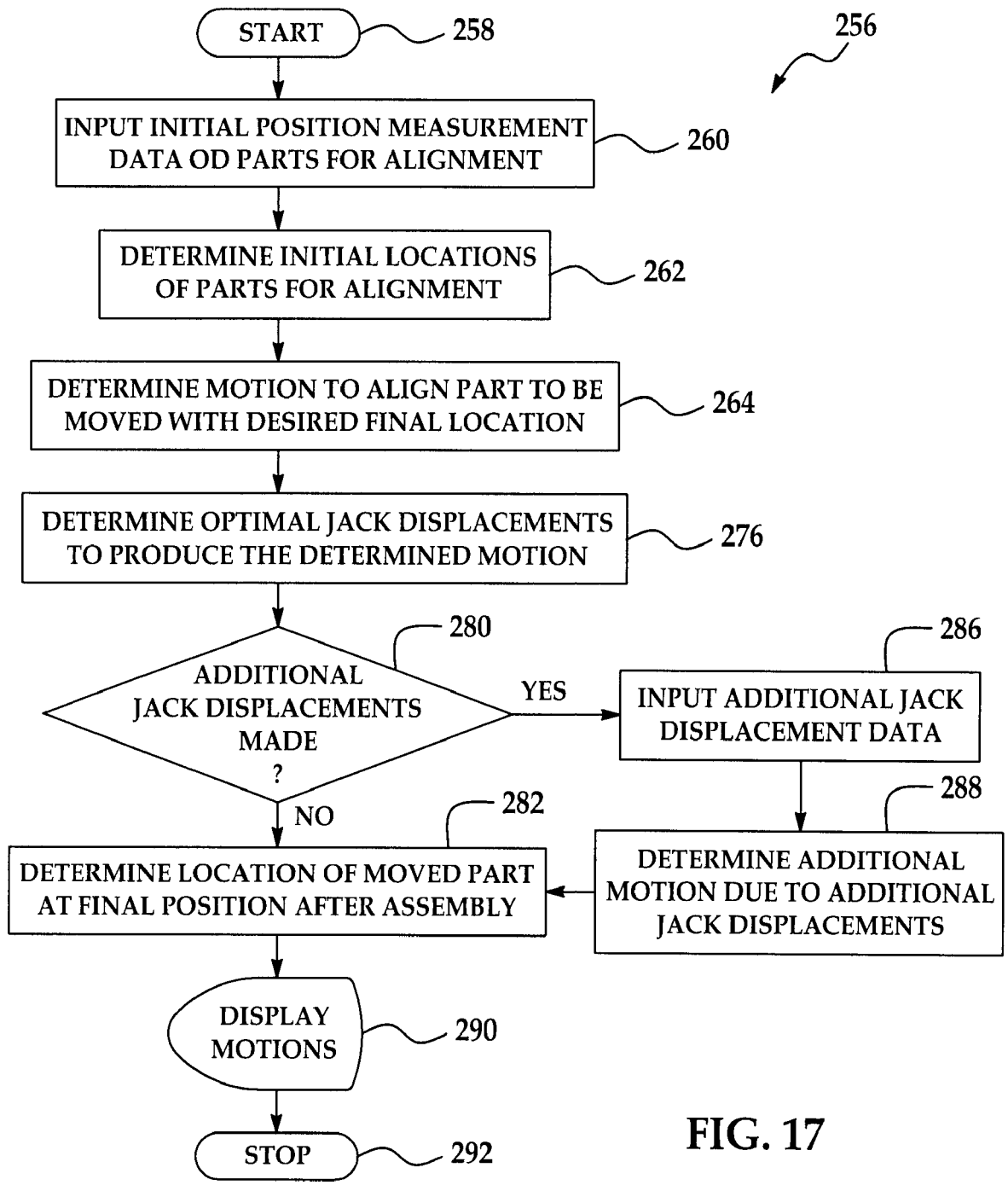
FIGS. 17-21 are flowcharts of an illustrative method for computing assembly jack locations to align parts for assembly.

Referring now to FIG. 17, a method 256 for computing assembly jack locations to align parts for assembly begins at step 258. The method 256 may be a computer-executable method that uses measured locations of parts to compute assembly jack locations to align those parts for assembly into a structure. It should be noted that the desired final location of the part to be moved is defined by a measurable position and orientation. The measurable position and orientation may include, for example and without limitation: fixed coordinates and directions in a GPS coordinate system; fixed monuments on a factory floor; or a stationary component of the desired structure to be assembled which is already located in its final position and into which the movable part is aligned and moved (and hence defines the desired final location of the part to be moved). For purposes of illustration only and without any limitation whatsoever, this desired final location will be referred to herein and shown in the drawings as a stationary component of the structure to be assembled.

At step 260, measured initial positions of parts for alignment are input into suitable computer processing components (discussed further below). The initial positions that are measured may be locations of known reference points on assembly interfaces of at least one part to be moved and a stationary part (into which the movable parts are to be moved, thereby assembling the structure). The locations can be measured in any manner desired, such as without limitation in terms of azimuth and elevation and converted into coordinates in a coordinate system of the structure to be assembled.

The locations can be measured with any suitable measurement or metrology system as desired for a particular application, including those previously described. At step 262, initial locations of the part(s) to be moved and the stationary part are determined from the initial position measurement data input at step 260. As mentioned above, location includes components of position and orientation in space. At step 264 motion to align the part(s) to be moved with the desired final location, such as the stationary part, is determined.

The concepts of location and motion as used herein are inter-related. As such, the following discussion explains both (i) determination of initial locations at step 262 and (ii) determination of motion at step 264. In explaining location and motion, the following notational conventions are used herein:

(i) 3×3 matrices are represented by bold face capital letters: A, B, C, etc.; (ii) 3D vectors are represented by bold face lower case letters: a, b, c, etc.; (iii) scalars (for example, angles) are in non-bold face lower case letters: a, b, c, etc., or by lower case Greek letters; and (iv) parts and features are represented by non-bold face capital letters: A, B, C, etc.

Within the above context, a rigid motion in space is a combination of rotation and translation in space. A mathematical rigid motion in this sense can be thought of either (i) as a physical change of location with respect to a fixed coordinate system or (ii) as a transformation between two different coordinate systems. Embodiments disclosed herein use the same representation for both.

The locations and motions used in the embodiments disclosed herein are not intended to be limited to rigid motions. The locations and motions could, for example, include elastic deformations. However, some measurement technology and assembly jack systems currently in use are not capable of dealing with elastic deformations. Therefore, for the sake of brevity, rigid motions will be discussed to explain the non-limiting, illustrative embodiments disclosed herein.

Representations of locations and motions in space involve matrices and angles. Mathematically, a rigid motion can be thought of as a combination of a 3×3 rotation matrix U and a 3-dimensional translation vector t. These are often combined into a single 4×4 matrix, which is mathematically equivalent to the form used herein. If x represents the coordinates of a point before the motion and x' represents the coordinates of the point after the motion, then $$x'=Ux+t. \quad (1)$$

where Ux represents matrix multiplication of the 3×3 matrix U and the 3×1 matrix (i.e., vector) x. In some contemplated manufacturing scenarios, both (i) an upstream variation simulation process (in which parts and structures are designed and in which trade studies are performed) and (ii) factory floor assembly processes use this representation of a rotation as a 3×3 matrix.

Figure 22:
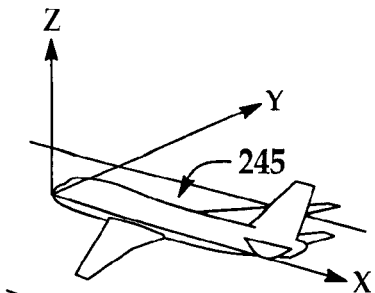
FIG. 22 illustrates an illustrative coordinate system.

Referring additionally to FIG. 22, an illustrative system of Euler angles is used in some embodiments. An illustrative coordinate system of a structure such as the airplane 245 includes an X axis, a Y axis, and a Z axis. An illustrative system of Euler angles ($\theta$, $\phi$, $\psi$) is described as follows: rotate through angle $\theta$ about an X axis, then through angle $\phi$ about an original (that is, un-rotated) Y axis, then through angle $\psi$ about an original (that is, un-rotated) Z axis. The use of un-rotated axes for rotation is well adapted to a factory floor application. While an order in which the rotations are applied may be chosen arbitrarily, the same order is to be used consistently throughout the application. This consistency is entailed because different orders produce different results in 3-space (as will be discussed further below).

There is a mathematically exact transformation between Euler angles and rotation matrices except in a few special cases. For the particular scheme of Euler angles defined above, these special cases occur where cos $\phi$=0 when the mapping back from matrices to Euler angles becomes ambiguous. Thus, when $\phi$=±90° each choice of $\phi$ corresponds to a different choice of $\theta$. However, either choice of $\phi$ and $\theta$ leads back to the same rotation matrix. It will be noted, though, that $\phi$=±90° is not expected to occur for contemplated applications of disclosed embodiments.

Figure 23:
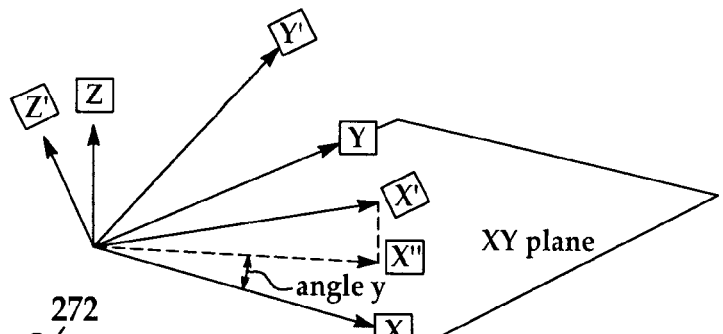
FIG. 23 illustrates planar projection angles.

Referring additionally now to FIG. 23, for purposes of measuring rotations from a physical object and for predicting aerodynamic effects, Euler angles are not as appropriate as planar projection angles. Planar projection angles are defined procedurally as follows:

r=roll angle. Let Y"=the projection of the rotated Y' axis onto the un-rotated YZ plane. Then r is the angle between Y" and the un-rotated Y axis.

p=pitch angle. Let X"=the projection of the rotated X' axis onto the un-rotated XZ plane. Then p is the angle between X" and the un-rotated X axis.

y=yaw angle. Let X"=the projection of the rotated X' axis onto the un-rotated XY plane. Then y is the angle between X" and the un-rotated X axis.

These definitions of planar projection angles are adapted to components of some structures that are assembled by some embodiments (for examples, structures such as aircraft and maritime vessels that have roll, pitch, and yaw axes). However, it will be appreciated that other similar definitions could be made for different applications.

There is a mathematically exact transformation between the planar projection angles (r, p, y) and the Euler angles (θ, φ, ψ), and hence to rotation matrices U, which is numerically stable as long as all of the angles have magnitude bounded below 90°. It will be noted that this is the case for contemplated applications of disclosed embodiments.

Because all planar projection angles are measured independently, there is no arbitrary choice of order involved. When all angles are small (such as on the order of 1° or less), the difference between planar projection angles and the set of Euler angles used in disclosed embodiments is negligible. It will also be noted that this, too, is the case with all planar projection angles used in contemplated applications of disclosed embodiments.

Thus, determining motion at step 264 entails an application of point registration that finds a rigid motion which relates the coordinate system defined by a set of nominal (as-designed) points $\{x_1, x_2, x_3, \ldots\}$ to a corresponding set of as-built points $\{y_1, y_2, y_3, \ldots\}$. The rigid motion can be found in two ways—a point cloud registration and a datum target registration. Whether a point cloud registration is used or a datum target registration is used in a particular case depends on the indexing plan for joining the parts in question.

The first registration method—the point cloud registration method—suitably is a best-fit method that is used when there is a number N>3 of measurement points, and the registration is to be based by "best fitting" all of them simultaneously. In one embodiment, the best fit could be, illustratively and without limitation, a least-squares fit. Mathematically, the least-squares point cloud registration method finds a rigid motion in the form x'=Ux+t such that the sum of squares of all the residuals $$\sum_{i=1}^{N} |y_i - x'_i|^2$$

is minimized over all possible U and t. This operation suitably may be done by a standard method described in K. S. Arun, T. S. Huang, and S. D. Blostein; "Least Square Fitting of Two 3-D Point Sets"; *IEEE Transactions on PAMI*, 9(5):698-700, 1987. In some embodiments, if desired the mathematical software that performs this computation may be the same software as that which is used in the vendor software used for variation simulation by engineering personnel for component and structure design and trade studies.

The second registration method—the datum target registration method—is used when, instead of considering all the measurement points equally, a hierarchical structure is imposed. An example of such a method is the 3-2-1 method described as follows:

Define a primary coordinate plane X=0 to pass through points $x_1, x_2, x_3$.

Define a secondary coordinate plane Y=0 to pass through points $x_4$ and $x_5$, while being perpendicular to the primary.

Define a tertiary coordinate plane Z=0 to pass through the point $x_6$ while being perpendicular to both the primary and the secondary.

The mechanics of this procedure are defined by national and international standards, such as without limitation *Dimensioning and Tolerancing*, ASME Y14.5M-1994, American Society of Mechanical Engineers, New York, 1995. As with the point cloud registration method, if desired this procedure may be followed both in the disclosed embodiments and in the vendor software used for variation simulation by engineering personnel.

Determining the motion at step 264 entails combining rigid motions. Before combining rigid motions is explained, combining rotations will first be explained. Combining two rotations is done by matrix multiplication. Thus, if the first rotation has matrix V and the second has matrix U, then the operation of performing the first rotation and then the second has matrix UV. The order matters, because with matrix multiplication in general UV≠VU. For example, referring back to FIG. 22, rotating 90° about the X axis leaves the airplane 245 with its left wing pointed down but the nose pointed forward, and a further rotation of 90° about the Y axis points the nose straight up. However, starting with the rotation about Y points the nose up, and following with the rotation about X points the nose to the left. Reversing a rotation represented by the matrix U is done by taking the matrix inverse $U^{-1}$.

Combining rigid motions is similar to combining rotations, except that the translation vectors must also be combined. In disclosed embodiments, there are two basic scenarios that involve combining rigid motions: (i) motion to align two components; and (ii) orientation of an aerodynamically significant feature. Other applications are merely combinations of these scenarios.

Figure 18:
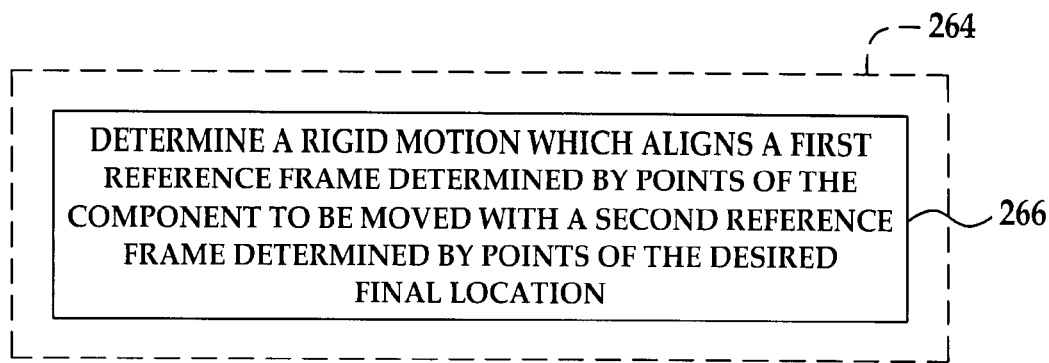
Figure 24:
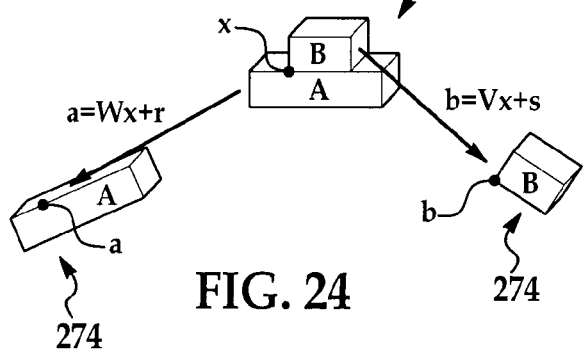
FIGS. 24-26 illustrate computation of rigid motion to align a movable part with a final location.
Figure 25:
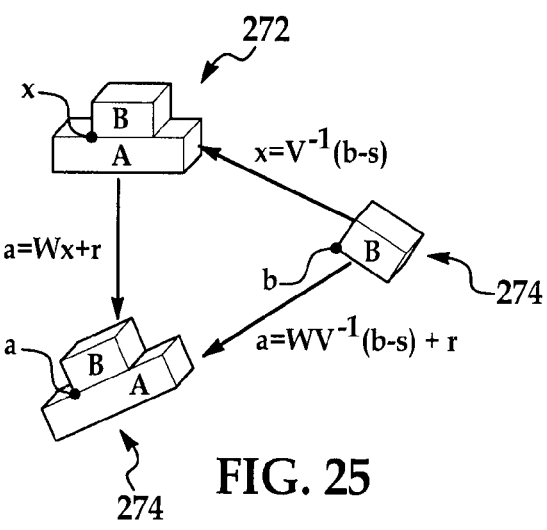

First, motion to align two components will be discussed. Referring now to FIGS. 17 and 18, determining motion to align the part(s) to be moved with the desired final location, such as the stationary part, at step 264 entails processing at step 266, at which a rigid motion is determined which aligns a reference frame determined by points of the part(s) to be moved with a reference frame determined by points of the desired final location, such as the stationary component. Referring additionally to FIGS. 24 and 25, given by way of non-limiting example component A is to remain fixed and component B is to move during a join. Let the nominal measurement points of A be $\{a_1, \ldots, a_N\}$ with corresponding measured points $\{a'_1, \ldots, a'_N\}$. Similarly, the nominal measurement points of B are $\{b_1, \ldots, b_M\}$ with corresponding measured points $\{b'_1, \ldots, b'_M\}$. There is no requirement for the nominal points on A to be the same as those on B, or even that N=M. At the step 266, a rigid motion a=Ub+t is computed which aligns the reference frame defined by the points $\{b'_1, \ldots, b'_M\}$ of B with the reference frame defined by the points $\{a'_1, \ldots, a'_N\}$ of A.

Figure 19:
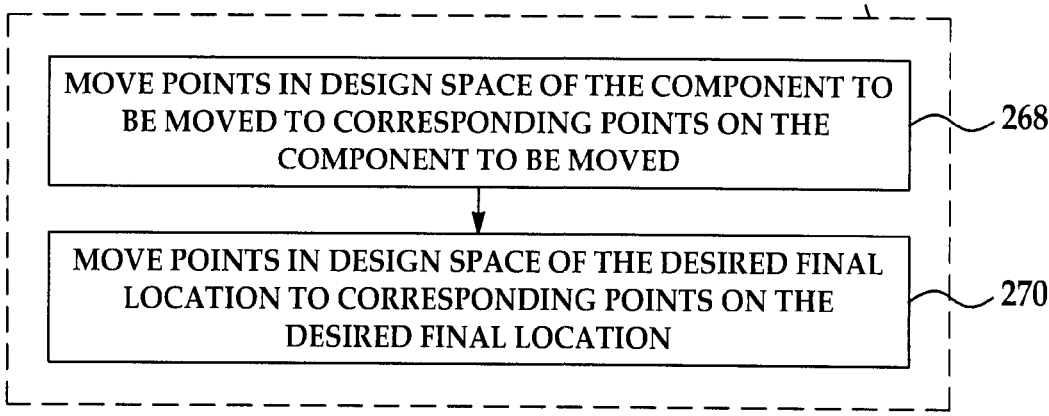

Referring additionally to FIG. 19, in some embodiments determination of the rigid motion at step 266 is performed in two stages. In the first stage, at step 268 points in design space of the part(s) to be moved are moved to corresponding points on the part(s) to be moved and at step 270 points in design space of the desired final location, such as the stationary part, are moved to corresponding points on the final location, such as the stationary part. As shown in FIG. 24, the parts A and B are aligned in design space 272. At step 268, a rigid motion b=Vx+s is found which moves every point x in design space 272 to its corresponding point b on the component B on a factory floor 274. Similarly, at the step 270 a rigid motion a=Wx+r is found that moves an arbitrary point x in design space 272 into its corresponding point a on the component A on the factory floor 274.

In the second stage, the motion a=Ub+t is determined. The equation b=Vx+s is solved for x, giving x=V$^{-1}$(b−s), which is then substituted into the equation a=Wx+r to get $$a=WV^{-1}(b-s)+r=WV^{-1}b+r-WV^{-1}s=Ub+t \qquad (2)$$

where $$U=WV^{-1}, \text{ and } t=r-WV^{-1}s=r-Us.$$

Thus, the rigid motion a=Ub+t can be applied to points on the part(s) to be moved (that is, the component(s) B) from their initial locations on the factory floor 274 (that was determined at the step 262 (FIG. 17)) such that the part(s) B will be aligned with the stationary part A at the location of the stationary part A on the factory floor 274 that was also determined at the step 262 (FIG. 17)) in the same manner that they are aligned in design space 272.

Figure 26:
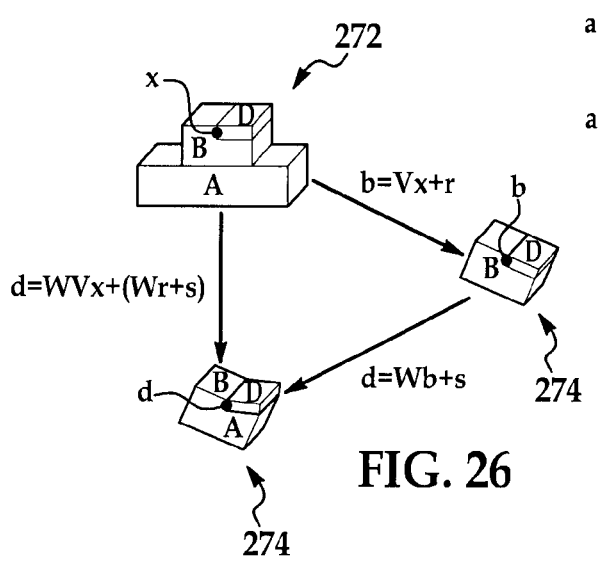

Referring additionally now to FIG. 26, in some instances the component B may contain a feature D that is subject to manufacturing variation. That is, the feature D may not be in its nominal location with respect to the datum reference frame defined by the points $\{b_1, \ldots, b_M\}$. In such a case a motion d=Ux+t is found that carries the nominal location of any point x on the feature D to its actual location on the factory floor 274. Let b=Vx+s be a rigid motion that locates the reference points $\{b_1, \ldots, b_M\}$ on the factory floor 274, and let d=Wb+r be a rigid motion that locates the feature D with respect to the datum reference frame defined by the reference points $\{b_1, \ldots, b_M\}$. Then the transformation is given by:

$$d=Wb+r=W(Vx+s)+r=WVx+Ws+r=Ux+t \qquad (3)$$

where $$U=WV, t=Ws+r.$$

Referring back to FIG. 17, after the rigid motion b'=Ub+t has been determined, at step 276 optimal displacements of assembly jacks are determined that will produce the determined motion for the part(s) to be moved into alignment with the stationary part. The assembly jacks that support the part(s) to be moved and the stationary part have axes that desirably are aligned with axes of the coordinate system of the structure to be assembled (and therefore with the factory floor coordinate system in which the parts are measured).

Figure 20:
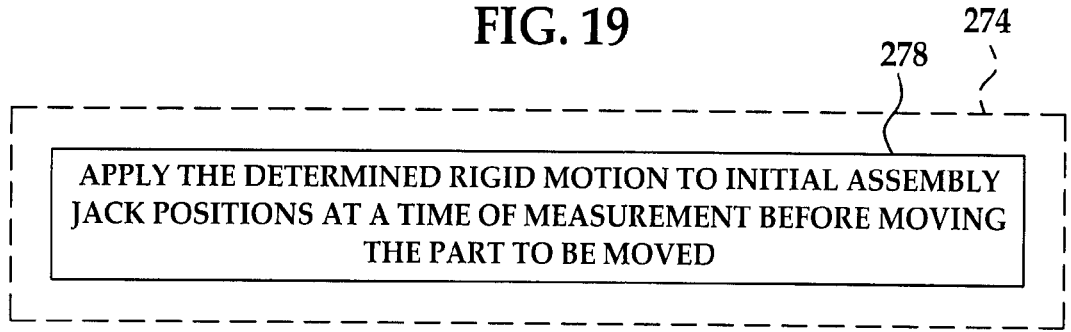

Referring additionally to FIG. 20, determining the optimal assembly jack displacements entails processing at step 278 at which the determined rigid motion is applied to initial assembly jack positions at a time of measurement before moving the part(s) to be moved. Thus, displacements of the assembly jacks (upon which the part(s) to be moved are supported) that were determined at step 276 will result in the determined rigid motion to align the part(s) to be moved with the stationary part.

Referring back to FIG. 17, at decision step 280 a determination is made whether additional assembly jack displacements have been made after the part(s) has been moved on the assembly jacks into alignment with the desired final location, such as the stationary part. For example, additional assembly jack displacements may be made by assembly mechanics to adjust the actual location of the moved part(s) from the computed optimal location for the moved part(s) at the final set location in which the stationary part and the moved part(s) are fastened together.

If no additional assembly jack displacements have been made, then at step 282 the location of the moved part(s) at a final assembled position is determined.

Figure 21:
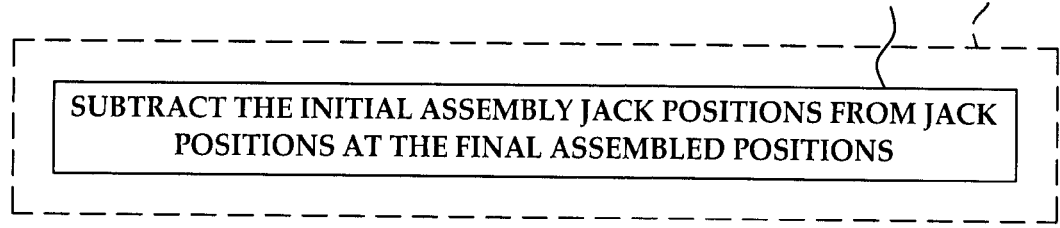

Referring additionally to FIG. 21, determining the location of the moved part(s) at a final assembled position entails processing at step 284 at which the initial assembly jack positions are subtracted from jack positions at the final assembled positions. If the axes of the jack system are not aligned with the axes of the common factory floor coordinate system, an additional rotational correction is applied to express the jack delta motions in terms of the jack axis directions.

If additional assembly jack displacements have been made, then at step 286 additional data is input regarding additional assembly jack displacements made by assembly mechanics to adjust the actual location of the moved part(s) from the computed optimal location for the moved part(s) at the final set location. For example, assembly jack control processing can measure the difference between the pre-computed optimal jack locations and the locations at final set. At step 288, additional motion due to additional assembly jack displacement is determined. For example, from the measured differences between the pre-computed optimal jack locations and the locations at final set a rotation that represents the motion from initial set to final set can be determined. This rotation suitably is reported in the form of planar projection angles, as described above. The planar projection angles may be transformed to Euler angles, and then to 3×3 matrix form. However, because these delta angles typically will be small in contemplated applications of disclosed embodiments, the Euler angles (θ, φ, ψ) can be taken to be equal to the planar projection angles (r, p, y). Processing then proceeds to step 282 as described above.

At step 290 motions are displayed. Euler angles suitably are used to communicate information about rotations to assembly mechanics on the factory floor because Euler angles contain more easily interpreted information than a 3×3 matrix. Precision in these numbers is required only when the numbers become small, at which point the Euler angles are substantially the same as planar projection angles. The method 256 ends at step 292.

Figure 27:
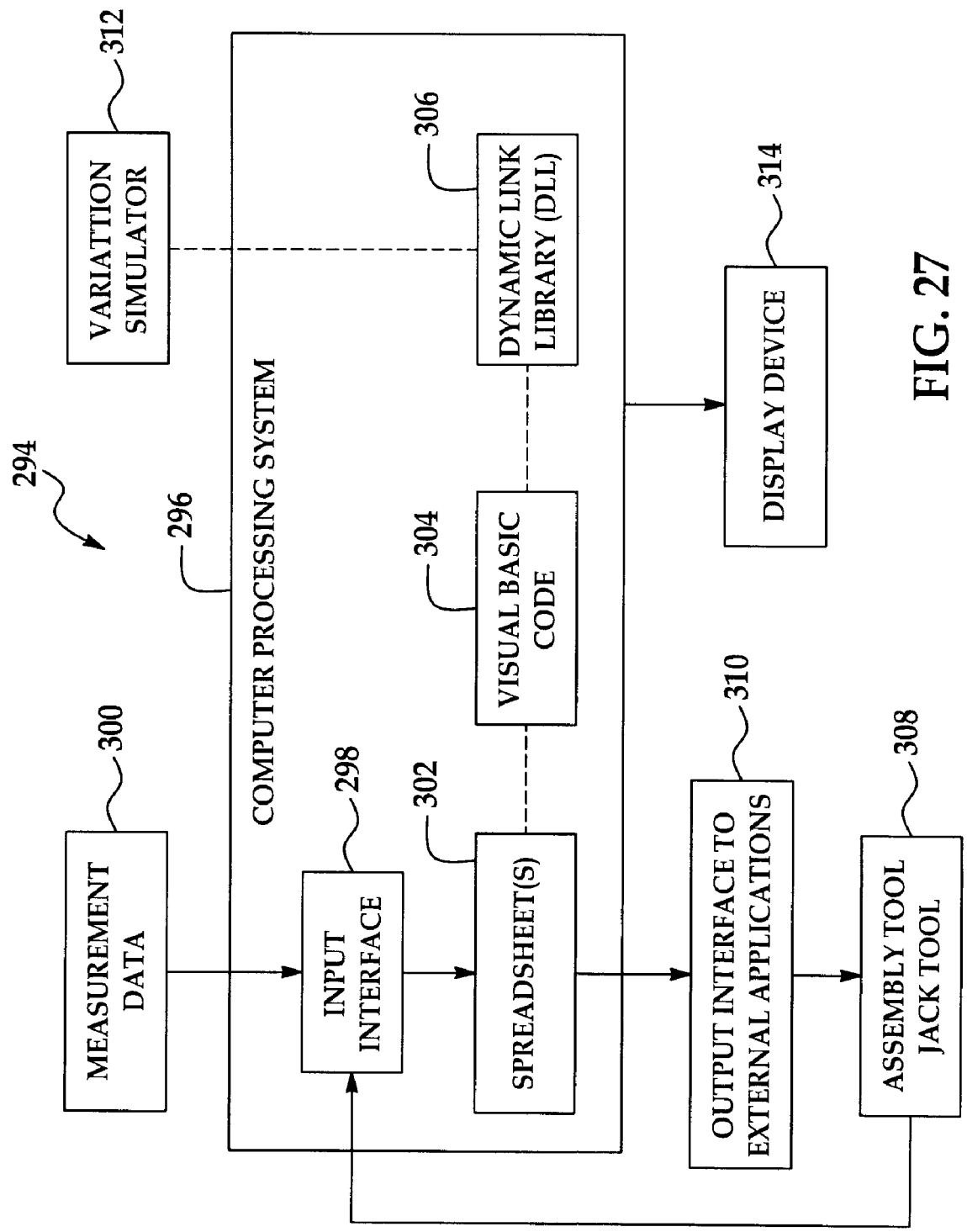
FIG. 27 is a block diagram of an illustrative system for computing assembly jack locations to align parts for assembly.

Referring now to FIG. 27 a system 294 is provided for computing assembly jack locations to align parts for assembly. A computer processing system 296 includes an input interface 298. Measurement data 300 regarding initial position of the parts for alignment is provided to the input interface 298.

In the illustrated embodiment, computer processing components of the computer processing system execute one or more spreadsheets 302, visual basic code 304, and routines from a dynamic link library 306. The spreadsheet 302 receives from the measurement system via the input interface 298 initial position measurement data from which the initial locations of the components to be assembled can be determined. The spreadsheet 302 passes the resulting optimal assembly jack positions to external applications, such as without limitation an assembly jack control 308 or other external processes as desired, via an output interface 310. The spreadsheet 302 receives feedback from the jack assembly control 308 via the input interface 298 on the actual locations of the jacks at final set.

In some embodiments, the spreadsheet computations can be divided into several separate spreadsheets as desired for a particular purpose. However, in some other embodiments the spreadsheet computations can be performed by a single spreadsheet. For purposes of clarity, the one or more spreadsheets 302 are referred to herein as the spreadsheet 302.

To perform its calculations, in some embodiments the spreadsheet 302 performs computations that use a mixture of spreadsheet formulas, the visual basic code 304 written in the Visual Basic for Applications (VBA) computer language (which is embedded in the spreadsheet 302), and the dynamic link library (DLL) 306 containing complex numerical computations which are implemented in the C computer language. If desired, the C code in turn also can be used by an upstream variation simulation process in a variation simulator 312. The purpose of this is to simulate the assembly effects of variation in individual parts to perform variation management trade studies during the engineering design phase. The sharing of numerical algorithms and software between the engineering design and factory floor assembly stages enables the factory floor assembly process to be the same process that was simulated during engineering design studies.

A display device 314 is operatively coupled to the computer processing system 296 to display motions. As discussed above, Euler angles suitably are used to communicate information about rotations to assembly mechanics on the factory floor.

Figure 28:
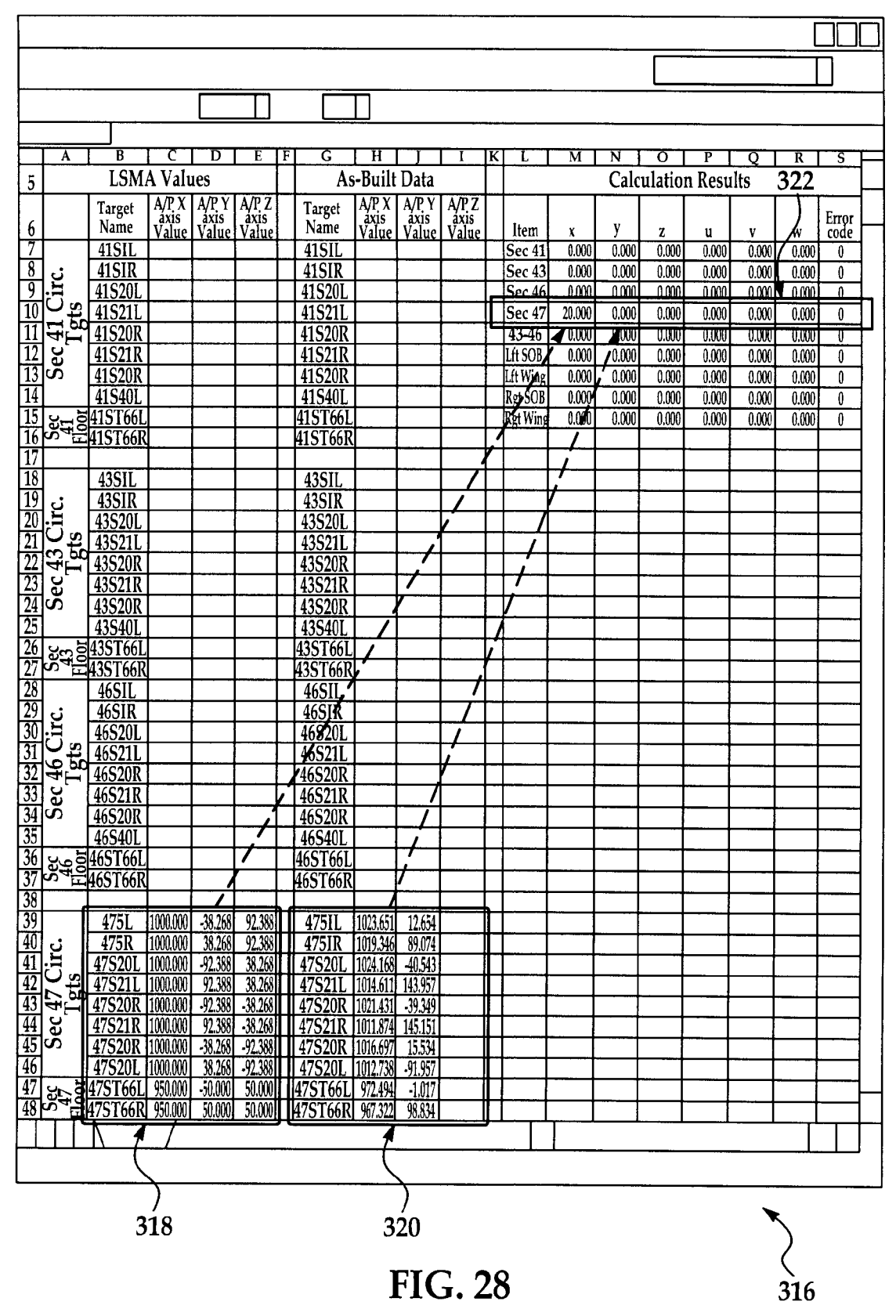
Figure 29:
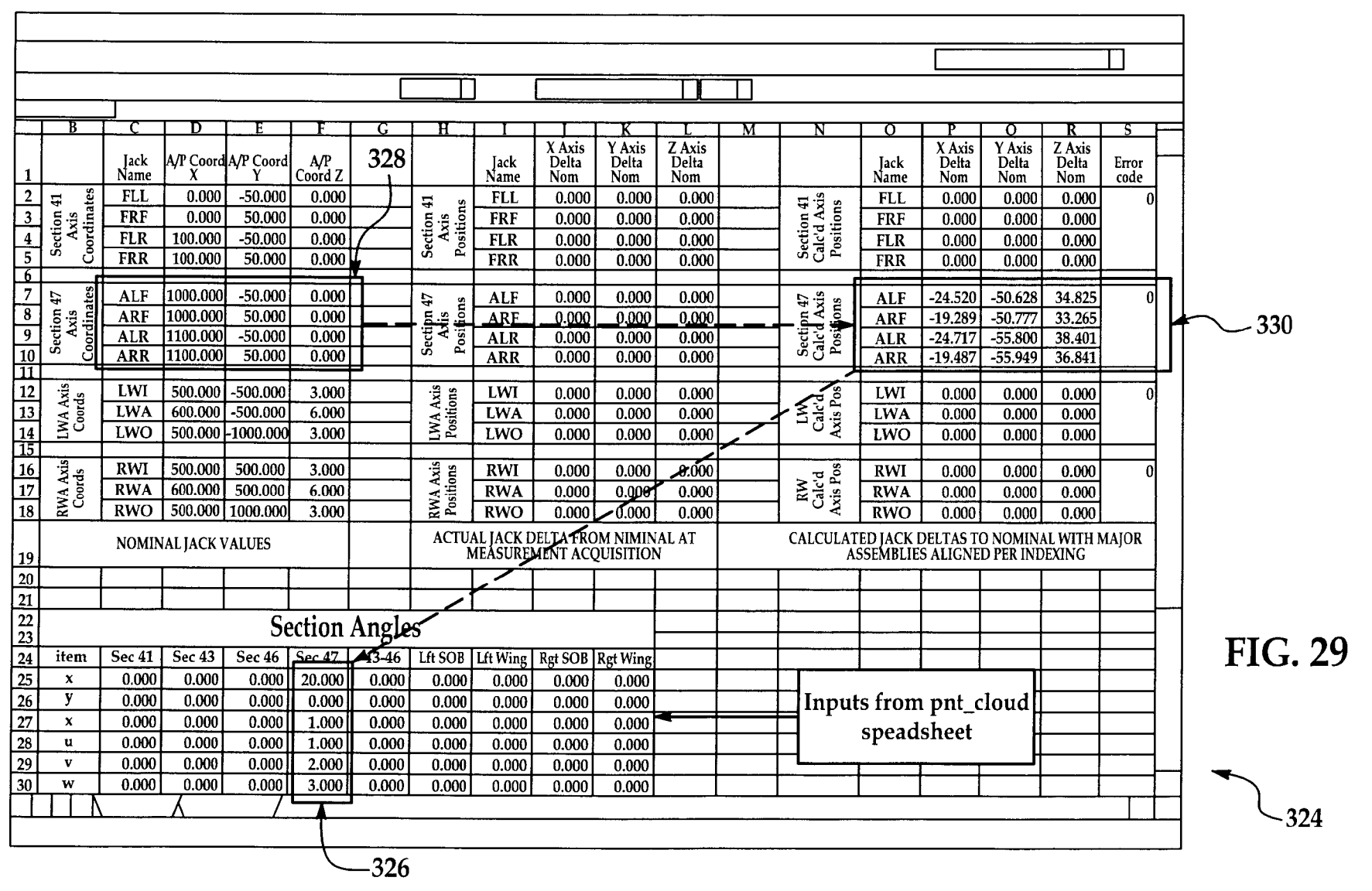

Referring now to FIGS. 28-30, illustrative screen shots show processing performed by the spreadsheet 302 (FIG. 27) in illustrative embodiments. Given by way of non-limiting example, the screen shots illustrate processing of data for assembling an airplane from fuselage sections. For purposes of clarity, the screen shots illustrate a simplified assembly scenario in which (i) all major assemblies (that is, fuselage sections) are in their nominal positions on the factory floor except the rear-most section of the fuselage (section 47) and (ii) all key features are at nominal orientation relative to their respective major assemblies except the vertical fin (which is attached to section 47). It will be appreciated that all numerical data shown on the screenshots are notional, and bear no relation to actual product data.

Referring now to FIG. 28, in screen 316 cells 318 are populated with initial position measurement data 300 (FIG. 27) from the measurement system via the input interface 298 (FIG. 27) for ten target points on section 47, thereby executing processing of the step 260 (FIG. 17). Data regarding nominal locations of the ten target points on section 47 are populated in cells 320. The measured data from the cells 318 and the nominal data from the cells 320 are combined to compute the initial location and orientation of section 47 with respect to the factory floor ERS coordinate system, thereby executing processing of the step 262 (FIG. 17). Given by way of non-limiting example, the point cloud registration method was used to combine the measured data from the cells 318 and the nominal data from the cells 320 to compute the initial location and orientation of section 47 with respect to the factory floor ERS coordinate system. Resulting data for initial location and orientation of section 47 are populated in cells 322.

Referring now to FIG. 29, in screen 324 the data regarding location and orientation of section 47 from the cells 322 (FIG. 28) are populated in cells 326. The data regarding location and orientation of section 47 from the cells 326 is combined with data in cells 328 regarding nominal assembly jack locations to produce desired assembly jack deltas (that is, displacements) to bring section 47 into alignment with the stationary fuselage section 46 (which is already in nominal location and alignment), thereby executing processing of the step 276 (FIG. 17). These jack displacements bring section 47 into its optimal set position. Data regarding the jack displacements populate cells 330.

Referring now to FIG. 30, in a screen 332 data regarding actual assembly jack deltas introduced by assembly mechanics in moving from the optimal set to final set populates cells 334, thereby executing processing of the steps 286 and 288 (both FIG. 17). The data from the cells 334 is used to compute section 47's orientation at final set, thereby executing processing of the step 282 (FIG. 17). Resulting data regarding section 47's orientation at final set populates cells 336.

In various embodiments, portions of the system and method include a computer program product. The computer program product includes a computer-readable storage medium, such as a non-volatile storage medium, and computer-readable program code portions, such as a series of computer instructions, embodied in the computer-readable storage medium. Typically, the computer program is stored and executed by a processing unit or a related memory device, such as processing components of the computer processing system 296 depicted in FIG. 27.

In this regard, FIGS. 17-21, 27, and 28-30 are flowcharts and control flow illustrations, step diagrams, and screen shots, respectively, of methods, systems, and program products, respectively, according to various embodiments. It will be understood that each step of the step diagram, flowchart and control flow illustrations, and combinations of steps in the step diagram, and flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the step diagram, flowchart or control flow step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the step diagram, flowchart or control flow step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the step diagram, flowchart or control flow step(s).

Accordingly, steps of the step diagram, flowchart or control flow illustrations support combinations of means for performing the specified functions, combinations of steps for performing the specified functions and program instruction means for performing the specified functions. It will also be understood that each step of the step diagram, flowchart or control flow illustrations, and combinations of steps in the step diagram, flowchart or control flow illustrations, can be implemented by special purpose hardware-based computer systems which perform the specified functions or steps, or combinations of special purpose hardware and computer instructions.

Determining As-Built Cruise Orientation

Referring again to FIG. 1, the cruise configuration of the as-built airplane 245, also referred to herein as the line-of-flight of the airplane 245, is calculated and transferred into the interior of the airplane 245 using the line transfer tool 106. In order to calculate the cruise configuration of the as-built airplane 245, at least one aerodynamically significant feature of the as-built airplane 245 is automatically determined.

In order to facilitate system alignment, some airplanes carry a physical monument, referred to herein as an orientation monument, physical reference or golden plate, that can act as a master orientation reference for airplane systems. According to disclosed embodiments, the orientation monument may be aligned with a flight path vector and bank angle of the as-built airplane 245 at nominal load and cruise conditions. Systems dependent upon alignment suitably are calibrated to orientation alignment of this orientation monument. Given by way of non-limiting example, to function properly certain airplane systems (such as an Earth Reference System, weather radar, Head-Up Display, and the like) which are attached to the airframe are aligned with the airplane flight path vector and the airplane bank angle. Deviation between the orientation of the systems and the flight path vector and bank angle can become evident in discrepant flight deck indication.

In order for the orientation monument to be physically mounted in the assembled airplane 245, orientation for the orientation monument is first "transferred" into the airplane. In some embodiments, computations can be performed to instruct a later discussed tool (referred to herein as a line transfer tool) to be moved into a position that is aligned with the computed orientation alignment. When the line transfer tool is moved into alignment with the computed orientation alignment, an inertial reference device, such as a gyroscope or the like, can be placed into the line transfer tool and reset to the computed orientation alignment. The inertial reference unit, reset to the orientation alignment, can be removed from the orientation line tool and brought into the airplane, thereby "transferring" the computed orientation alignment to the airplane. The inertial reference unit, that has been reset to the computed orientation alignment, can be located in the section, such as a midbody section, of the airplane in which the orientation monument is to be installed. The orientation monument then can be aligned with the inertial reference unit and physically installed in the airplane as desired.

As used herein an "aerodynamically significant feature" means a subset of major assembly features that may significantly affect the trimmed of an airplane at 1-g cruise when their orientation to the airstream deviates from nominal and may include, by way of non-limiting examples, left-hand and right-hand wing surfaces, left-hand and right-hand horizontal stabilizer surfaces, vertical stabilizer (vertical fin) surface, and left-hand and right-hand engine thrust vectors; (vi) an "assembly interface" of a part means one or more features that together determine how that part is to be mated to another part; (vii) an "assembly operation" means alignment of two parts (that is, a part to be moved and a stationary part) in accordance with a relevant index plan such that they may be joined together; (viii) the term "nominal orientation of the as-built airplane" means orientation of the initial axis system or datum axis system associated with the as-built airplane structure that includes the stationary portion of the airplane assembly sequence; and (ix) for each such assembly operation, it is assumed herein that the stationary part remains fixed with respect to a factory coordinate system and the part to be moved is moved by means of a system of powered assembly jacks into alignment with the stationary part. Moreover, the desired final location of the part to be moved is defined by a measurable position and orientation. The measurable position and orientation may include, for example and without limitation: fixed coordinates and directions in a GPS coordinate system; fixed monuments on a factory floor; or a stationary component of the desired structure to be assembled which is already located in its final position and into which the movable part is aligned and moved (and hence defines the desired final location of the part to be moved). For purposes of illustration only and without any limitation whatsoever, this desired final location will be referred to herein and shown in the drawings as a stationary component of the structure to be assembled.

Figure 31:
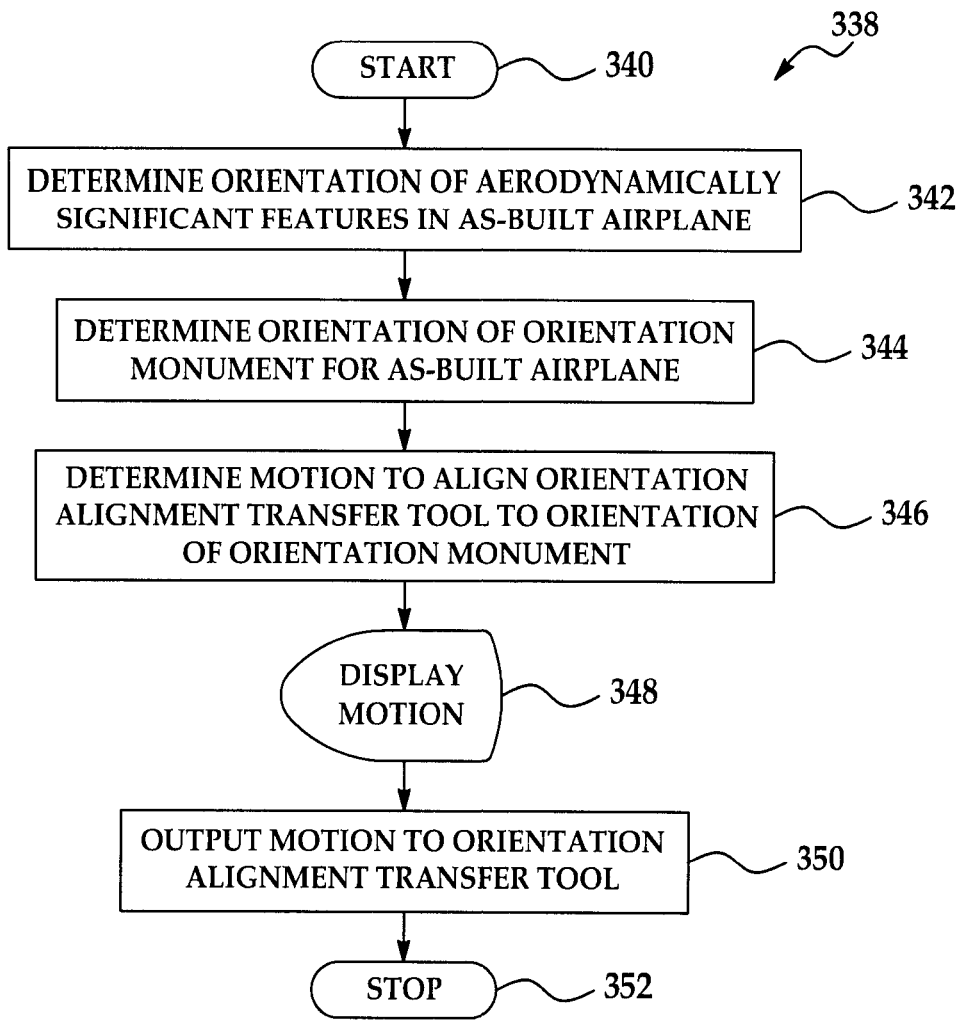
FIGS. 31-37 are flowcharts of an illustrative method for computing orientation alignment transfer tool locations.

Referring now to FIG. 31 and still given by way of overview, an illustrative method 338 for computing orientation alignment transfer tool location begins at step 340. At step 342 orientation of at least one aerodynamically significant feature of an as-built airplane is automatically determined. As discussed above, an aerodynamically significant feature means a subset of major assembly features that may significantly affect stability of an airplane at 1-g cruise when their orientation to the airstream deviates from nominal and may include, by way of non-limiting examples, left-hand and right-hand wing surfaces, left-hand and right-hand horizontal stabilizer surfaces, vertical stabilizer (vertical fin) surface, and left-hand and right-hand engine thrust vectors.

At a step 344 orientation of an orientation monument for the as-built airplane is automatically determined from the determined orientation of the at least one aerodynamically significant feature of the as-built airplane. At step 346 motion to align an orientation alignment transfer tool with the determined orientation of the orientation monument is automatically determined.

At step 348 the determined motion may be displayed. For reasons discussed further below, the motion may be displayed as Euler angles. At step 350 the determined motion may be output to an orientation alignment transfer tool. The method 338 stops at 352.

Now that an overview has been set forth and a context has been established, details of illustrative embodiments will be explained. First, illustrative embodiments for computing orientation alignment, line transfer tool location will be explained. Next, illustrative details will be set forth regarding computing orientation of components and determining motion. Illustrative details then will be explained regarding predicting cruise orientation. An illustrative system for performing the above functions will be described. Finally, screens from illustrative implementations of the above functions will be explained.

Figure 32:
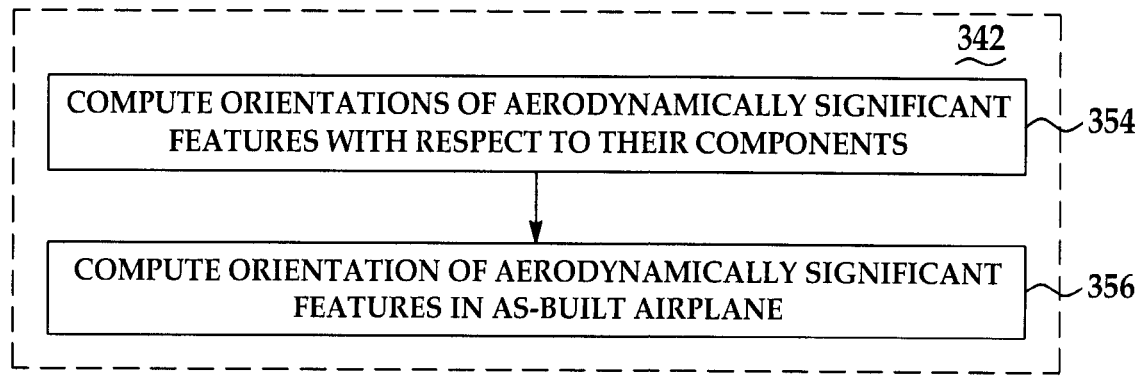

Referring additionally to FIG. 32, processing within step 342 to determine orientation of the aerodynamically significant features includes computing orientation of each aerodynamically significant feature with respect to its respective component at step 354 and computing orientation of the aerodynamically significant features with respect to the as-built airplane at step 356.

Figure 33:
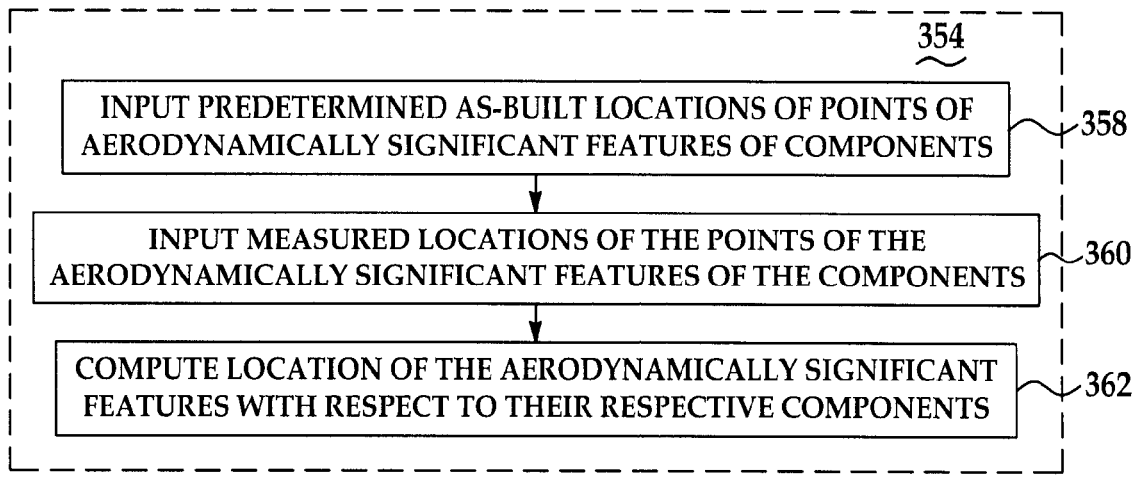

Referring additionally to FIG. 33, in an illustrative embodiment processing within the step 354 to compute orientation of each aerodynamically significant feature with respect to its respective component entails further processes. The processing of the step 26 determines where in a component an aerodynamically significant feature is located.

At a step 358, predetermined as-built locations of points of the aerodynamically significant features are input into suitable computer processing components (discussed further below). The predetermined data regarding the as-built positions of the points typically may be obtained from vendors and/or suppliers of the aerodynamically significant feature. The predetermined data may be in the form of point data which represent locations in engineering design space of as-built points on the aerodynamically significant feature.

At a step 360 measured locations of the points of the aerodynamically significant feature are input into suitable computer processing components (discussed further below). The locations can be measured using the measurement system 102 previously described, in terms of azimuth and elevation and converted into coordinates in a coordinate system of the structure to be assembled.

At step 362 the location of the at least one aerodynamically significant feature with respect to assembly interfaces of the component is computed from the predetermined as-built locations of the points of the at least one aerodynamically significant feature and from the measured locations of the points of the at least one aerodynamically significant feature. In some embodiments the location of at least one aerodynamically significant feature may be computed using a point cloud registration method. In some other embodiments the location of the at least one aerodynamically significant feature may be computed using a datum target registration method. Details of the point cloud registration method and the datum target registration method are discussed further below.

Figure 34:
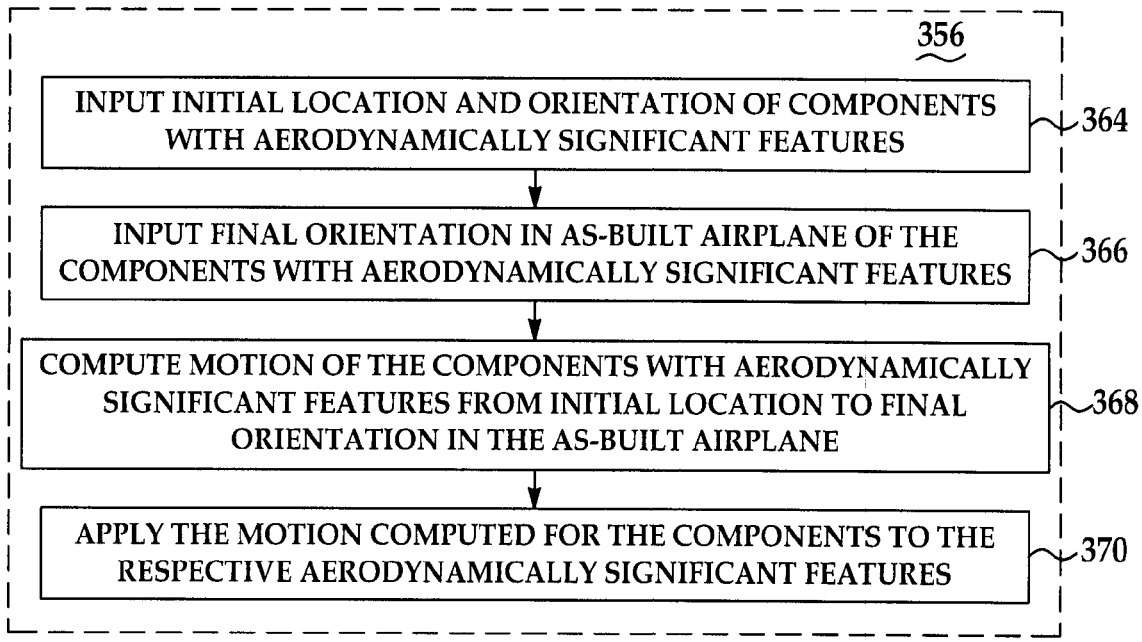

Referring additionally to FIG. 34, in an illustrative embodiment processing within step 356 to compute orientation of each aerodynamically significant feature with respect to the as-built airplane also entails further processes. The processing of the step 356 determines location and orientation within the as-built airplane of an aerodynamically significant feature based upon where in a component the aerodynamically significant feature is located and where in the as-built airplane the component is located.

At a step 364, initial location and orientation of at least one component with at least one aerodynamically significant feature are input into suitable computer processing components (discussed further below). For example, the component may an aft fuselage section (sometimes referred to as Section 47) of an airplane and the aerodynamically significant feature within the aft fuselage section may be a fin deck (which may affect the orientation of the vertical stabilizer). As another example, the component may be the Interface Reference Frame of a wing, which is determined by the mating features which control the assembly of the wing to the fuselage, and the aerodynamically significant feature within that reference frame may be the aerodynamic surface of the wing. In some embodiments, the initial location and orientation of components with aerodynamically significant features has already been determined as part of final assembly of the airplane. Thus, the initial location and orientation that has already been determined can be input.

At step 366, final orientation in an as-built airplane of the at least one component with at least one aerodynamically significant feature is input into suitable computer processing components discussed further below.

At step 368 motion of the at least one component with at least one aerodynamically significant feature from initial location of the at least one component with at least one aerodynamically significant feature to final orientation in the as-built airplane of the at least one component with at least one aerodynamically significant feature is automatically computed.

At step 370 the motion computed for at least one component with at least one aerodynamically significant feature is automatically applied to the at least one aerodynamically significant feature. By applying motion determined for a component to an aerodynamically significant feature within the component, location and orientation within the as-built airplane is determined for the aerodynamically significant feature.

Figure 35:
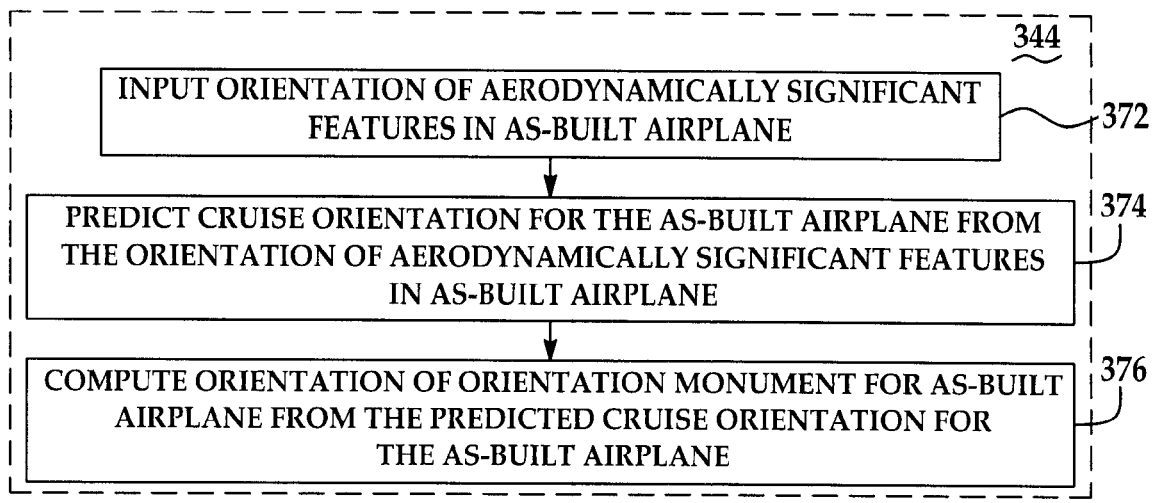

Referring now to FIGS. 31 and 35, in an illustrative embodiment processing within step 344 to compute orientation of the orientation monument entails further processes. At step 372 orientation of at least one aerodynamically significant feature in an as-built airplane is input into suitable computer processing components (discussed further below).

At step 374 cruise orientation for the as-built airplane is predicted from the orientation of at least one aerodynamically significant feature in the as-built airplane. Processing within step 46 to predict cruise orientation entails several processes. Details regarding illustrative processes for predicting cruise orientation for an as-built airplane are explained further below.

Figure 36:
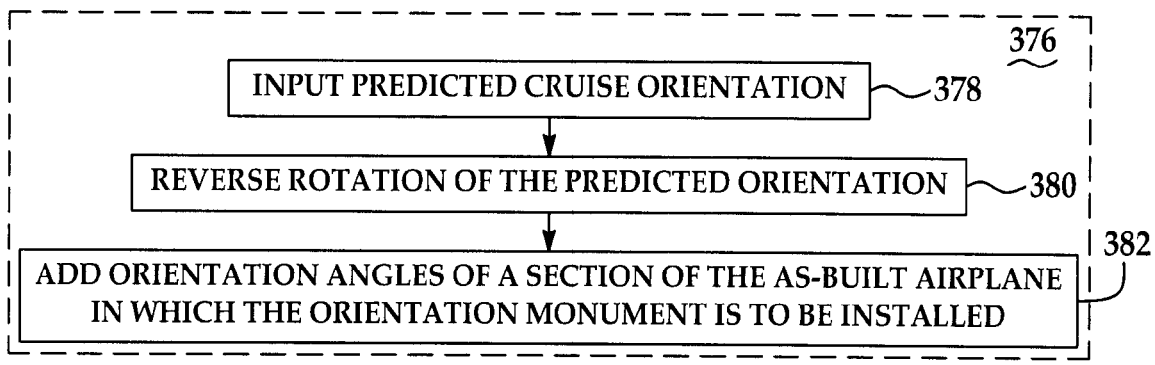

At step 376 orientation of the orientation monument for the as-built airplane is computed from the predicted cruise orientation for the as-built airplane. Illustrative processing within step 376 to compute orientation of the orientation monument entails several processes. Referring additionally to FIG. 36, at step 378 predicted cruise orientation is input into suitable, later discussed computer processing components.

At step 380, in some embodiments rotation of the predicted cruise orientation may be reversed. The rotation of the predicted cruise orientation is reversed because the cruise orientation prediction estimates the orientation change from the velocity vector to the as-built airplane, but that change which will be used in subsequent processing is the orientation change from the as-built airplane to the velocity vector.

At step 382, orientation angles of a section of the as-built airplane in which the orientation monument is to be installed (such as, without limitation, a mid-body section of a fuselage) are added to predicted (and, if applicable, reversed) cruise orientation. Orientation angles for the section of the as-built airplane in which the orientation monument is to be installed suitably have been determined as part of the final assembly process for the as-built airplane as described below. Adding the orientation angles of a section of the as-built airplane in which the orientation monument is to be installed produces orientation of the orientation monument with respect to a reference frame of the facility in which the line transfer tool is used.

Now that desired orientation of the orientation monument has been determined, at step 346 motion is determined to align orientation of the orientation alignment transfer tool to the determined orientation of the orientation monument. As discussed above, once the line transfer tool has been aligned with the determined orientation of the orientation monument an inertial reference device, such as a gyroscope or the like, can be placed into the line transfer tool and reset to the computed orientation alignment. The inertial reference device, reset to the orientation alignment, can be removed from the orientation alignment transfer tool and brought into the airplane, thereby "transferring" the computed orientation alignment to the into airplane. Then, the orientation monument can be installed as desired in the airplane.

Figure 37:
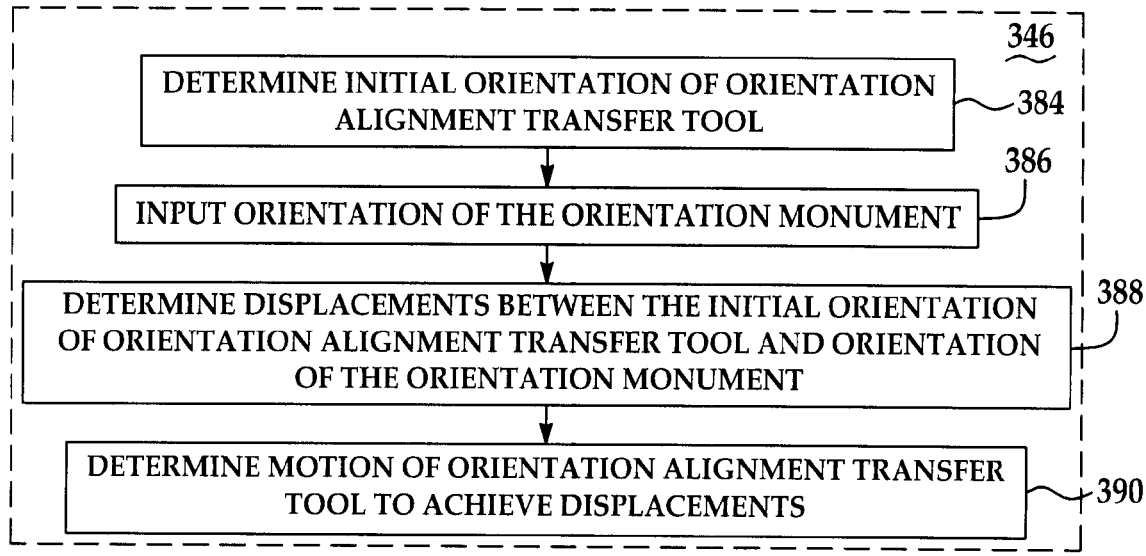

Processing within step 346 to determine motion to align orientation of the orientation alignment transfer tool to the determined orientation of the orientation monument entails several processes. Referring now to FIGS. 31 and 37, at step 384 initial orientation of the orientation alignment transfer tool is determined. Initial orientation of the line transfer tool may be determined as described below.

At step 386 the determined orientation of the orientation monument (that was determined at step 344 (FIGS. 31 and 36)) is input into suitable computer processing components (discussed further below).

At step 388 a displacement is automatically determined between the initial orientation of the orientation alignment transfer tool and the determined orientation of the orientation monument.

At step 390 motion of the orientation alignment transfer tool to achieve the displacement is automatically determined. The motion to achieve the displacement may be a rigid motion determined as described below.

Now that the method 338 has been explained, details of illustrative processes performed within the method 338 will be explained. These processes include point cloud registration method, datum target registration method, determination of location and orientation, and determination of motion.

In addition to use in the method 338 as described above, these processes may be used to determine motion for the assembly jacks for final assembly of airplane components into an as-built airplane (as well as other components and structures) as described previously herein.

The method 3380 computes line transfer tool location. As discussed above, computing line transfer tool location enables aligning orientation of the line transfer tool to the determined orientation of the orientation monument (that is based upon predicted cruise orientation for an as-built airplane), thereby enabling mounting of the orientation monument in an as-built airplane with the desired orientation of the orientation monument. As such, the method 338 uses data generated during computation of jack locations to align airplane parts for assembly into an as-built airplane.

Figure 38:
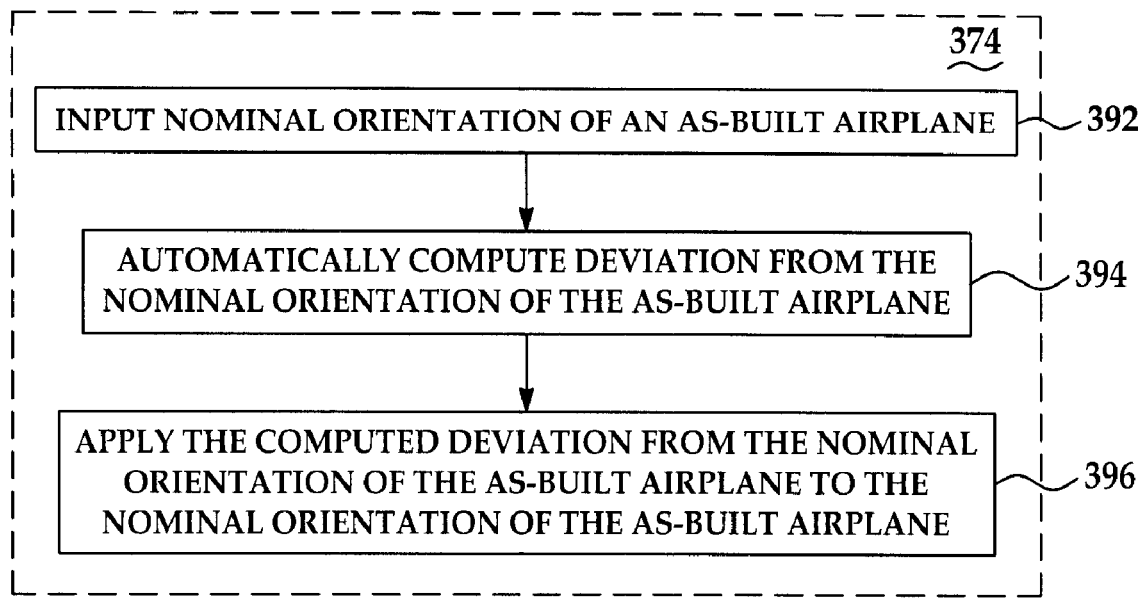

Referring now to FIG. 38, illustrative details are set forth regarding illustrative prediction of cruise orientation for the as-built airplane from the orientation of the at least one aerodynamically significant feature in the as-built airplane at step 374. By way of overview, at step 392 nominal orientation of an as-built airplane is input. Deviation from the nominal orientation of the as-built airplane is automatically computed at step 394, and the computed deviation from the nominal orientation of the as-built airplane is applied to the nominal orientation of the as-built airplane at step 396. Illustrative details will now be set forth.

Various assumptions may be made regarding cruise orientation as desired. For example, controls of the airplane are assumed to be trimmed per recommended procedures for the particular airplane. All movable surfaces are assumed to be rigged to nominal. Airplane load conditions are assumed to be at nominal. The airplane is assumed to be at 1-g cruise. The airplane is assumed to be operating in still air. Systems are assumed to be aligned to the as-defined airplane axis, and nominal airplane pitch at cruise is not considered.

Figure 39:
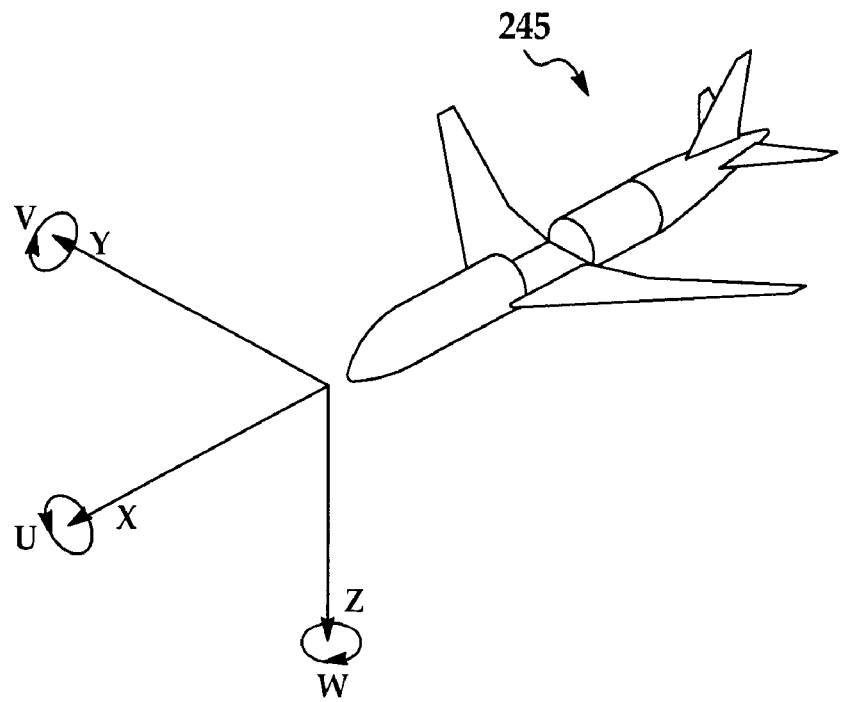

Referring additionally to FIG. 39, the nominal orientation of the as-built airplane was previously discussed in the context of the structure (airplane) 245 as a coordinate system that includes an X axis, a Y axis, and a Z axis. Variation from the nominal orientation suitably is measured as angular rotation, or angular offset, about the axes. For example, angular rotation U represents angular offset about the X axis; angular rotation V represents angular offset about the Y axis; and angular rotation W represents angular offset about the Z axis.

Figure 40:
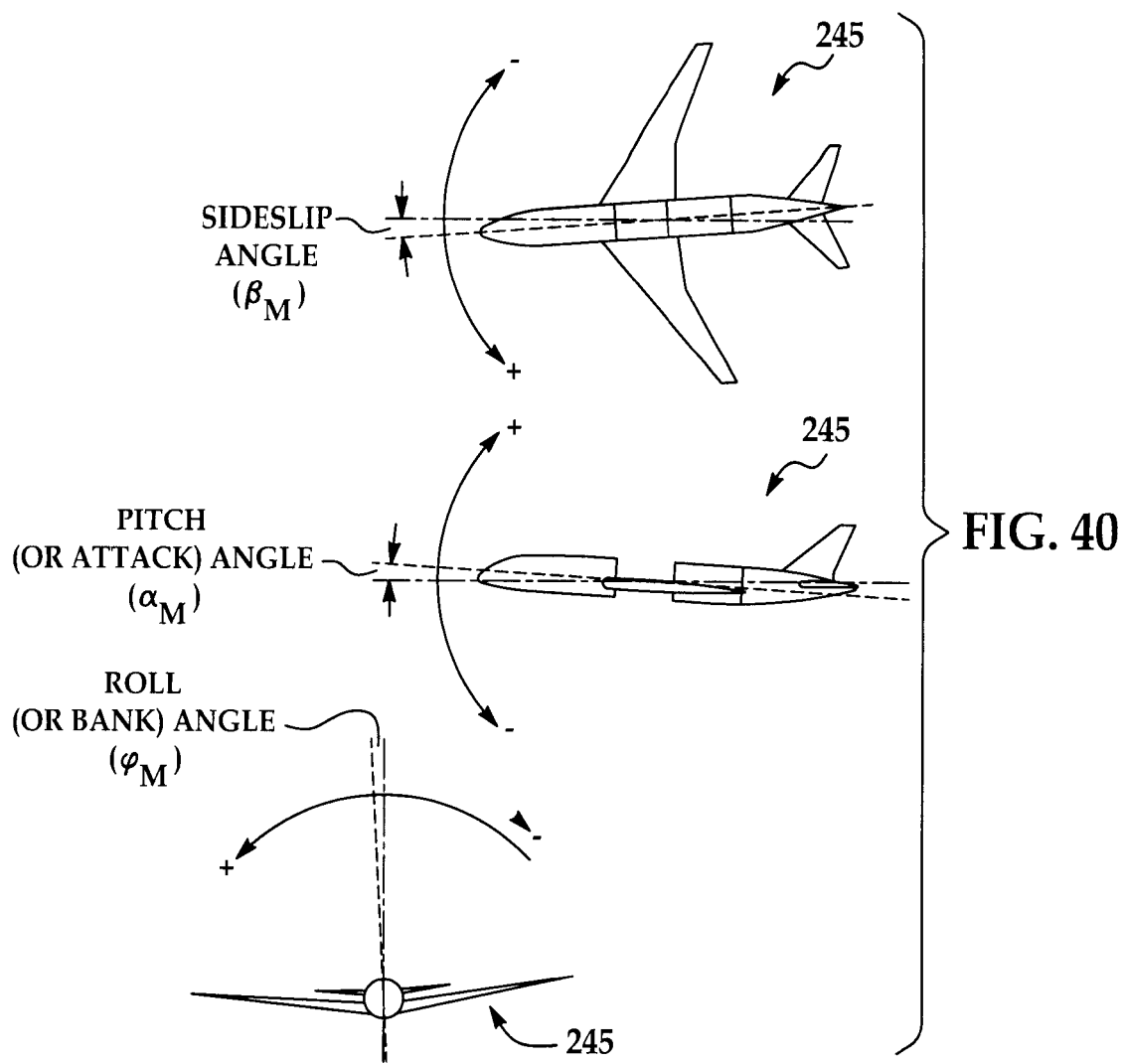

Referring additionally to FIG. 40, the predicted cruise orientation is represented by three components that are angular offsets from the nominal orientation of the as-built airplane. Offset pitch angle or offset angle of attack, $\alpha_M$, is angular rotation about the Y axis of the nominal cruise orientation. Offset sideslip angle, $\beta_M$, is angular rotation about the Z axis of the nominal cruise orientation. Offset roll angle or offset bank angle, $\phi_M$, is angular rotation about the X axis of the nominal cruise orientation.

Figure 41:
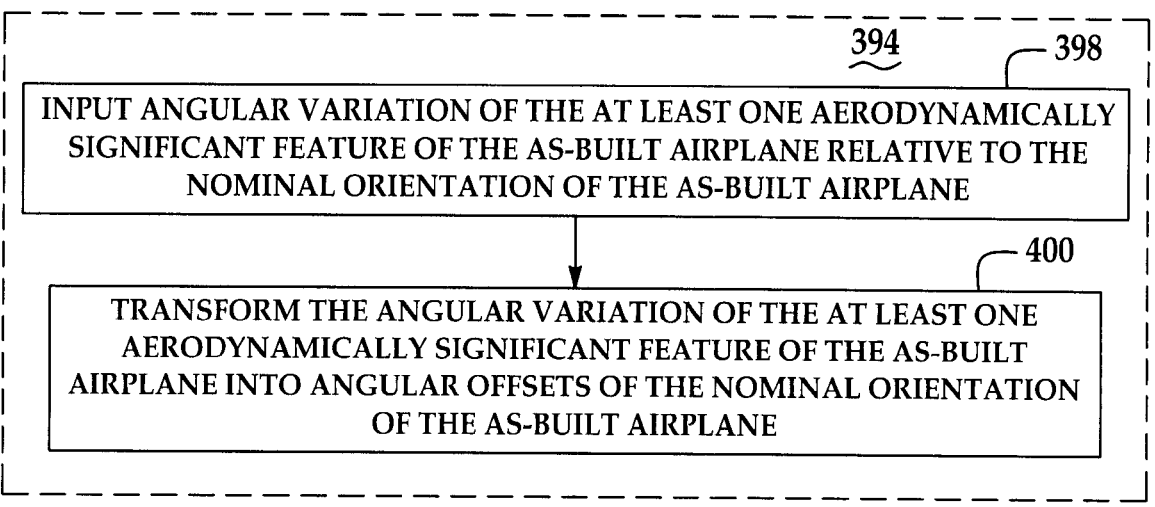

Referring additionally to FIG. 41, processing within step 394 to compute deviation from the nominal orientation of the as-built airplane entails further processes. At step 398 angular variation of at least one aerodynamically significant feature of the as-built airplane relative to the nominal orientation of the as-built airplane is input into suitable computer processing components (discussed further below), and at step 400 the angular variation of the at least one aerodynamically significant feature is automatically transformed into angular offsets of the nominal orientation of the as-built airplane.

Figure 42:
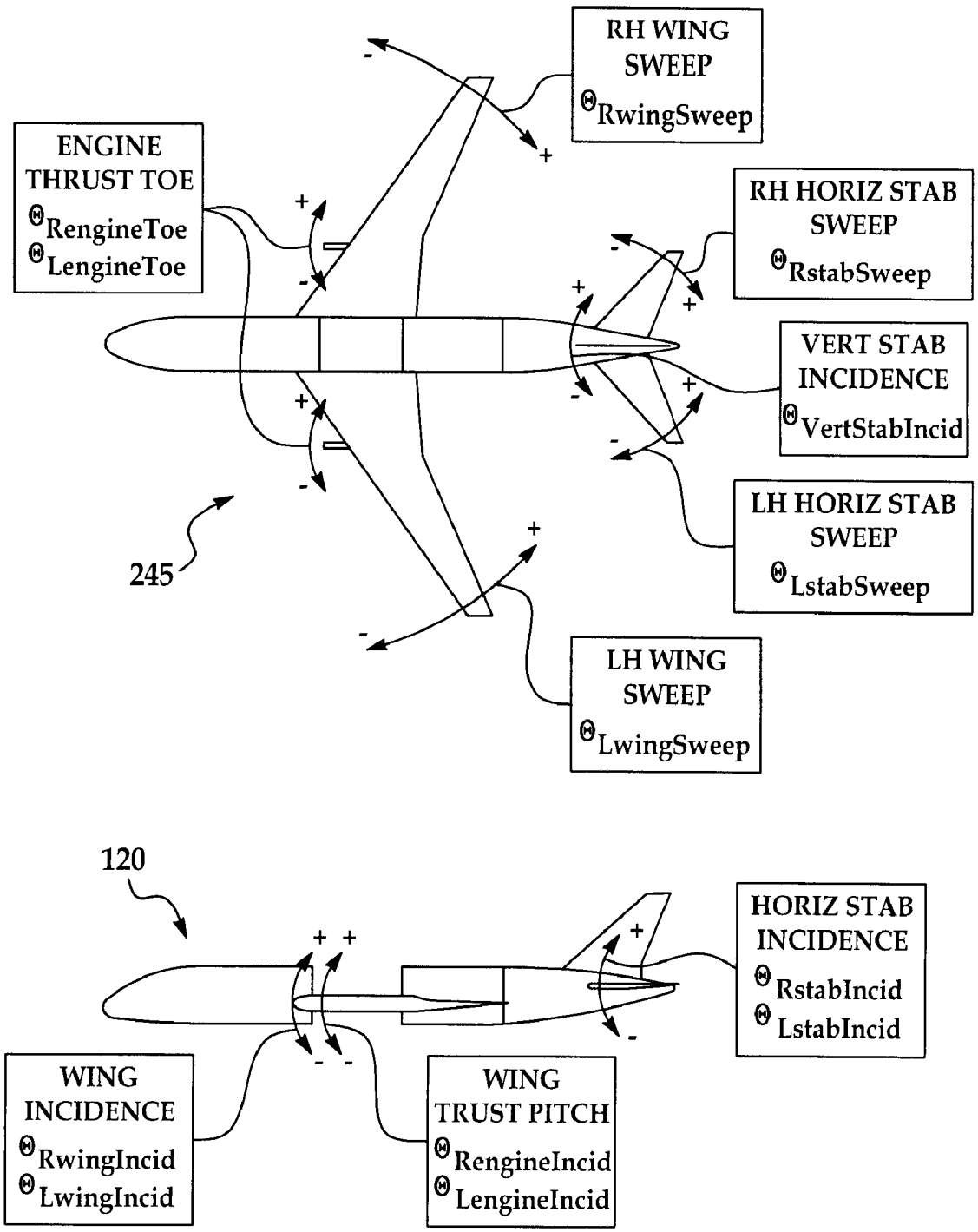

Referring additionally to FIG. 42, angular variation can be input for any one or more of several aerodynamically significant features of the as-built airplane. In general, reliability of prediction of cruise orientation will increase as the number of aerodynamically significant features (and, therefore, their angular variations that are input) is increased. Illustrative angular variations that can be input are shown in relation to the as-built airplane 245 in FIG. 42 and are listed below in Table 1. Table 1 is not intended to be limiting. To that end, it will be appreciated that not all of the angular variations shown in Table 1 need be used. It will also be appreciated that other angular variations, such as without limitation angular variation of a fuselage nose or the like, may be used in lieu of or in addition to the angular variations shown in Table 1.

TABLE 1

| Input Variable | Input Variable Description |
| --- | --- |
| $\theta_{RwingIncid}$ | Variation from nominal in the rotation of the right wing about the y-axis |
| $\theta_{LwingIncid}$ | Differential rotation between the right wing and the left wing about the y-axis ($\geq 0$) |
| A B S ($\theta_{RwingIncid} - \theta_{LwingIncid}$) | Variation from nominal in the rotation of the right wing about the z-axis |
| $\theta_{RwingSweep}$ | Variation from nominal in the rotation of the right wing about the z-axis |
| $\theta_{LwingSweep}$ | Variation from nominal in the rotation of the left wing about the z-axis |
| $\theta_{RstabIncid}$ | Variation from nominal in the rotation of the right hand horizontal stabilizer half about the y-axis |
| $\theta_{LstabIncid}$ | Variation from nominal in the rotation of the left hand horizontal stabilizer half about the y-axis |
| $\theta_{RstabSweep}$ | Variation from nominal in the rotation of the right hand horizontal stabilizer half about the z-axis |
| $\theta_{LstabSweep}$ | Variation from nominal in the rotation of the left hand horizontal stabilizer half about the z-axis |
| $\theta_{VertStabIncid}$ | Variation from nominal in the rotation of the vertical stabilizer about the z-axis |
| $\theta_{RengineIncid}$ | Variation from nominal in the rotation of the right hand engine thrust vector about the y-axis |
| $\theta_{LengineIncid}$ | Variation from nominal in the rotation of the left hand engine thrust vector about the y-axis |
| $\theta_{RengineToe}$ | Variation from nominal in the rotation of the right hand engine thrust vector about the z-axis |
| $\theta_{LengineToe}$ | Variation from nominal in the rotation of the left hand engine thrust vector about the z-axis |

Referring additionally to FIG. 43 processing within the step 400 to transform the angular variation entails further processes. At step 402 the angular variation of the at least one aerodynamically significant feature of the as-built airplane is formatted into an input vector. At step 404 transformation factors that correlate angular variations of aerodynamically significant features with angular offsets of components of cruise orientation are formatted into a transformation matrix.

At step 406 the transformation matrix is multiplied by the input vector to obtain an output vector with angular offsets of components of the predicted cruise orientation of the as-built airplane. Each of these processing steps will be discussed below.

Referring additionally to FIG. 44, at step 402 the angular variation of the at least one aerodynamically significant feature of the as-built airplane is formatted into an input vector d. The input vector d suitably may include angular variation for as many of the input variables (that is, angular variation for an aerodynamically significant feature) as discussed above as desired for a particular application. However, as discussed above, reliability of prediction of cruise orientation will increase as the number of aerodynamically significant features (and, therefore, their angular variations that are input) is increased. Thus, the input vector suitably is a column vector in which each row corresponds to the angular variation of an aerodynamically significant feature. To that end, the input vector d may be a column vector having rows equal in number to the considered aerodynamically significant features (for the example of Table 1, a 14×1 matrix).

Referring additionally to FIG. 45, at step 404 transformation factors that correlate angular variations of aerodynamically significant features with angular offsets of components of cruise orientation are formatted into a transformation matrix T. In some embodiments, the transformation matrix T suitably is a 3×14 matrix with rows corresponding to components of the cruise orientation (that is, angle of attack ($\alpha$), bank ($\phi$), and sideslip ($\beta$)) and columns corresponding to the aerodynamically significant features that are elements in the input vector d. To that end, the factors that populate the matrix suitably are the sensitivities of cruise orientation angles to the as-built orientation variation of the aerodynamically significant features.

Referring additionally to FIG. 46, formatting the transformation factors into the transformation matrix T at step 404 entails additional processing. At step 408 a first aerodynamic model is formatted into a first aerodynamic model matrix and at step 410 a second aerodynamic model is formatted into a second aerodynamic model matrix. At step 412 the first aerodynamic model matrix is multiplied by the second aerodynamic model matrix, thereby obtaining the transformation matrix T.

Referring additionally to FIG. 47, in some embodiments the first aerodynamic model matrix suitably is an aerodynamic model matrix F that is populated with values of force and moment contributions due to variations in alignment of an aerodynamically significant feature that result from a linearization of a computational fluid dynamics (CFD) analysis of an aerodynamic model of the airplane. However, it will be appreciated that the analysis need not be linearized. Given by way of non-limiting example, the CFD analysis may be a sensitivity analysis. Any suitable CFD computing tool, such as without limitation Tranair or the like, may be used as desired. Columns of the aerodynamic model matrix F suitably correspond to the angular offsets of the aerodynamically significant features that are elements in the input vector d. Rows of the aerodynamic model matrix F suitably correspond to forces and moments analyzed in the aerodynamic model, such as angle of attack moment AoA, a force $F_y$, a moment $M_x$, and a moment $M_z$. In such embodiments, the aerodynamic model matrix F is a 4×14 matrix.

In some embodiments the second aerodynamic model matrix suitably is an aerodynamic model matrix A that is populated with values of calculated forces and moments that result from a linearization of an analysis of response to perturbations of the forces and moments included in the aerodynamic model matrix F. However, it will be appreciated that the analysis need not be linearized. Given by way of non-limiting example, the response may be a control response. Any suitable computing tool, such as without limitation PSIM or the like, may be used as desired. Columns of the aerodynamic model matrix A suitably correspond to the angle of attack moment AoA, the force $F_y$, the moment $M_x$, and the moment $M_z$. Rows of the aerodynamic model matrix A suitably correspond to changes in angle of attack AoA, changes in bank, and changes in sideslip. In such embodiments, the aerodynamic model matrix A is a 3×4 matrix.

Thus, at step 406 the aerodynamic model matrix F is multiplied by the aerodynamic model matrix A according to the relationship T=A×F. In embodiments when the 4×14 aerodynamic model matrix F (FIG. 47) is multiplied by the 3×4 aerodynamic model matrix A (FIG. 47) at step 406, then the 3×14 transformation matrix T (FIG. 45) results.

Referring additionally to FIGS. 48 and 49, in some other embodiments it may be desirable additionally to consider aerodynamic forces and moments due to angular variation of the rudder. In such embodiments the aerodynamic model matrix F is the same 4×14 matrix shown in FIG. 47. However, in such embodiments the aerodynamic model matrix A is a 4×4 matrix. The top three rows of the aerodynamic model matrix A used in these embodiments are the same as those shown in FIG. 47. However, the aerodynamic model matrix A used in these embodiments includes a fourth row that corresponds to force and moment changes due to angular variation of the rudder. In such embodiments when the 4×14 aerodynamic model matrix F (FIG. 48) is multiplied by the 4×4 aerodynamic model matrix A (FIG. 48) at the step 406, then a 4×14 transformation matrix T (FIG. 49) results. The top three rows of the 4×14 transformation matrix T (FIG. 49) are the same as the three rows in the 3×14 transformation matrix T (FIG. 47). The fourth row of the 4×14 transformation matrix T (FIG. 49) corresponds to changes in rudder angle to realign the airplane from nominal orientation to its as-built, predicted cruise orientation.

After the transformation matrix T has been obtained according to the relationship T=A×F, at step 406 the transformation matrix T is multiplied by the input vector d according to the relationship O=T×d to obtain an output vector O with angular offsets of components of the predicted cruise orientation of the as-built airplane. In embodiments in which the 3×4 aerodynamic model matrix A (FIG. 47) is used to obtain the 3×14 transformation matrix T (FIG. 45), the output vector O is a 3×1 column vector with rows corresponding to angular offset of pitch angle or angle of attack ($\alpha_M$), angular offset of sideslip angle ($\beta_M$), and angular offset of roll angle or bank angle ($\phi_M$). In embodiments in which the 4×4 aerodynamic model matrix A (FIG. 48) is used to obtain the 4×14 transformation matrix T (FIG. 49), the output vector O is a 4×1 column vector with rows corresponding to angular offset of pitch angle or angle of attack ($\alpha_M$), angular offset of sideslip angle ($\beta_M$), angular offset of roll angle or bank angle ($\phi_M$), and angular offset of rudder to realign the airplane from nominal orientation to its as-built, predicted cruise orientation.

Referring now to FIG. 50, a system 414 is provided for computing orientation of the line transfer tool location and for predicting cruise orientation. A computer processing system 416 includes an input interface 418. Measurement data 420 regarding initial position of parts for alignment and initial position of the line transfer tool is provided to the input interface 418. Predetermined data 421 regarding the as-built positions of the points of the aerodynamically significant features, typically obtained from vendors and/or suppliers of the aerodynamically significant features, is also provided to the input interface 418. The predetermined data 421 may be in the form of point data.

In an illustrative embodiment, computer processing components of the computer processing system execute one or more spreadsheets 422, visual basic code 424, and routines from a dynamic link library 426. The spreadsheet 558 receives from the measurement system via the input interface 418 initial position measurement data from which the initial locations of the components to be assembled can be determined and from which initial location of the orientation alignment transfer tool can be determined. The spreadsheet 422 also receives from the input interface 418 the predetermined data 421 regarding the as-built positions of the points of the aerodynamically significant features. The spreadsheet 422 passes the resulting optimal assembly jack positions to external applications, such as without limitation an assembly jack control 428 or other external processes as desired, via an output interface 430. The spreadsheet 422 predicts cruise orientation and also passes computed orientation alignment transfer tool positions to an orientation alignment, line transfer tool control 429 via the output interface 430. The spreadsheet 422 receives feedback from the jack assembly control 428 via the input interface 418 on the actual locations of the jacks at final set.

In some embodiments, the spreadsheet computations can be divided into several separate spreadsheets as desired for a particular purpose. However, in some other embodiments the spreadsheet computations can be performed by a single spreadsheet. For purposes of clarity, the one or more spreadsheets 422 are referred to herein as the spreadsheet 422.

To perform its calculations, in some embodiments the spreadsheet 422 performs computations that use a mixture of spreadsheet formulas, the visual basic code 424 written in the Visual Basic for Applications (VBA) computer language (which is embedded in the spreadsheet 422), and the dynamic link library (DLL) 426 containing complex numerical computations which are implemented in the C computer language. If desired, the C code in turn also can be used by an upstream variation simulation process in a variation simulator 432. The purpose of this is to simulate the assembly effects of variation in individual parts to perform variation management trade studies during the engineering design phase. The sharing of numerical algorithms and software between the engineering design and factory assembly stages enables the factory assembly process to be the same process that was simulated during engineering design studies.

A display device 434 is operatively coupled to the computer processing system 416 to display motions. As discussed above, Euler angles suitably are used to communicate information about rotations to assembly mechanics on the factory floor.

Referring now to FIGS. 51-55, illustrative screen shots show processing performed by the spreadsheet 422 (FIG. 50) in illustrative embodiments. Given by way of non-limiting example, the screen shots illustrate processing of data for predicting cruise orientation, and computing orientation alignment transfer tool locations. For purposes of clarity, the screen shots illustrate a simplified assembly scenario in which (i) all major assemblies (that is, fuselage sections) are in their nominal positions on the factory floor except the aft section of the fuselage (referred to below as section 47) and (ii) all key features are at nominal orientation relative to their respective major assemblies except the vertical fin (an aerodynamically significant feature that is attached to the aft fuselage section). It will be appreciated that all numerical data shown on the screenshots are notional, and bear no relation to actual product data. It will also be appreciated that data regarding other aerodynamically significant features discussed above can be used in the illustrated computations. However, for the sake of brevity, only those computations regarding the vertical fin are discussed.

The sections (components) of the airplane 245 are assembled using the jacking system 104 (FIG. 3) and spreadsheets 302 (FIG. 27), as previously described. At this point, the resultant assembled structure is referred to as an as-built airplane 245. Now that the airplane 245 has been assembled, measurement data taken to assemble the airplane and computations made in assembling the airplane are used to compute orientation alignment transfer tool locations.

Figure 51:
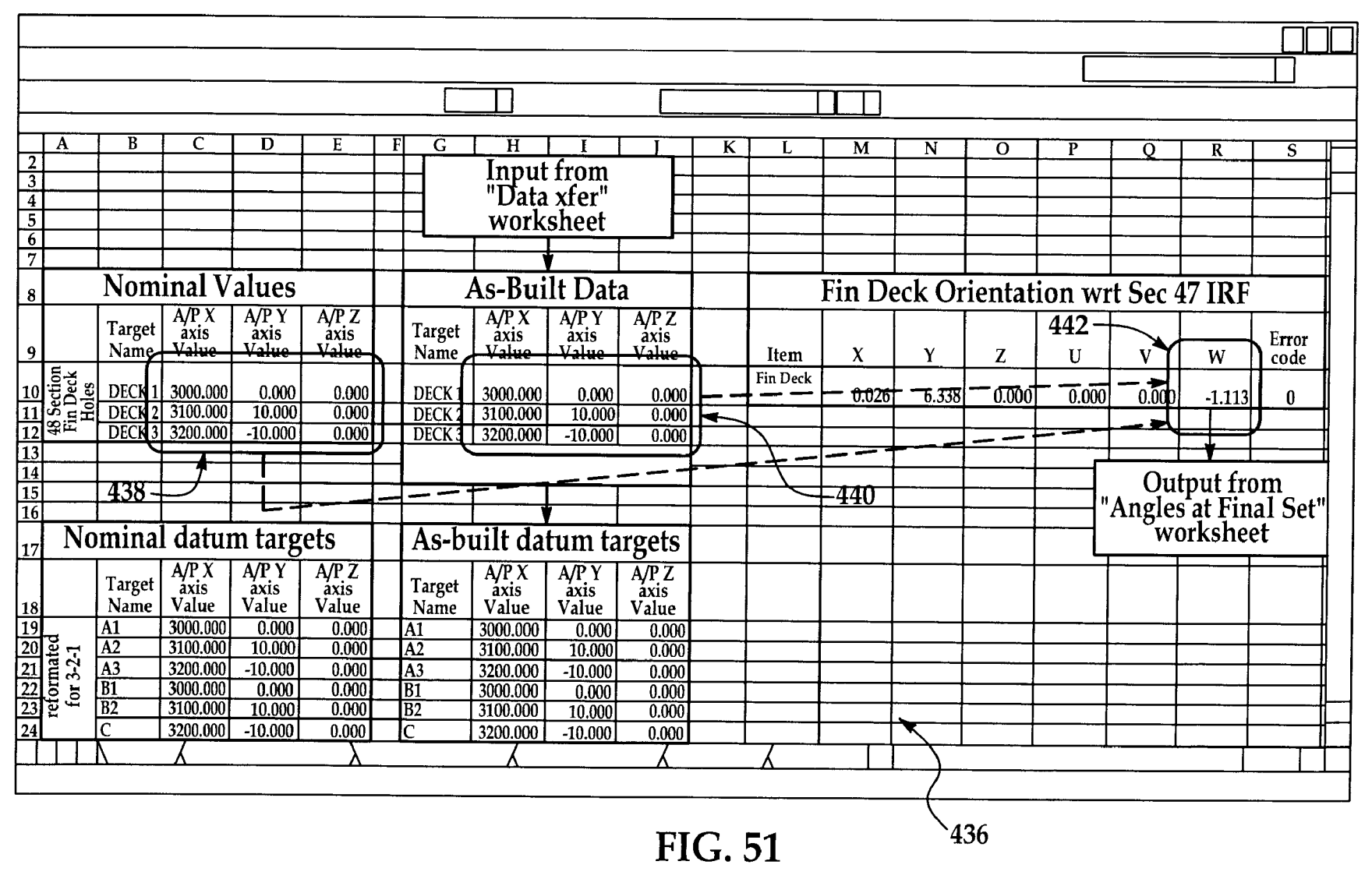

Referring now to FIG. 51, nominal and measured locations of points on the fin deck are used to compute actual as-built orientation of the vertical fin with respect to section 47. In a screen 436 the predetermined data 421 (FIG. 50) regarding the as-built positions of the points of the aerodynamically significant feature (in this case, the fin deck) populates cells 438. The measurement data 420 (FIG. 50) regarding measured locations of points on the fin deck populates cells 440. The data from the cells 438 and 440 are used by a point cloud registration method or a datum target registration method, as desired, to compute the as-built orientation of the vertical fin with respect to section 47. Data regarding the computed, as-built orientation of the vertical fin with respect to section 47 populates a cell 442.

Figure 52:
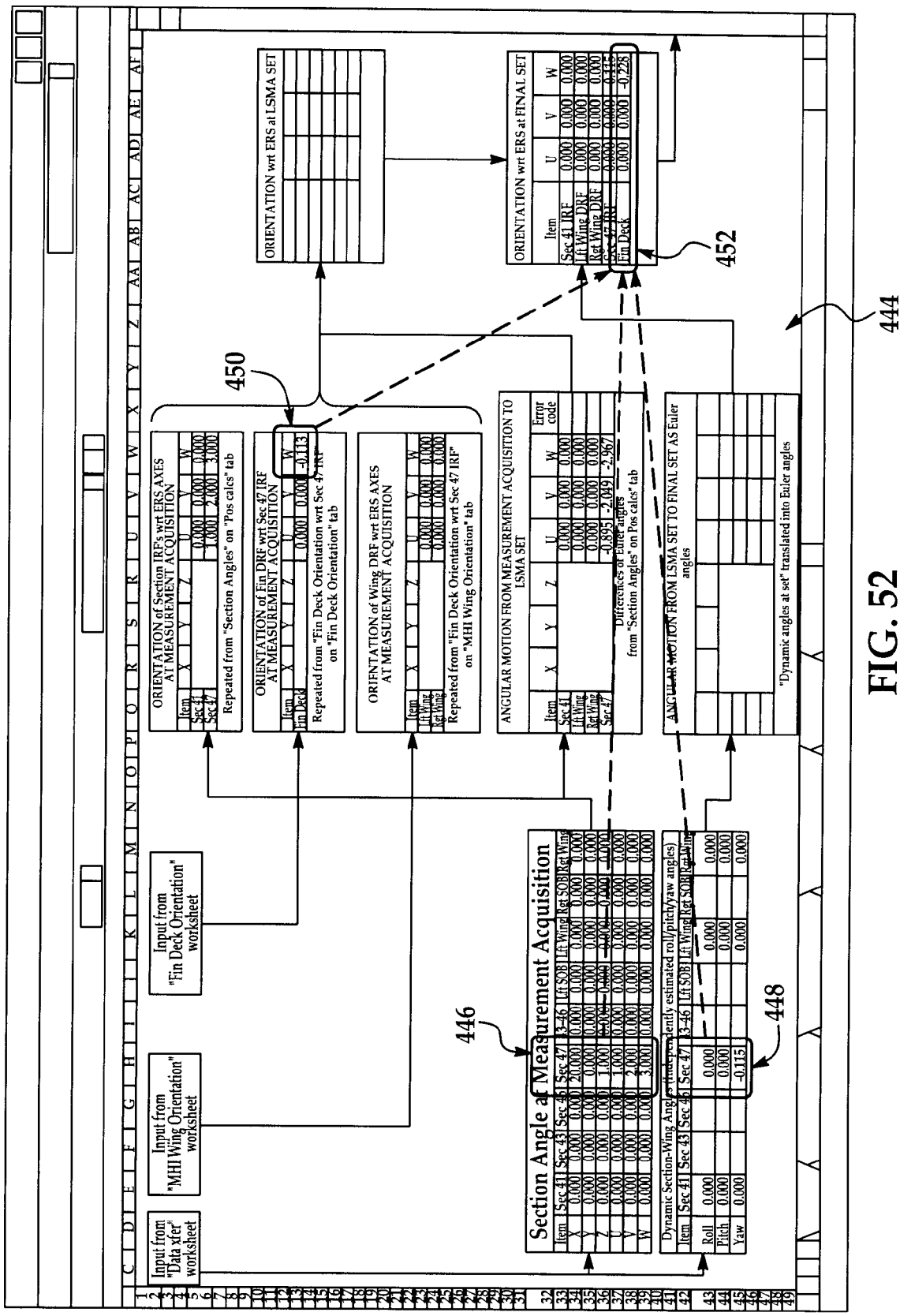

Referring now to FIG. 52, initial location and orientation of section 47, orientation of section 47 at final set, and the computed, as-built orientation of the vertical fin with respect to section 47 are used to compute orientation of the fin deck at final set. In a screen 444 data regarding initial location and orientation of section 47 populates cells 446. Data regarding orientation of section 47 at final set populates cells 448. Data regarding the computed, as-built orientation of the vertical fin with respect to section 47 populates a cell 450. Rigid motion is computed and applied using the data in the cells 446, 448, and 450 to compute the orientation of the fin deck at final set). Data regarding the computed orientation of the fin deck at final set populates cells 452.

Figure 53:
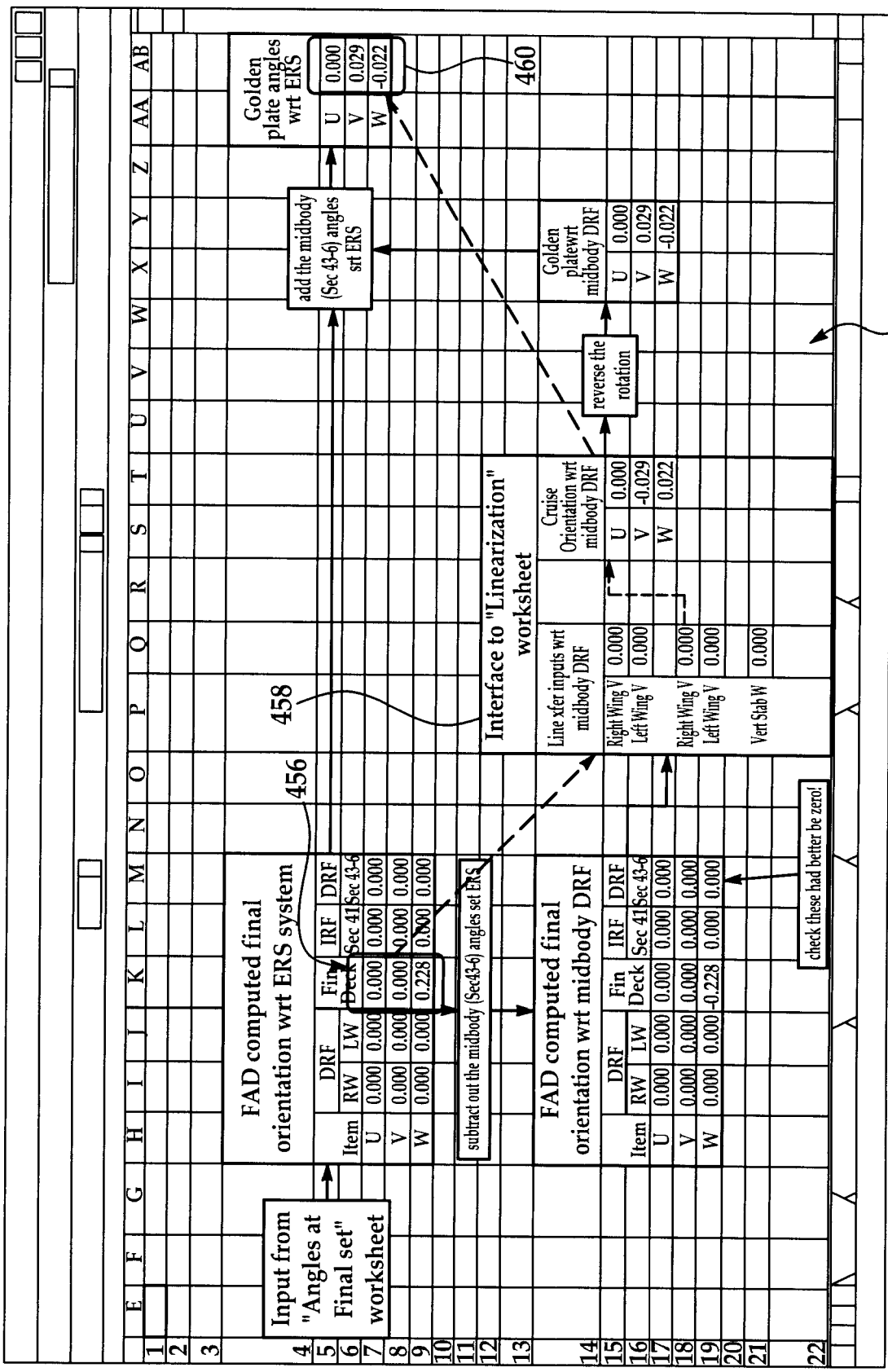

Referring now to FIG. 53, fin deck orientation is fed into an aerodynamics model to produce orientation of the orientation monument. In screen 454 data regarding orientation at final set of the aerodynamically significant features is entered. For example, data regarding orientation of the fin deck at final set populates cells 620. The data regarding orientation at final set of the aerodynamically significant features is provided to an interface 458 to an aerodynamics model that predicts cruise orientation. As shown in screen 454, the predicted cruise orientation may be reversed to produce orientation of the orientation monument with respect to a reference frame of the section of the airplane in which the orientation monument is to be mounted. As also shown in the screen 454, orientation of the section of the airplane in which the orientation monument is to be mounted may be added to produce orientation of the orientation monument with respect to a reference frame of the facility in which the line transfer tool is used. The predicted orientation of the orientation monument populates cells 460.

Referring now to FIG. 54, initial orientation of the orientation alignment transfer tool is computed. In screen 462 the measurement data 420 of initial location of targets located on the orientation alignment transfer tool populates cells 464. Nominal locations of the targets located on the orientation alignment transfer tool populates cells 466. Initial orientation of the line transfer tool is computed from the data in the cells 464 and 466 using the datum registration method. Data regarding initial orientation of the orientation alignment transfer tool populates cells 468.

Figure 55:
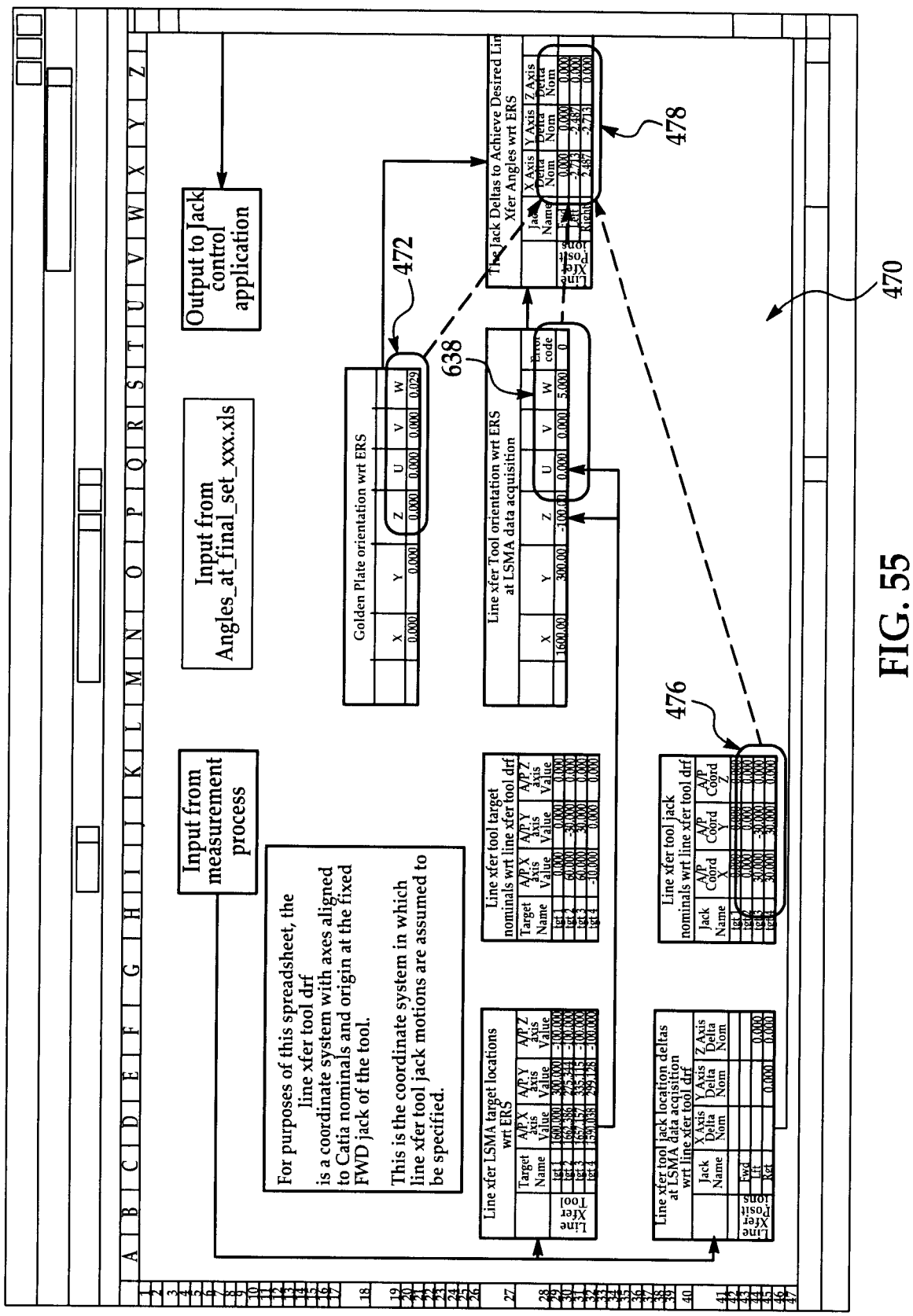

Referring now to FIG. 55, motion is computed to align the line transfer tool to orientation of the orientation monument. In screen 470 the predicted orientation of the orientation monument from the cells 460 (FIG. 53) populates cells 472. The data regarding initial orientation of the orientation alignment transfer tool from the cells 468 (FIG. 54) populates cells 474. Displacements are determined between the initial orientation of the orientation alignment transfer tool and the predicted orientation of the orientation monument. Data regarding initial location of the orientation alignment transfer tool populates cells 476. Rigid motion is determined to effect the displacements (computed from the data in the cells 472 and 474) from the initial location of the line transfer tool (from the data in the cells 476). Data regarding deltas that describe the determined motion populate cells 478.

In various embodiments, portions of the system and method include a computer program product. The computer program product includes a computer-readable storage medium, such as a non-volatile storage medium, and computer-readable program code portions, such as a series of computer instructions, embodied in the computer-readable storage medium. Typically, the computer program is stored and executed by a processing unit or a related memory device, such as processing components of the computer processing system 416 depicted in FIG. 50.

Transferring Line-of-Flight

Once the cruise orientation or "line-of-flight" of the airplane 245 has been determined using the method described above, the line-of-flight (optimized cruise orientation) may be transferred into the interior of the airplane 245 where it may be embedded as a physical reference or "monument". This physical reference may be used to calibrate/initialize flight controls and avionics, and also provides a physical reference after the airplane 245 has been placed in service to aid in the recalibration of flight controls, if necessary. As previously described, these spatial measurements of the components are used to displace the jacks 246 (FIGS. 3 and 15) which move the components to their final assembly position. The disclosed embodiments may, in part, utilize data representing the final position of the jacks 246 to orient a line transfer tool 480 which is used to establish the physical reference on the airframe of the airplane 245.

Referring now to FIGS. 56-60, the transfer tool 480 broadly comprises a frame 482 moveably mounted on a wheeled tool base 490. Three triangularly arranged servo controlled motors 488 are operated by a computer 502 in order to displace the frame 482 about orthogonal axes corresponding to pitch and roll. A fourth servo controlled motor 504 is used to rotate the frame 482 about a third, yaw axis. Thus, the frame 482 is displaceable along pitch, roll and yaw axes determined by commands issued by the computer 502, which may comprise, for example, a programmed PC.

The frame 482 includes a base leg 484 and a center leg 486 extending perpendicular to the base leg 484. Two laser targets 492 are respectively mounted on the ends of the base leg 484, and a third laser target 492 is mounted on the end of the center leg 486. Further, a laser target 492 may be mounted on the frame 482, intermediate the ends of the center leg 486. The targets 492 may comprise, for example, conventional reflectors that are operative to reflect a laser beam forming part of a laser measurement system similar to those previously described in connection with the measurements taken to establish the location of the components. The laser measurement system effectively determines the 3-dimensional orientation of the frame 482 in space in terms of pitch, roll and yaw axes. A generally triangular plate 518 is secured to the frame 152 and provides a surface upon which the computer 502 and other devices may be mounted.

The tool 480 further includes a generally triangular, substantially flat tool reference surface 512 which is removably mounted on plate 518 by means of pins 514 which extend through bushings 508 in the tool reference surface 512. Spring loaded keepers 516 may be employed to hold down the reference surface 512 against the mounting plate 518. A yaw adjustment 500 may be mounted on the tool reference surface 512 for purposes that will described later. An inertial reference unit (IRU) 498 is mounted on the tool reference surface 512 by means of a mounting bracket 499. The mounting bracket 499 is secured to the tool reference surface 512 and includes apertures 520 for receiving pins 522 along one edge of the inertial reference unit 498. Similarly, the IRU 498 includes apertures 524 on one side thereof which receive corresponding pins 526 formed in the mounting bracket 499. Finally, an aperture 528 in the inertial reference unit 498 between the pins 522 receives a corresponding pin 530 in the mounting bracket 499. The pins and apertures described immediately above removably mount the IRU 498 on the tool reference surface 512.

The IRU 498 may comprise, for example, a micro inertial reference system such as that commercially available from Honeywell Aerospace comprising an all digital, high performance ring laser gyro based initial reference system that provides digital outputs. Once initialized, the IRU 498 may record the three dimensional orientation of a body, such as the tool reference surface 512, and retains the recorded orientation when the tool reference surface 512 is moved to another location.

As will be described later, the final position of the servo jacks 246 which are related to the line-of-flight of the airplane 245, are delivered to the computer 502 as a data file that may be used by the computer 502 to control the servo motors 488, 504. The servo motors 488, 504, under control of computer 502, orient the tool frame 482, and thus the tool reference surface 512 to match the line-of-flight (cruise orientation) of the airplane 245, which are related to the final position of the jacks 246. The orientation of the tool reference surface 512 representing the airplane's line-of-flight is recorded by the IRU 498. Thus, the line transfer tool 480 provides the physical and dimensional link between the external measurement system and the IRU 498.

Once the orientation of the tool reference surface 512 (representing the calculated line-of-flight) is recorded by the IRU 498 while outside of the airplane 245, the tool reference surface 512 having the IRU 498 mounted thereon is removed from the mounting plate 518 and transferred by a worker into the airplane 245 to a location where a physical reference is to be established that serves as a permanent physical record of the airplane's optimize line-of-flight. As the tool reference surface 512 is carried into the airplane 245, the IRU 498 maintains a record of the exact orientation of the tool reference surface 512 when it was displaced to an orientation representing the line-of-flight under the control of the computer 502.

Referring also now to FIGS. 61-63, the airplane 245 includes an airframe 560 comprising longitudinally extending frame members 562 secured on transversely extending frame members 564. Three built up pads 566a, 566b are arranged in a triangle on beams 564 and each comprise flat, relatively thin, removable laminations 568. In one application, for example and without limitation, the laminated pads 566a, 566b each have a size of 1 inch×1 inch×0.2 inches wherein the thickness comprises multiple 0.003 inch thick laminations. The individual laminations 568 may be removed one at a time in order to adjust height of the corresponding pads 566a, 566b, which as will become apparent below, form hard points inside the airplane 245 on which the tool reference 512 surface may be mounted.

After the tool reference surface 512 has been displaced outside the airplane 245 to an orientation corresponding to the optimized line-of-flight of the airplane 245, and this orientation has been recorded by the IRU 498, the tool reference surface 512 with the IRU 498 mounted thereon is moved into the airplane 245 and is placed on the frame members 564 such that the forward drill bushings 508a are aligned over pad 566a, and the rear drill bushings 508b are respectively aligned over rear pads 566b. Laminations 568 are removed from the pads 566a, 566b, as required, until the orientation (pitch and roll) of the tool reference surface 512 correspond to that recorded by the IRU 498.

At this point, drill bushing 508a is used as a guide to drill a hole in the pad 566a, thereby fixing the forward portion of the tool reference surface 512 to the frame 560. Then, the yaw adjustment screw 500 is used to move the rear portion of the tool reference surface 512, in an arc around the forward end of the tool reference surface which has been fixed to one of the frame members 564. The adjustment screw 500 bears against a frame member or stop (not shown) which can be fixed either to one of the frame members 564 or 562 to react against the tool reference surface 512. The adjustment screw 500 effectively adjusts the yaw position of the tool reference surface 512 until the yaw corresponds to that previously recorded by the IRU 498. Once the tool reference surface 512 has been adjusted into an orientation corresponding to the optimized line-of-flight recorded while the tool reference surface 512 was on the tool 480, holes are drilled in the pads 566a, 566b which act as a permanent monument and physical reference record of the optimized line-of-flight.

Attention is now directed to FIG. 64 which illustrates the basic steps of a method for transferring the line-of-flight into the interior of the airplane 245. Beginning at step 570, an input file is generated representing the spatial measurements of the components of the airplane 245 which are to be assembled. The servo jacks 246 of the jacking system 244 are initialized at 572 to 0,0,0 position coordinates so that the servos are synchronized to the spatial measurements of the components in the same coordinate system. Next, step 574, the jacks 246 are displaced under control of a computer program in order to move and position the components into their final assembly position.

At step 576, the components are joined together, thus permanently fixing the relative orientation of the aerodynamic features of the components which determine the line-of-flight of the airplane. At 578, the final positions of the jack servos are transferred to the line transfer tool 480 where they are loaded into the computer 502. Next, at 580, the position of the tool reference surface 512 is determined in three dimensions. At step 582, the optimized values for aerodynamic pitch, roll and yaw angles of the airframe are calculated, following which, at step 584, the tool reference surface 512 is displaced by servos 488, 504 so that the tool reference surface 512 is brought into an orientation matching the optimized values for pitch, roll and yaw calculated at 582.

At step 586, the IRU 498 is initialized and then indexed to record the orientation of the tool reference surface 512 representing the optimized line-of-flight. At 588 the angular orientation of the IRU 498 is electronically zeroed, following which the tool reference surface 512 is removed from the transfer tool 480 installed on the airframe using the IRU 498. Finally, at step 590, avionics and other flight controls are calibrated based on the physical reference recorded on the airframe which represents the optimized line-of-flight.

Additional details of the method are shown in FIG. 65. Beginning at 594, the alignment system is energized following which at 596 components of the airplane 245 are loaded onto the alignment system. The identification number (ID) of the airplane 245 is then input into the alignment system at 598. At 600 the point cloud template spreadsheet is retrieved. Then, at 602, the components are measured and the point cloud files are generated. The point cloud files are then transferred to the alignment system at 604 and at 606 the point cloud files are parsed and transferred to the point cloud spreadsheet.

At 608 the positioning system is initialized to the point cloud spreadsheet output data and the major airplane components are then aligned, as required at 610. Once the alignment of the components is verified as being correct at 612, alignment system output files are generated at 614 and the resulting output data is transmitted to a network server at 616.

At this point, the line transfer tool 480 is energized at 618 and the ID of the airplane 245 is input into the computer 502, as shown at step 620. The computer 502 then retrieves the aero-alignment spreadsheet template at 622 as well as the alignment system angle data as shown at step 624. The initial orientation of the line transfer tool 480 is measured at 626 and at 628 this orientation data is transferred to the computer 502 which forms part of the line transfer tool 480. At step 630, the line transfer tool 480 is translated to the aero spreadsheet output orientation and the IRU 498 is then energized at step 632, where, after the IRU optical gyros have been allowed to stabilize, the IRU 498 is used to orient the tool reference surface on the airframe, as shown at step 634, thus establishing a physical reference on the airframe representing the optimized line-of-flight of the airplane 245.

Embodiments of the disclosure may find use in a variety of potential applications, particularly in the transportation industry, including for example, aerospace, marine and automotive applications. Thus, referring now to FIGS. 66 and 67, embodiments of the disclosure may be used in the context of an aircraft manufacturing and service method 700 as shown in FIG. 66 and an airplane 702 as shown in FIG. 67. During pre-production, exemplary method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine maintenance and service 716 (which may also include modification, reconfiguration, refurbishment, and so on).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 67, the aircraft 702 produced by exemplary method 700 may include an airframe 718 with a plurality of systems 720 and an interior 722. Examples of high-level systems 720 include one or more of a propulsion system 724, an electrical system 726, a hydraulic system 728, and an environmental system 730. Any number of other systems may be included. Although an aerospace example is shown, the principles of the disclosure may be applied to other industries, such as the marine and automotive industries.

Systems and methods embodied herein may be employed during any one or more of the stages of the production and service method 700. For example, components or subassemblies corresponding to production process 90 may be assembled in a manner similar to components or subassemblies produced while the aircraft 702 is in service. Also, one or more apparatus embodiments, method embodiments, or a combination thereof may be utilized during the production stages 708 and 710, for example, by substantially expediting assembly of or reducing the cost of an aircraft 702. Similarly, one or more of apparatus embodiments, method embodiments, or a combination thereof may be utilized while the aircraft 702 is in service, for example and without limitation, to maintenance and service 716.

Although the embodiments of this disclosure have been described with respect to certain exemplary embodiments, it is to be understood that the specific embodiments are for purposes of illustration and not limitation, as other variations will occur to those of skill in the art.

The invention claimed is:

1. A system for assembling components of an aerospace vehicle, comprising:
   a locating system for determining the locations of each of the components;
   an automated jacking system including assembly jacks for moving the components into assembly alignment based on the determined locations of the components; and,
   means for determining cruise orientation of the aerospace vehicle based on final assembly locations of the components determined by the locating system.

2. The system of claim 1, further comprising:
   means for transferring the cruise orientation of the aerospace vehicle into a physical reference located inside the aerospace vehicle.

3. The system of claim 2, wherein the means for transferring the cruise orientation of the aerospace vehicle includes:
   a tool positioned outside the aerospace vehicle and including a tool reference surface,
   means for moving the tool reference surface to an orientation corresponding to the determined cruise orientation, and,
   means for recording the orientation of the tool reference surface.

4. The system of claim 3, wherein the means for moving the tool reference surface includes servo motors for moving the tool reference surface about pitch, roll and yaw axes.

5. The system of claim 3, wherein:
   the means for recording the orientation of the tool reference surface includes an inertial reference unit, and
   the tool reference surface is removably mounted on the tool to allow the tool reference surface and the inertial reference unit to be moved into the aerospace vehicle.

6. The system of claim 1, wherein the locating system includes:
   a measurement system configured to simultaneously determine locations of a plurality of features of the components, the measurement system being located separate from the assembly jacks, and
   a data processing system configured to determine relative positions of the components in a coordinate system of the aerospace vehicle.

7. The system of claim 6, wherein the measurement system includes:
   a plurality of transmitters arranged in a constellation, and
   a plurality of component targets disposed about the plurality of components in a plurality of predetermined locations that are known in the coordinate system of the aerospace vehicle.

8. The system of claim 7, wherein the measurement system further includes a plurality of reference targets that are arranged in an assembly area in a plurality of predetermined positions that are known in a coordinate system of the assembly area.

9. The system of claim 1, wherein the automated jacking system includes a system for computing assembly jack locations to align the components for assembly, the jack location computing system including:
   an input interface configured to receive data from the locating system representing the initial locations of the components to be moved and a desired final location for the components to be moved,
   a computer processor operatively coupled to the input interface, the computer processor including—
      a first computer processing component configured to automatically determine initial locations of the components to be moved and the final location from the initial location data,
      a second computer processing component configured to automatically determine motion to align the components to be moved with the final location,
      a third computer processing component configured to automatically determine optimal displacements of assembly jacks to produce the determined motion,
      a fourth computer processing component configured to, after the components have been moved, automatically determine location of the moved components at a final assembled position, and
   a display device operatively coupled to the computer processor.

10. The system of claim 1, wherein the means for determining the cruise orientation of the aerospace vehicle, as-built includes:
   a first computer processing component configured to automatically compute deviation from nominal orientation of the as-built aerospace vehicle, and
   a second computer processing component configured to apply the computed deviation from the nominal orientation of the as-built aerospace vehicle to the nominal orientation of the as-built aerospace vehicle.

11. A method of assembling components of an aerospace vehicle, comprising:
   determining the locations of the components of the aerospace vehicle using a locating system;
   moving the components of the aerospace vehicle into assembly alignment using assembly jacks, including controlling the movements of the assembly jacks based on the determined locations of the components; and,
   determining cruise orientation of the aerospace vehicle based on the final assembly locations of the components determined by the locating system.

12. The method of claim 11, wherein determining the locations of the components includes:
   simultaneously determining locations of a plurality of features of the components, and
   determining relative positions of the plurality of components in a coordinate system of the aerospace vehicle.

13. The method of claim 12, further comprising:
   determining locations of a plurality of transmitters in a constellation of transmitters, including determining azimuth and elevation of the plurality of transmitters relative to locations of a plurality of reference targets that are arranged in an assembly area in a plurality of predetermined positions that are known in a coordinate system of the assembly area.

14. The method of claim 13, further comprising:
preparing the plurality of components for measurement, including disposing a plurality of component targets about the components in a plurality of predetermined locations that are known in the coordinate system of the aerospace vehicle.

15. The method of claim 11, further comprising simultaneously determining locations of a plurality of features of the components includes simultaneously determining azimuth and elevation of a plurality of component targets arranged in a plurality of predetermined positions on the components relative to the locations of a plurality of transmitters.

16. The method of claim 15, wherein:
determining the locations of the components includes automatically determining initial locations of the components and a desired final location for the components from initial position measurement data for the components and the final location,
moving the components includes automatically determining motion to align the components with the final location, and automatically determining optimal displacements of the assembly jacks to produce the determined motion, and
wherein, after the components have been moved, determining the locations of the components further includes automatically determining location of the components at final assembled positions.

17. The method of claim 11, wherein determining the cruise orientation includes:
inputting nominal orientation of an as-built aerospace vehicle,
automatically computing deviation from the nominal orientation of the as-built aerospace vehicle, and
applying the computed deviation from the nominal orientation of the as-built aerospace vehicle to the nominal orientation of the as-built aerospace vehicle.

18. The method of claim 17, wherein automatically computing deviation from the nominal orientation of the as-built aerospace vehicle includes:
inputting angular variation of at least one aerodynamically significant feature of the as-built aerospace vehicle relative to the nominal orientation of the as-built aerospace vehicle, and
automatically transforming the angular variation of the at least one aerodynamically significant feature into angular offsets of the nominal orientation of the as-built aerospace vehicle.

19. The method of claim 18, wherein automatically transforming the angular variation includes:
formatting the angular variation of the at least one aerodynamically significant feature of the as-built aerospace vehicle into an input vector,
formatting a plurality of transformation factors that correlate a plurality of angular variations of aerodynamically significant features with angular offsets of components of cruise orientation into a transformation matrix, and
multiplying the transformation matrix by the input vector to obtain an output vector with angular offsets of components of the cruise orientation of the as-built aerospace vehicle.

* * * * *